(12) United States Patent
Hoang et al.

(10) Patent No.: US 9,210,643 B2
(45) Date of Patent: Dec. 8, 2015

(54) COMMUNICATION TERMINAL AND METHOD FOR PERFORMING COMMUNICATION

(75) Inventors: Anh Tuan Hoang, Singapore (SG); Haiguang Wang, Singapore (SG); Jaya Shankar s/o Pathmasuntharam, Singapore (SG); Chee Ming Joseph Teo, Singapore (SG); Wai Leong Yeow, Singapore (SG); Shoukang Zheng, Singapore (SG); Zhongding Lei, Singapore (SG); Choong Hock Mar, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 106 days.

(21) Appl. No.: 14/002,915

(22) PCT Filed: Mar. 2, 2012

(86) PCT No.: PCT/SG2012/000070
§ 371 (c)(1),
(2), (4) Date: Nov. 8, 2013

(87) PCT Pub. No.: WO2012/118451
PCT Pub. Date: Sep. 7, 2012

(65) Prior Publication Data
US 2014/0057637 A1    Feb. 27, 2014

(30) Foreign Application Priority Data

| | | |
|---|---|---|
| Mar. 3, 2011 | (SG) | 201101534 |
| Mar. 11, 2011 | (SG) | 201101771 |
| May 12, 2011 | (SG) | 201103402 |
| Jul. 18, 2011 | (SG) | 201105179 |
| Sep. 19, 2011 | (SG) | 201106745 |
| Nov. 4, 2011 | (SG) | 201108175 |

(51) Int. Cl.
*H04W 40/04* (2009.01)
*H04W 72/04* (2009.01)
*H04W 56/00* (2009.01)
*H04W 76/02* (2009.01)
*H04W 8/00* (2009.01)
*H04W 92/18* (2009.01)
*H04W 88/04* (2009.01)

(52) U.S. Cl.
CPC .......... *H04W 40/04* (2013.01); *H04W 56/0045* (2013.01); *H04W 72/04* (2013.01); *H04W 76/023* (2013.01); *H04W 8/005* (2013.01); *H04W 88/04* (2013.01); *H04W 92/18* (2013.01)

(58) Field of Classification Search
None
See application file for complete search history.

(56) References Cited

U.S. PATENT DOCUMENTS

| 2004/0192193 A1 | 9/2004 | Silvester | |
|---|---|---|---|
| 2009/0017844 A1* | 1/2009 | Li et al. | 455/458 |

(Continued)

FOREIGN PATENT DOCUMENTS

| WO | WO0237771 | 5/2002 |
|---|---|---|
| WO | WO2005053338 | 6/2005 |

OTHER PUBLICATIONS

Godfrey, IEEE 802.16n System Requirements Document Including SARM Annex, IEEE 802.16n-10/0048r3 1 (IEEE 2011).

(Continued)

*Primary Examiner* — Kimberly A Williams
(74) *Attorney, Agent, or Firm* — K. David Crockett, Esq.; Niky Economy Syrengelas, Esq.; Crockett & Crockett, PC

(57) ABSTRACT

A method for enabling a forwarding to network operation in a cellular mobile communication system is described, the cellular mobile communication system comprising a plurality of mobile stations and at least one base station, the method comprising: reporting forwarding capability of a first mobile station of the plurality of mobile stations with the at least one base station; discovering neighboring mobile stations to the first mobile station; selecting a second mobile station from the neighboring mobile stations and establishing a forwarding link between the first mobile station and the second mobile station; allocating radio resources for a link between the first mobile station and the second mobile station; and synchronizing the link between the first mobile station and the second mobile station to establish the forwarding network.

18 Claims, 17 Drawing Sheets

(56) References Cited

U.S. PATENT DOCUMENTS

| | | | |
|---|---|---|---|
| 2009/0221290 A1* | 9/2009 | Kang et al. | 455/437 |
| 2010/0009624 A1* | 1/2010 | Youn et al. | 455/9 |
| 2011/0044312 A1* | 2/2011 | Lee et al. | 370/344 |
| 2011/0103264 A1* | 5/2011 | Wentink | 370/255 |
| 2011/0258313 A1* | 10/2011 | Mallik et al. | 709/224 |
| 2012/0115518 A1* | 5/2012 | Zeira et al. | 455/500 |
| 2012/0142268 A1* | 6/2012 | Tao et al. | 455/3.05 |
| 2013/0028163 A1* | 1/2013 | Hsiao et al. | 370/312 |
| 2013/0058311 A1* | 3/2013 | Park et al. | 370/331 |
| 2013/0208584 A1* | 8/2013 | Kim et al. | 370/228 |

OTHER PUBLICATIONS

IEEE Standard for Local and Metropolitan Area Networks—Part 16: Air Interface for Fixed Broadband Wireless Access Systems—Draft Amendment for Advanced Air Interface, IEEE 802.16m (2011).

IEEE Standard for Local and Metropolitan area Networks—Part 16: Air Interface for Broadband Wireless Access Systems, IEEE 802.16 (2009).

IEEE Standard for Local and Metropolitan Area Neworks—Part 16: Air Interface for Broadband Wireless Access Systems; Amendment 3: Advanced Air Interface, IEEE 802.16m-2011, IEEE Published Standard.

Godfrey, 802.16n System Requirements Document Including SARM Annex, IEEE802.16n-10/0048r2 1 (IEEE 2011).

IEEE Standard for Local and Metropolitan Area Networks—Part 16: Air Interface for Broadband and Wireless Access Systems; Amendment 3: Advanced Air Interface, IEEE 802.16m-2011 (2011).

Godfrey, et al., P802.16n Draft AWD, IEEE 802.16n-11/0024 (2011).

Godfrey, et al., P802.16.1a Draft AWD, IEEE 802.16n-11/0025 (2011).

\* cited by examiner

1400

COMMUNICATION TERMINAL AND METHOD FOR PERFORMING COMMUNICATION

CROSS-REFERENCE TO RELATED APPLICATION

This application makes reference to and claims the benefit of priority of the applications for "A Method To Support HR-MS Forwarding In 802.16 Networks" filed on Mar. 3, 2011, "Coverage Extension and Alternative Path Management in 802.16 HR-networks" filed on Mar. 11, 2011, "Mechanisms to Support Higher Reliability and Secure Communications in IEEE 802.16 Networks" filed on Sep. 19, 2011, "Method for extending network coverage, supporting peer-to-peer secured mobile station communications, or recovering from a network failure" filed on Jul. 18, 2011, "Method For Extending Network Coverage or Recovering From A Network Failure" filed on May 12, 2011, and "Mechanisms To Support HR-MS Forwarding To Network, Secure Communication, And Local Forwarding In IEEE 802.16 Networks" filed on Nov. 4, 2011, all with the Intellectual Property Office of Singapore, and there duly assigned application numbers 201101534-4, 201101771-2, 201106745-1, 201105179-4, 201103402-2, and 201108175-9, respectively.

FIELD OF THE INVENTION

Embodiments of the invention generally relate to a cellular mobile communication system and a method for performing communication.

BACKGROUND OF THE INVENTION

The IEEE 802.16 family of standards specifies Media Access Control (MAC) and Physical (PHY) layer protocols for WiMAX broadband wireless communications. Key entities in a WiMAX access network include Base Stations (BS), Relay Stations (RS), and Mobile Stations (MS). BS and MS are referred to as infrastructure stations while MS is regarded as a subscriber station.

To enhance the reliability of WiMAX, the 802.16 Working Group started a new Task Group, called IEEE 802.16n, which specifies operation of so called High-Reliability BS (HR-BS), High-Reliability RS (HR-RS), and High Reliability MS (HR-MS). A WiMAX network operating based on what to be specified in IEEE 802.16n will be referred to as HR-Network.

Among all requirements to enhance WiMAX reliability, HR-MS forwarding is specified.

HR-Network shall support HR-MS forwarding of user data and control signaling between HR-MS and HR-BS and between HR-MS and HR-RS. The control signaling and data transmission for the HR-MS to HR-MS direct link shall at least be capable of operating within the frequency band that the HR-BS operates. An association establishment shall be supported.

SUMMARY OF THE INVENTION

In one embodiment, a method is provided for enabling forwarding to network operation in a cellular mobile communication system is described, the cellular mobile communication system comprising a plurality of mobile stations and at least one base station, the method comprising: reporting forwarding capability of a first mobile station of the plurality of mobile stations with the at least one base station; discovering neighboring mobile stations to the first mobile station; selecting a second mobile station from the neighboring mobile stations and establishing a forwarding link between the first mobile station and the second mobile station; allocating radio resources for the forwarding link between the first mobile station and the second mobile station; and synchronizing the forwarding link between the first mobile station and the second mobile station to establish the forwarding network.

According to another embodiment, a cellular mobile communication system for establishing a forwarding network according to the method described above is provided.

SHORT DESCRIPTION OF THE FIGURES

Illustrative embodiments of the invention are explained below with reference to the drawings.

DETAILED DESCRIPTION

Figure 1:
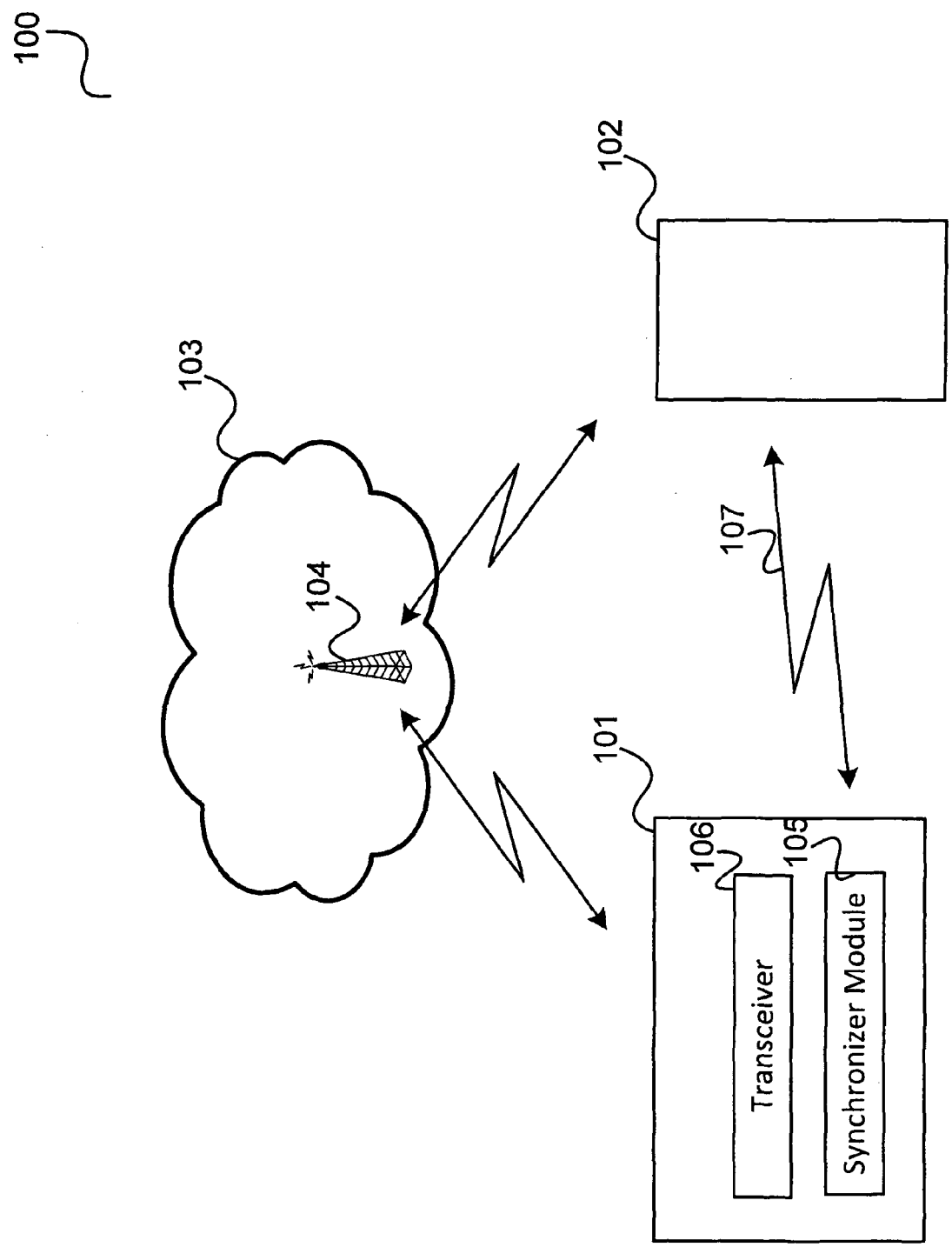
FIG. 1 shows a communication terminal according to an embodiment.

According to one embodiment, a communication terminal as illustrated in FIG. 1 is provided.

FIG. 1 shows a communication terminal 101 according to an embodiment.

The communication terminal 101 is a (mobile) communication terminal of a cellular mobile communication system 100. The cellular mobile communication system 100 comprises the communication terminal 101, another communication terminal 102 and a communication network 103 for providing a communication connection between the communication terminal and the other communication terminal via at least one base station 104. The communication terminal 101 may be referred to herein as a first communication terminal, forwarding mobile station, and/or first mobile station. The other communication terminal 102 may be referred to herein as a second communication terminal, forwarded mobile station, and/or second mobile station.

The communication terminal 101 comprises a synchronizer module 105 which may be configured to synchronize the link between the communication terminal 101 and the other communication terminal 102 to enable forwarding to network operation.

The communication terminal 101 further comprises a transceiver 106 configured to perform communication between the communication terminal 101 and the other communication terminal 102. Each communication terminal may include a transceiver 106 and a synchronizer module 105.

According to one or more embodiments, in other words, a communication terminal of a cellular mobile communication network provides a method to support the operations of HR-MS forwarding to network (HR-MS FTN) in IEEE 802.16 and other Point-to-multipoint (PMP) OFDMA-based wireless networks. The term "HR-MS FTN" refers to the operation in which an HR-MS (a forwarding station), such as the communication terminal 101, helps forwarding data and/or control messages: i) from another HR-MS (a forwarded station), such as the other communication terminal 102, to an infrastructure station (i.e., a Relay Station or Base Station), such as the base station 104, and ii) from the infrastructure station to the other HR-MS (the forwarded station).

Various embodiments of this disclosure provide i) a mechanism to establish the forwarding-forwarded relationship between the forwarding and forwarded stations; ii) a mechanism to enable frame-level/link-level synchronization, resource allocation/scheduling, and other handshaking over the communication link between the forwarding and forwarded stations; and iii) a mechanism to support transitions to and from the HR-MS FTN operating modes under changes in network conditions.

Various embodiments of this disclosure take into account and recognize i) when the forwarded station is inside the coverage of an infrastructure station; and ii) when the forwarded station is outside of infrastructural coverage.

In the context of this disclosure, a mobile station is said to be inside the coverage of an infrastructure station if the mobile station can directly receive and transmit data and control messages from and to the infrastructure station.

In the context of this disclosure, a mobile station is said to be outside the coverage, or out-of-coverage, of an infrastructure station if the mobile station cannot directly receive and transmit data and control messages from and to the infrastructure station; this can be due to limitation of the transmitting/receiving capabilities of the two stations and can also be due to either the mobile station or the infrastructure station do not engage in direct transmitting and receiving of data and control messages.

According to an embodiment, a method for establishing a forwarding network in a cellular mobile communication system, the cellular mobile communication system comprising a plurality of mobile stations and at least one base station, the method comprises reporting forwarding capability of a first mobile station of the plurality of mobile stations with the at least one base station; discovering neighboring mobile stations to the first mobile station; establishing a forwarding link between the first mobile station and a second mobile station; allocating radio resources for the forwarding link between the first mobile station and the second mobile station; and synchronizing the forwarding link between the first mobile station and the second mobile station to enable forwarding to network operation.

According to an embodiment, a method for enabling a forwarding to network operation in a cellular mobile communication system comprises forwarding communications between the second mobile station and the base station through the first mobile station.

According to an embodiment, the second mobile station is not within a transmission range of the base station.

According to an embodiment, the second mobile station is within a transmission range of the base station.

According to an embodiment, the step of synchronizing comprises transmitting preambles at the beginning of each frame from the base station.

According to an embodiment, the step of synchronizing comprises transmitting preambles from the first mobile station periodically.

According to an embodiment, synchronizing the forwarding link between the first mobile station and the second mobile station comprises transmitting, from the first mobile station to the second mobile station, a first ranging code; estimating, by the second mobile station, a time offset from the first ranging code; and adjusting, by the second mobile station, a receiving time of the second mobile station based on the time offset.

According to an embodiment, synchronizing the forwarding link between the first mobile station and the second mobile station comprises transmitting, from the second mobile station to the first mobile station, a first ranging code; and estimating, by the first mobile station, a time, offset from the first ranging code.

According to an embodiment, synchronizing the forwarding link between the first mobile station and the second mobile station comprises adjusting, by the first mobile station, a receiving time of the first mobile station based on the time offset.

According to an embodiment, synchronizing the forwarding link between the first mobile station and the second mobile station comprises adjusting, by the second mobile station, a transmission time of the second mobile station based on the time offset instructed by the first mobile station.

According to an embodiment, a link quality between the base station and the second mobile station is less than a threshold while a link quality between the first base station and the second base station is greater than another threshold.

According to an embodiment, a battery level of the second base station is less than a threshold while a battery level of the first base station is greater than another threshold.

According to an embodiment, a link quality between the first base station and the second base station is greater than a threshold while a downlink interference level of the second base station is greater than another threshold.

According to an embodiment, enabling a forwarding to network operation in a cellular mobile communication system comprises associating the first mobile station and the second mobile station with the at least one base station.

According to an embodiment, the cellular mobile communication system is a communication network according to an IEEE 802.16 communication standard.

According to an embodiment, the cellular mobile communication system is a communication network according to the IEEE 802.16m-2011 communication standard.

According to an embodiment, the cellular mobile communication system is a communication network according to the IEEE 802.16-2009 communication standard.

According to an embodiment, a method for enabling a forwarding to network operation in a cellular mobile communication system comprises transmitting, by the first mobile station, a primary advanced preamble and a secondary advanced preamble following the primary advanced preamble; and transmitting, by the first mobile station, network configuration information following the secondary advanced preamble.

According to an embodiment, a method for enabling a forwarding to network operation in a cellular mobile communication system comprises reserving, by the base station, a plurality of symbol durations; transmitting, by the first mobile station, a preamble in a first reserved symbol duration of the plurality of symbol durations; transmitting, by the first mobile station, network configuration information following the preamble; and responsive to receiving the preamble and the network configuration information, transmitting, by the second mobile station, a ranging code to the first mobile station.

According to an embodiment, a cellular mobile communication system for establishing a forwarding network, the cellular mobile communication system comprising a plurality of mobile stations and at least one base station, the cellular mobile communication system comprising a forwarding mobile station of the plurality of mobile stations configured to report forwarding capability to the at least one base station and discover neighboring mobile stations; the at least one base station configured to select a forwarded mobile station from the neighboring mobile stations and allocate radio resources for a link between the forwarding mobile station and the forwarded mobile station; and a synchronizer module configured to synchronize the link between the forwarding mobile station and the forwarded mobile station to establish the forwarding network.

Figure 2:
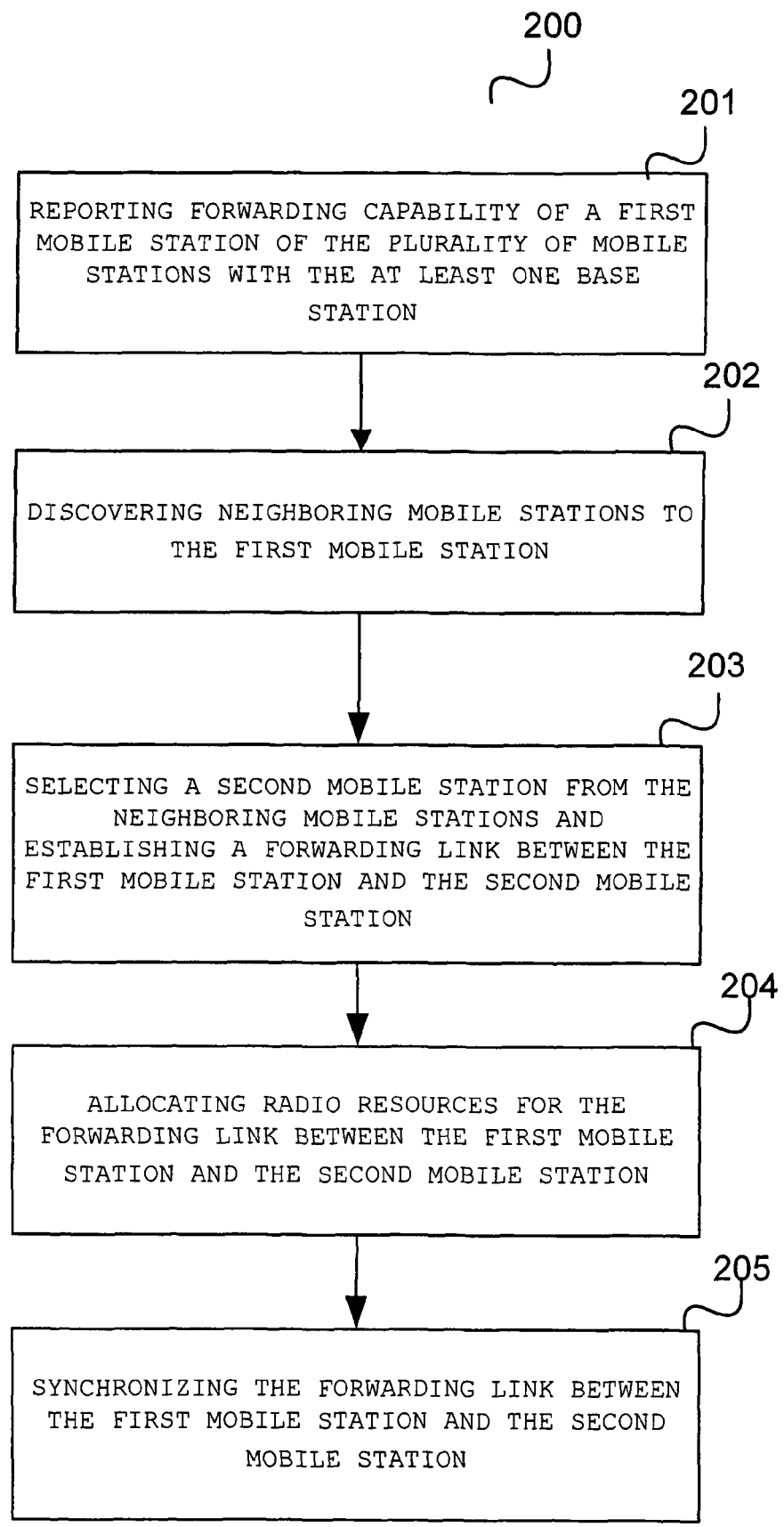
FIG. 2 shows a flow diagram according to an embodiment.

The communication terminal 100 for example carries out a method as illustrated in FIG. 2.

FIG. 2 shows a flow diagram 200 according to an embodiment.

The flow diagram 200 illustrates a method for establishing a forwarding network in a cellular mobile communication system, the cellular mobile communication system comprising a plurality of mobile stations and at least one base station.

In 201, reporting forwarding capability of a first mobile station of the plurality of mobile stations with the at least one base station.

In 202, discovering neighboring mobile stations to the first mobile station.

In 203, selecting a second mobile station from the neighboring mobile stations and establishing a forwarding link between the first mobile station and the second mobile station.

In 204, allocating radio resources for the forwarding link between the first mobile station and the second mobile station.

In 205, synchronizing the forwarding link between the first mobile station and the second mobile station to enable a forwarding to network operation.

It should be noted that embodiments described in context of the communication terminal are analogously valid for the method for performing communication and vice versa.

As mentioned above, the communication network is for example a communication network according to an IEEE 802.16 communication standard. The current IEEE 802.16 standards do not provide such methods described herein with regard to direct communication between communication terminals.

It should be noted that current specifications for IEEE 802.16 do not allow the above mentioned HR-MS Forwarding-to-Network (HR-MS FTN) operation, and each 802.16 MS can only transmit to or receive from a BS or an RS.

The different embodiments of this disclosure are also applicable to other wireless technologies that follow the Point-to-Multipoint (PMP) architecture and based on Orthogonal Frequency Division Multiple Access (OFDMA). These wireless technologies include 3GPP Long Term Evolution (LTE) and LTE Advanced With reference to FIGS. 3, 4 and 5, HR-MS Forwarding-to-Network (HR-MS FTN) operation according to various embodiments is described.

The various embodiments of this disclosure provide a mechanism to establish the forwarding-forwarded association between HR-MS1 and HR-MS2.

The various embodiments of this disclosure provide a mechanism to enable the bi-directional communication link between HR-MS1 and HR-MS2. This mechanism may allow the forwarding and forwarded stations to: i) establish frame-level/link-level synchronization; ii) receive and carry out scheduling/resource allocation instructions from HR-BS (or HR-RS); and iii) carry out other necessary hand-shaking activities (such as Automatic Repeat Request—ARQ).

The various embodiments of this disclosure recognize and take into account that the above technical components have not been specified in current state-of-the-art (for IEEE 802.16-2009, 802.16m, 3GPP UMTS, LTE, LTE-Advanced . . . ), partially due to the lack of strong usage drives.

Figure 3:
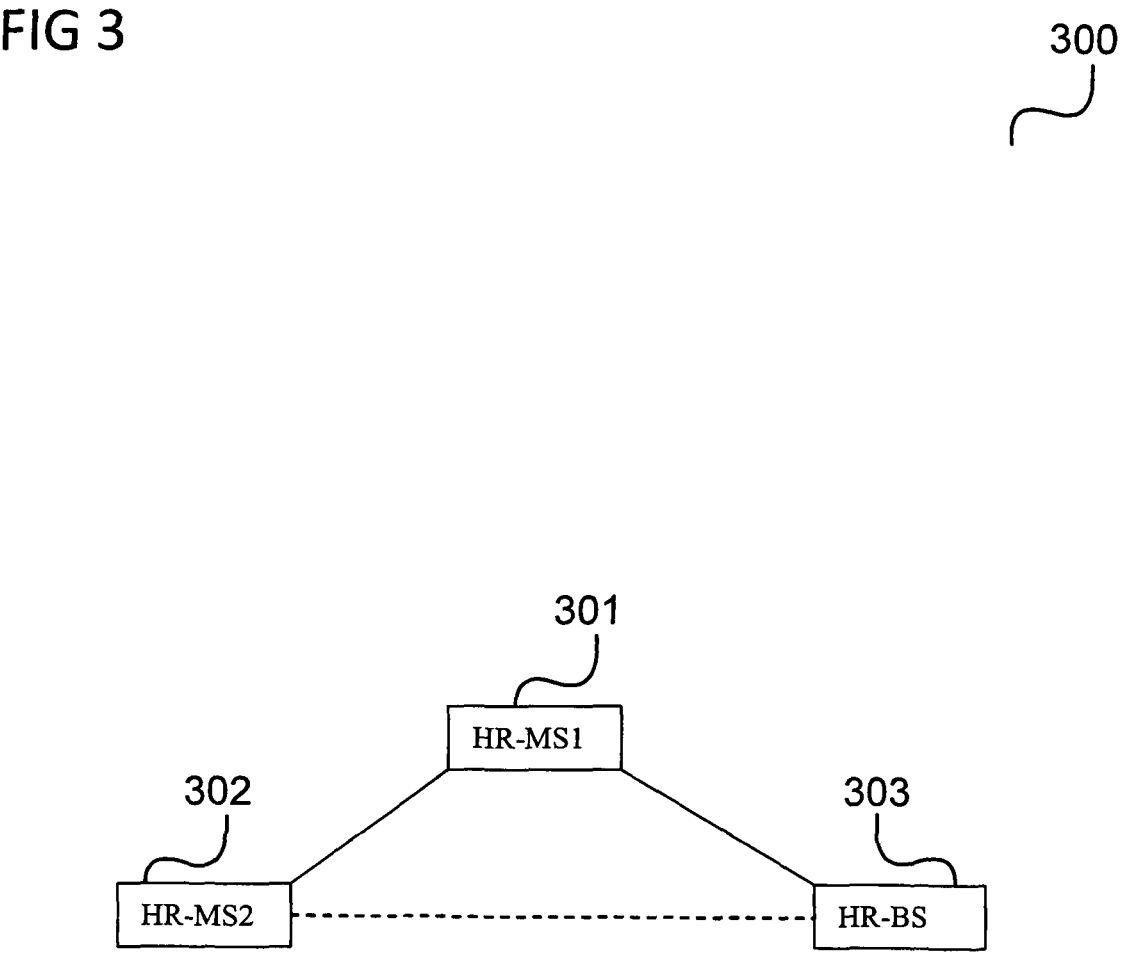
FIG. 3 shows a communication system according to an embodiment.

FIG. 3 shows a communication system 300 according to an embodiment.

The communication system 300 comprises a first mobile terminal (also referred to as HR-MS1) 301, a second mobile terminal (also referred to as HR-MS2) 302 and a communication network (also referred to as network side of the communication system 300) comprising a base station (also referred to as HS-BS) 303.

The communication system 300 is for example a communication system according to an IEEE 802.16 standard In normal operation, the base station 303 provides coverage for the mobile terminals 301, 302 such that the mobile terminals 301, 302 can communicate via the base station 303. In some embodiments, the base station 303 may be a relay station.

In an embodiment, HR-MS1 is the forwarding entity, which is responsible for forwarding data and control messages from HR-MS2 to HR-BS and vice versa. In this Figure, both HR-MS1 and HR-MS2 are within the coverage of HR-BS.

In this embodiment, employing HR-MS FTN may allow HR-MS2 to transmit at lower power, therefore conserve its energy, facilitate frequency reuse, and reduce interference to surrounding users. The use of HR-MS FTN can also enable HR-MS2 to transmit and receive at higher data rate even though it is far away from HR-BS. This is because the links between HR-MS1 and HR-MS2 and the link between HR-MS1 and HR-BS can support higher transmission rates.

Figure 4:
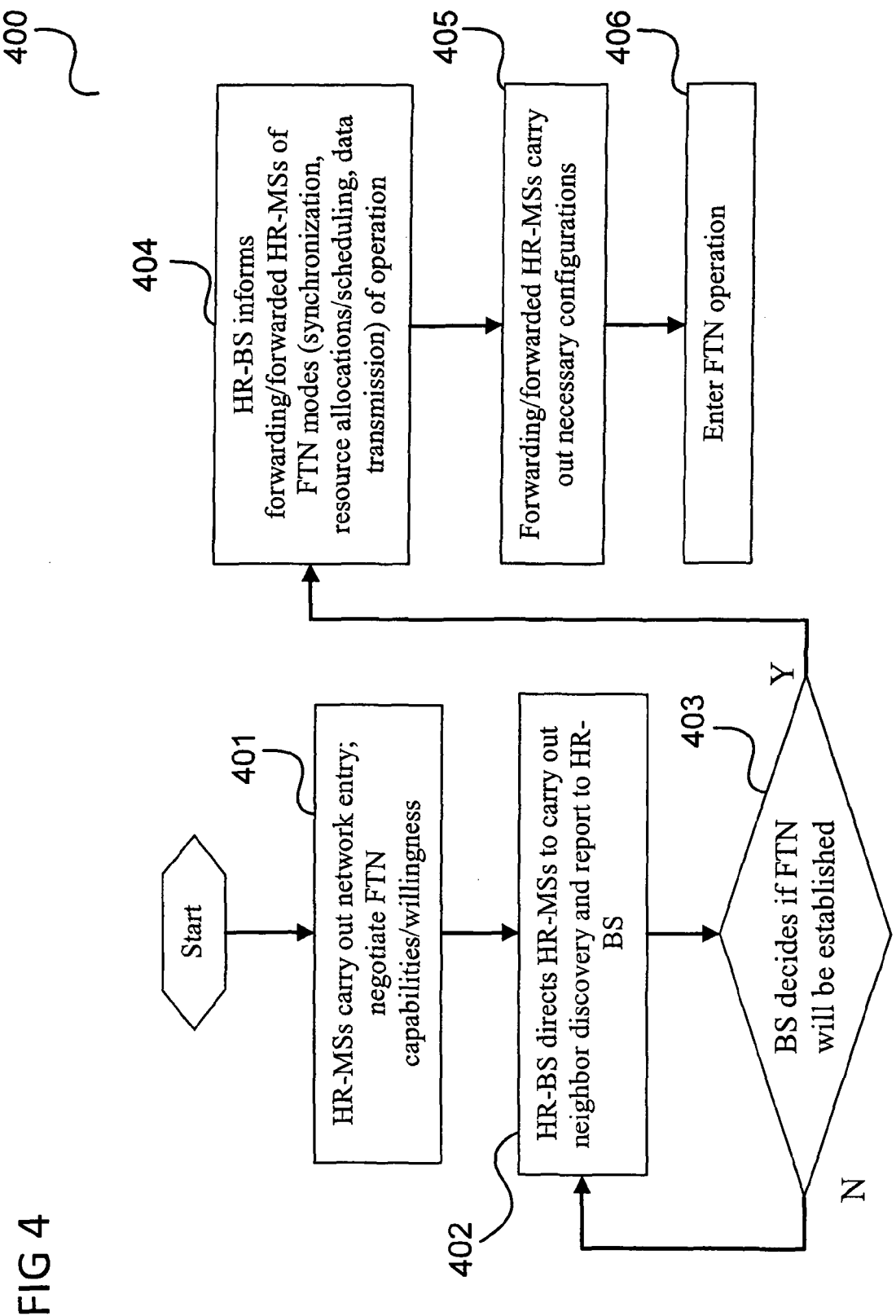
FIG. 4 shows a message flow diagram according to an embodiment.

FIG. 4 shows a message flow diagram 400 according to an embodiment.

In an embodiment, when both forwarding and forwarded HR-MSs are within the coverage of HR-BS, the forwarding-forwarded association between a pair of HR-MSs is established through the following steps:

STEP 401: Each HR-MS reports and negotiates its FTN capabilities and FTN willingness with HR-BS during network entry.

During network entry, after completing ranging and automatic adjustments, HR-MS will negotiate FTN capabilities and willingness with HR-BS. HR-BS and HR-MS will negotiate and agree on: what FTN roles (forwarding and/or forwarded) HR-MS can assume; what FTN communications modes HR-MS can support; under what conditions HR-MS is willing to assume a particular FTN role and a particular FTN mode. An FTN mode refers to a particular approach to enable frame/link-level synchronization (among forwarding/forwarded HR-MSs) and resource allocation/scheduling during FTN communications.

STEP 402: HR-BS directs HR-MSs to carry out neighbor discovery and report neighbor information.

Neighbor discovery is the process by which an HR-MS learns the existence of other HR-MSs within its communication range. This can be achieved by HR-BS scheduling an HR-MS to broadcast some predefined signal sequences for other HR-MSs to detect and, if possible, estimate the link conditions from the transmitting HR-MS.

In one embodiment, HR-BS can schedule an HR-MS to broadcast preamble sequences similar to that broadcasted by HR-BS and HR-RS. This can be followed by some network/neighborhood information for the receiving HR-MSs to obtain 2-hop neighborhood information.

In another embodiment, HR-BS can schedule an HR-MS to broadcast ranging sequences similar to that used for uplink (UL) ranging between HR-MS and HR-BS. A receiving HR-MS, by processing the received ranging sequence, is able to estimate time, frequency, and power offsets with respect to the transmitting HR-MS.

In another embodiment, HR-BS can schedule an HR-MS to broadcast sounding sequences similar to that used for closed-loop link-adaptation between HR-BS and HR-MS (Golay sequences).

When an HR-MS broadcasts a predefined sequence, other HR-MSs can try to listen, process, and report the information obtained to HR-BS.

It should be highlighted that, apart from supporting HR-MS FTN, neighbor discovery can also be used for other purposes, such as direct communication between two mobile stations, path discovery and optimization, interference-mitigation, network-recovery preparation.

STEP 403: Based on information obtained from the above neighbor discovery process, together with HR-MS capabilities and willingness to perform FTN, HR-BS determines whether a FTN will be established.

STEP 404: HR-BS selects a pair of HR-MSs for which FTN is beneficial, informs these two HR-MSs of the FTN mode to be setup, and directs these HR-MSs to carry out necessary configurations.

HR-BS may decide whether a pair of HR-MSs should enter an FTN operation based on, among other information, network topology, link/interference conditions, and HR-MSs' status and willingness to join the FTN mode.

In one embodiment, HR-MS1 will act as a forwarding station and HR-MS2 will act as a forwarded station if the quality of the link between HR-MS2 and HR-BS is bellow a predefined threshold while the quality of the link between HR-MS2 and HR-MS1 and the quality of the link between HR-MS1 and HR-BS are both better than some other predefined thresholds.

In another embodiment, HR-MS1 will act as a forwarding station and HR-MS2 will act as a forwarded station if the battery level (energy storage) of HR-MS2 falls below a predefined threshold while the battery level of HR-MS1 is above another predefined threshold.

In another embodiment, HR-MS1 will act as a forwarding station and HR-MS2 will act as a forwarded station if the downlink (DL) interference level at HR-MS2 is above a predefined threshold while the link quality between HR-MS1 and HR-MS2 is above another predefined threshold.

In considering whether two HR-MSs should enter an FTN operation, HR-BS can also take into account other factors such as HR-MS mobility pattern, services currently supported, with QoS requirements.

STEP 405: The selected HR-MSs carry out necessary configurations.

STEP 406: Forwarding and forwarded HR-MSs enter the FTN operation.

Various embodiments of processes and procedures to achieve frame-level and link-level synchronization between two HR-MSs are described herein. Such levels of synchronization may be used for reliable communications within frame-based OFDMA systems such as IEEE 802.16 and LTE/LTE-Advanced. The processes and procedures described below can also be used to support direct communication between two HR-MSs. Direct communications may refer to scenarios when two HR-MSs transmit/receive data to/from each other without the data being channeled through in infrastructure nodes (HR-BS or HR-RS).

Frame-Level Synchronization:

Additionally, referring again to FIG. 3, in an embodiment, when both forwarding 301 and forwarded 302 HR-MSs are within the coverage of HR-BS, the bi-directional link between the forwarding 301 and forwarded 302 HR-MSs may be enabled by frame-level synchronization. Frame level synchronization may be when forwarding 301 and forwarded 302 HR-MSs achieve common frame-level time reference by referring to common preamble sequences, which are transmitted periodically by a HR-BS 303 and/or by the forwarding HR-MS 301.

When both forwarding 301 and forwarded 302 HR-MSs are within the coverage of HR-BS 303, they can use preambles transmitted at the beginning of each frame by HR-BS 303 for frame-level synchronization.

In another approach, forwarding HR-MS 301 can periodically transmit preambles so that forwarded HR-MS 302 can receive and achieve frame-level synchronization (with respect to forwarding HR-MS 301).

Due to the dynamic nature of DL/UL sub-frame partition within each frame, when the forwarding HR-MS 301 transmit the preamble, the transmission may happen either at the first OFDMA symbol or the last OFDMA symbol of the frame.

In one embodiment, forwarding HR-MS 301 can transmit preambles at the beginning of some frames, i.e., roughly at the same time as HR-BS's preambles. To avoid interfering with HR-BS's preamble, forwarding HR-MS maps its preambles into a different set of OFDMA sub-carriers, compared to the set used by HR-BS's preambles (in IEEE 802.16m, this set of sub-carriers is termed a segment). The way a subset of sub-carriers (sub-carriers segment) and a preamble sequence are selected and transmitted by forwarding HR-MS can be similar to how that is done in a Femto BS (refer to Section 16.4 of IEEE 802.16m-2011 for Femto BS support).

In another embodiment, forwarding HR-MS 301 can transmit preambles at the last OFDMA symbol of the last UL sub-frame of some frames. HR-BS will not schedule other HR-MSs to transmit UL data during this OFDMA symbol. This is provided that the number of OFDMA symbols left for UL communications (in the respective UL sub-frame) matches some predefined UL pilot patterns to be applied. For example, in IEEE 802.16m-2011, if the last sub-frame is of type 1, i.e., having 6 OFDMA symbols, then when the last symbol is reserved for forwarding HR-MSs to transmit (FTN) preamble, the rest 5 OFDMA symbols match the pilot pattern defined for sub-frames of type 3.

Multiple forwarding HR-MSs (for different FTN associations) may transmit preambles during the same OFDMA symbols, as long as forwarding HR-MSs use different preambles and/or different sub-carriers segments.

The decision between using HR-BS's preambles for frame-level synchronization and requiring forwarding HR- MSs to transmit preambles may be based on HR-MS capabilities, preamble-interference conditions, and mobility characteristics of forwarded and forwarding HR-MSs. In one example, HR-BS's preambles will be used if both forwarding and forwarded HR-MSs move slowly while if one or both HR-MSs experience dynamic mobility, the use of forwarding HR-MS's preambles is preferred. One way for HR-BS to evaluate the mobility level of HR-MSs based on the frequency at which UL timing between HR-MSs and HR-BS need to be adjusted (e.g., through periodic ranging).

In another embodiment, when forwarding and forwarded HR-MSs are under control of an HR-RS, the above methods and processes are still valid, with HR-BS being replaced by HR-RS.

OFDMA-Symbol-Level Synchronization:

In one or more various embodiments, OFDMA-symbol-level synchronization may be used. This type of synchronization is described in FIGS. 5 and 6.

Figure 5:
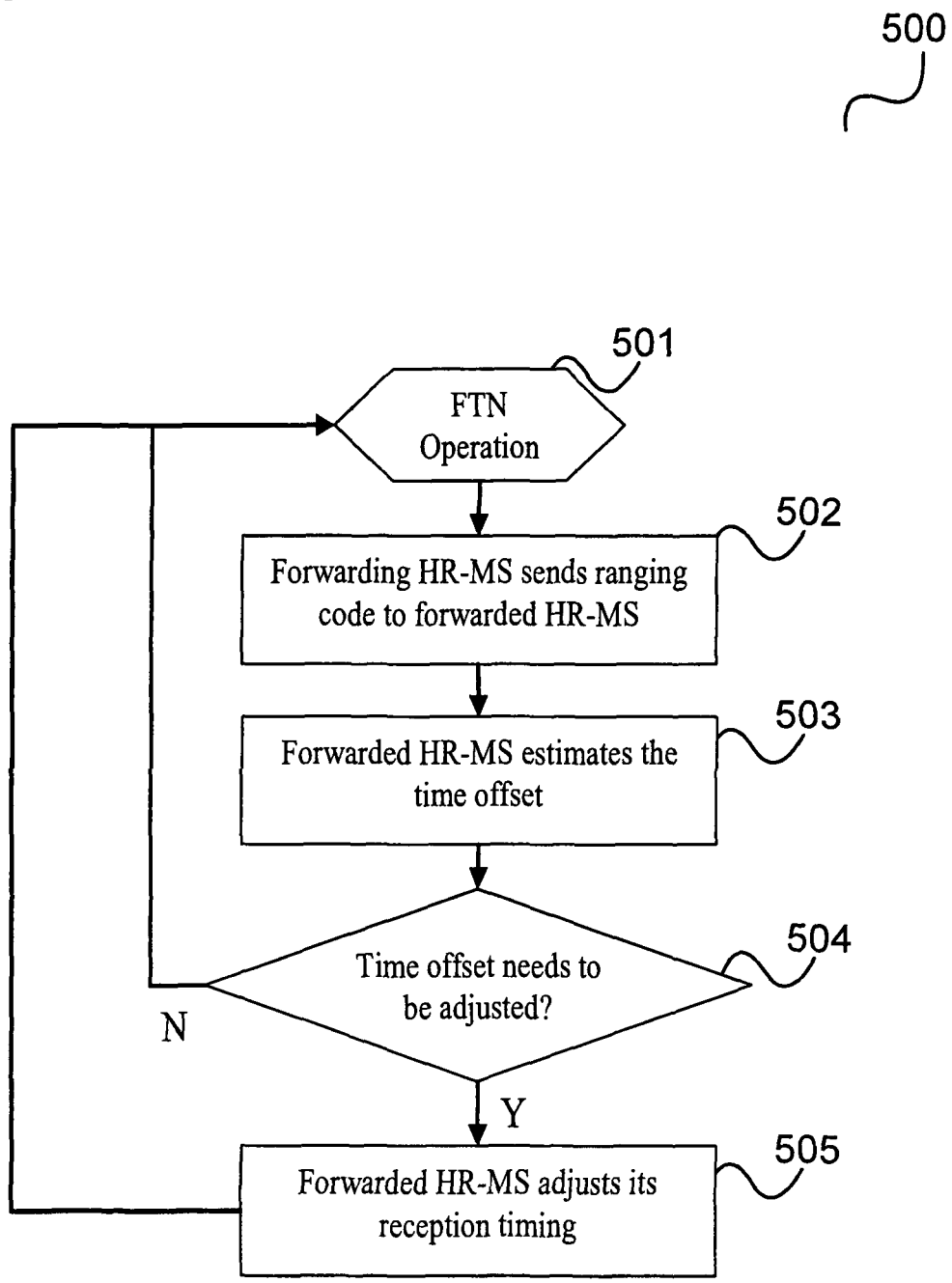
FIG. 5 shows a message flow diagram according to an embodiment.

FIG. 5 shows a message flow diagram 500 according to an embodiment to allow forwarded HR-MS to synchronize its receiving time according to the transmitting time of the forwarding HR-MS; the embodiment applies for both scenarios, when the forwarded HR-MS is either inside or outside of the coverage of HR-BS.

In an embodiment, the bi-directional link between the forwarding and forwarded HR-MSs may be enabled by Link-level synchronization. Link-level synchronization may be when forwarding and forwarded HR-MSs achieve OFDMA-symbol-level synchronization through the use of a ranging signal.

For reliable communications between two entities within a OFDMA-based wireless network, the signal from the transmitting entity may need to reach the receiving entity within the Cyclic Prefix (CP) period within the OFDM-symbol boundaries of the receiving entity. In existing systems such as IEEE 802.16-2009, 802.16m-2011, LTE, LTE-Advances, DL OFDMA-symbol-level synchronization is based on scanning for DL preambles while UL OFDMA-symbol-level synchronization is based on ranging.

Ranging is a process by which transmitter and receiver correct the time/frequency/power offsets in order for the transmitted signal to be correctly decoded. In current IEEE 802.16 specifications (802.16-2009 and 802.16m-2011), ranging is used for UL synchronization from MS to BS/RS, and is achieved by MS transmitting CDMA (preamble) sequences to the BS/RS for offset estimation and feedback. UL ranging sequences are transmitted in ranging opportunities, which occupy only part of the channel bandwidth.

FIG. 5 depicts and embodiment of ranging between forwarding and forwarded HR-MSs, when ranging code is transmitted by forwarding HR-MS.

OFDMA-symbol-level synchronization for the direct link between two HR-MSs may be achieved by the following steps:

STEP 501: Forward to Network operation
STEP 502: Forwarding HR-MS sends ranging code to forwarded HR-MS.

When one HR-MS (the transmitting HR-MS) transmits a ranging sequence for the receiving HR-MS to decode and estimate time/frequency/power offsets, the sequence is known by the receiving HR-MS. The transmission time (to the level of OFDMA symbol index) should also be known to the receiving HR-MS.

STEP 503: Forwarded HR-MS estimates the time offset.
STEP 504: Forwarded HR-MS determines if the time offset needs to be adjusted. If the time offset does not need to be adjusted, the process moves to STEP 501. If the time offset does need to be adjusted, the process moves to STEP 505.

STEP 505: Forwarded HR-MS, upon receiving and decoding a ranging sequence from forwarding HR-MS, will correct its own receiving time to match the time-of-arrival (TOA) of the signal transmitted by forwarding MS. Note that in the case of normal UL ranging, the transmission time at the ranging MS is adjusted (instead of the reception time at BS).

In another embodiment, when forwarding and forwarded HR-MSs are under control of an HR-RS, the above methods and processes are still valid, with HR-BS being replaced by HR-RS.

Figure 6:
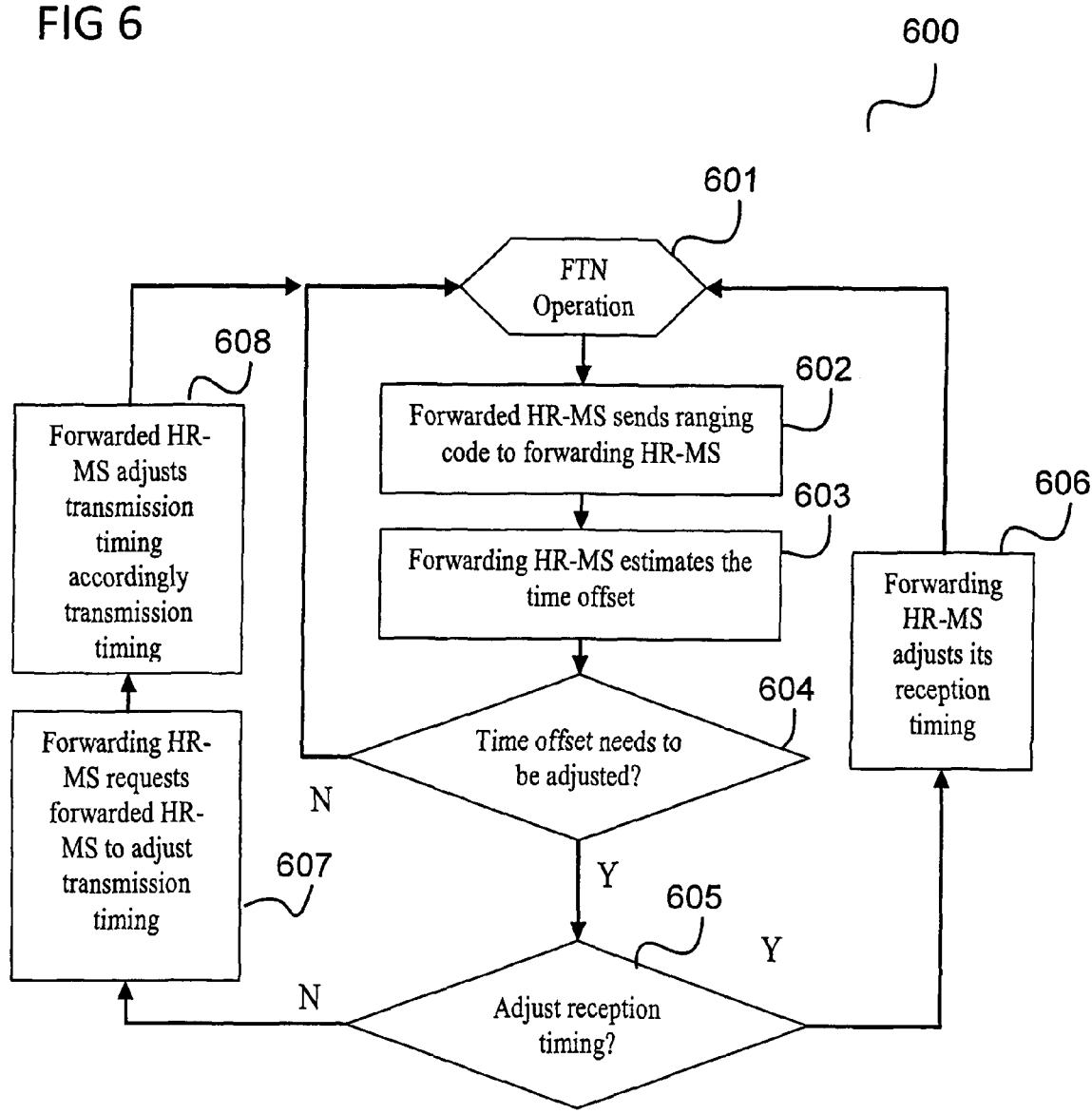
FIG. 6 shows a message flow diagram according to an embodiment.

FIG. 6 shows a message flow diagram 600 according to an embodiment to allow the transmitting time of the forwarded HR-MS and receiving time of the forwarding HR-MS to be; the embodiment applies for both scenarios, when the forwarded HR-MS is either inside or outside of the coverage of HR-BS.

This Figure depicts and embodiment of ranging between forwarding and forwarded HR-MSs, when ranging code is transmitted by forwarded HR-MS.

OFDMA-symbol-level synchronization for the direct link between two HR-MSs may be achieved by the following steps:

STEP 601: Forward to Network operation
STEP 602: Forwarded HR-MS sends ranging code to forwarding HR-MS.
STEP 603: Forwarding HR-MS estimates the time offset.
STEP 604: Forwarding HR-MS determines if the time offset needs to be adjusted. If the time offset does not need to be adjusted, the process moves to STEP 601. If the time offset does need to be adjusted, the process moves to STEP 605.

STEP 605: For forwarding HR-MS, upon receiving and decoding a ranging sequence from a forwarded HR-MS, determine which HR-MS will adjust reception timing. If the forwarding HR-MS will adjust, the process moves to step 606. If the forwarded HR-MS will adjust reception timing, then the process moves to step 607.

STEP 606: Forwarding HR-MS correct its own receiving timing to match the TOA of the signal transmitted by the forwarded HR-MS. The process then moves to STEP 601.

STEP 607: Forwarding HR-MS sends feedback to ask the forwarded HR-MS to correct its transmission time/power to match that of the receiving time of itself.

STEP 608: Forwarded HR-MS adjusts transmission timing accordingly.

In another embodiment, when forwarding and forwarded HR-MSs are under control of an HR-RS, the above methods and processes are still valid, with HR-BS being replaced by HR-RS.

Accordingly, in FIGS. 5 and 6, it should be noted that for ranging sequences to be properly decoded, HR-MSs must transmit/receive these sequences based on a common frame-level time reference, i.e., two HR-MSs should agree on the indexes of those OFDMA symbols in which a ranging sequence is transmitted. Due to propagation delay, the symbol boundaries will not be the same, however, the design of ranging sequences (such as those based on Zadoff-Chu sequences) will take care of this boundary mismatch. In fact, in systems like IEEE 802.16, different ranging sequences are used for different symbol-boundary mismatch scenarios.

In an embodiment, HR-BS selects the appropriate ranging sequences for HR-MS/HR-MS synchronization. In one embodiment, when the system of concern is IEEE 802.16, HR-MSs can transmit ranging sequences designed for periodic ranging (as opposed to those bandwidth-hungry sequences designed for initial ranging).

In combination with our proposed approach for frame-level synchronization, if forwarding HR-MS transmits preamble periodically for timing reference (between forwarding and forwarded HR-MSs), then the directional link from forwarding HR-MS toward forwarded HR-MS is OFDMA-symbol-level synchronized based on preamble reception. It is therefore optional for forwarding HR-MS to transmit FTN ranging sequence.

In another approach, HR-MSs can transmit sounding signals similar to what specified in IEEE 802.16-2009 and 802.16m. In existing systems, sounding is used for closed-loop MIMO transmission and UL scheduling. For HR-MS direct communication, when one HR-MS transmit sounding sequence (over a number of OFDMA subcarriers), the other HR-MS can scan and correct the timing offset, as well as estimate channel responses.

Additionally, herein in the disclosure, when a process does not have defined starting and stopping steps, it is recognized that the process may start and stop at any step within the process.

Figure 7:
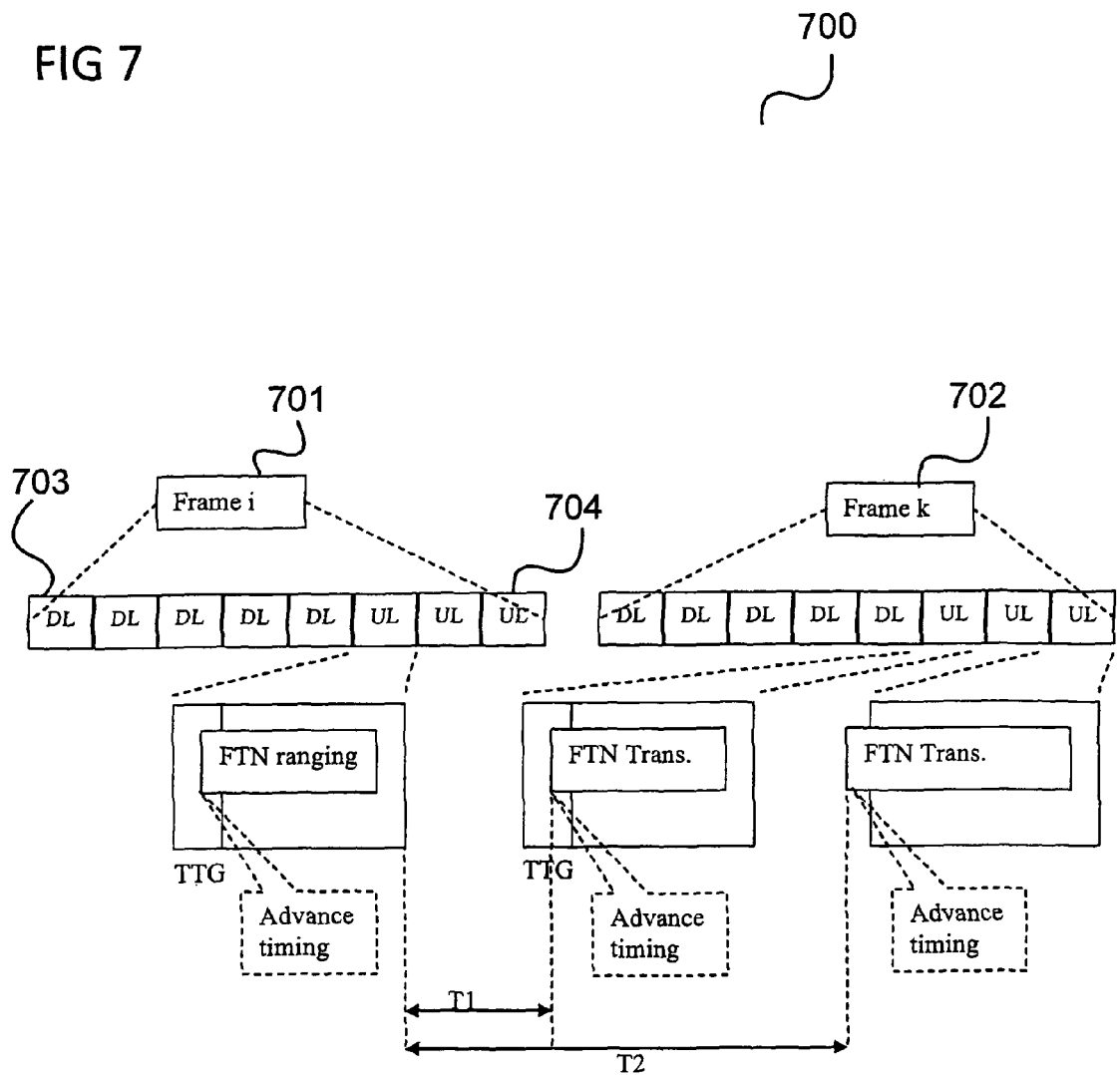
FIG. 7 shows a frame structure that supports FTN ranging and transmission according to an embodiment.

FIG. 7 shows a frame structure that supports FTN ranging and transmission according to an embodiment.

Set of frames 700 includes frame i 701 and frame k 702. Each frame 701 and 702 has downlink (DL) 703 and uplink (UL) 704 transmission areas.

In an embodiment, the bi-directional link between the forwarding and forwarded HR-MSs may be enabled by resource allocation/scheduling. The OFDMA resource (in time and frequency domain) for forwarding and forwarded HR-MSs to transmit preamble, ranging, data, and control messages may be allocated by HR-BS.

Allocation and Scheduling for the HR-MS/HR-MS Link:

In an embodiment, both forwarding and forwarded HR-MSs are within the coverage of HR-BS and the bandwidth for preamble/ranging transmission and control/data exchange in the bi-directional HR-MS/HR-MS link is allocated/scheduled by HR-BS. The bandwidth can be allocated in either DL or UL transmission area.

Furthermore, in one embodiment, an approach for scheduling ranging and data transmission in the HR-MS/HR-MS link is performed by separating ranging and data scheduling. The BS allocates separate resources for ranging and control/data transmission. There is no predefined dependency between ranging allocation and communication allocation.

In another embodiment, an approach for scheduling ranging and data transmission in the HR-MS/HR-MS link is performed by joint ranging/data scheduling. The BS allocates resource for ranging, followed by resource for data transmission after a predefined time interval.

The resource allocation/scheduling information is broadcasted by HR-BS in Assignment A-MAP Information Element for IEEE 802.16m (and in similar control area in a frame in other OFDMA-based technologies). Both forwarding and forwarded HR-MSs will try to decode this allocation/scheduling information.

Allocation and Scheduling for the Forwarding HR-MS/HR-BS Link:

When forwarding HR-MS transmits its own data/control signals to HR-BS, it follows normal UL transmission mechanisms.

For forwarding HR-MS to transmit data from forwarded HR-MS to HR-BS, two approaches exist:

In the first approach, HR-BS allocates UL transmission resources for forwarding and forwarded HR-MSs separately (as if forwarded HR-MS still carries out normal UL transmissions). The forwarding HR-MS then needs to extract UL allocation information for forwarded HR-MS, and then transmits UL data on behalf of forwarded HR-MS. As mentioned before, in IEEE 802.16m, UL resource allocation information is broadcasted by HR-BS in Assignment A-MAP Information Elements.

In the second approach, forwarding HR-MS encapsulates UL MAC PDUs (Protocol Data Units) from forwarded HR-MS in its own UL MAC PDUs. For the HR-BS to be able to extract MAC PDUs from forwarded HR-MS, the Station ID of forwarded HR-MS must be present at a predefined location within the encapsulated MAC PDUs. Either forwarded or forwarding HR-MS can add this information to the PDUs.

Frame Structure to Support HR-MS/HR-MS Link:

In FIG. 7, an embodiment is illustrated as an example of a frame structure in which FTN ranging and FTN transmissions (between forwarded/forwarding HR-MSs) are carried out.

Both forwarding and forwarded HR-MSs achieve frame-level synchronization using DL preambles transmitted by HR-BS (or HR-RS). Furthermore, when these two HR-MSs transmit FTN ranging and/or data toward each other, they control their transmission time based on the advance timing instructed by HR-BS. These same values of timing advances are used for UL transmissions from HR-MS1 and HR-MS2 toward HR-BS. By using this timing advance, forwarding and forwarded HR-MSs can reduce UL interference, when they carry out FTN transmission in UL sub-frames.

The time gaps T1 and T2 can be deterministic or dynamic.

Figure 8:
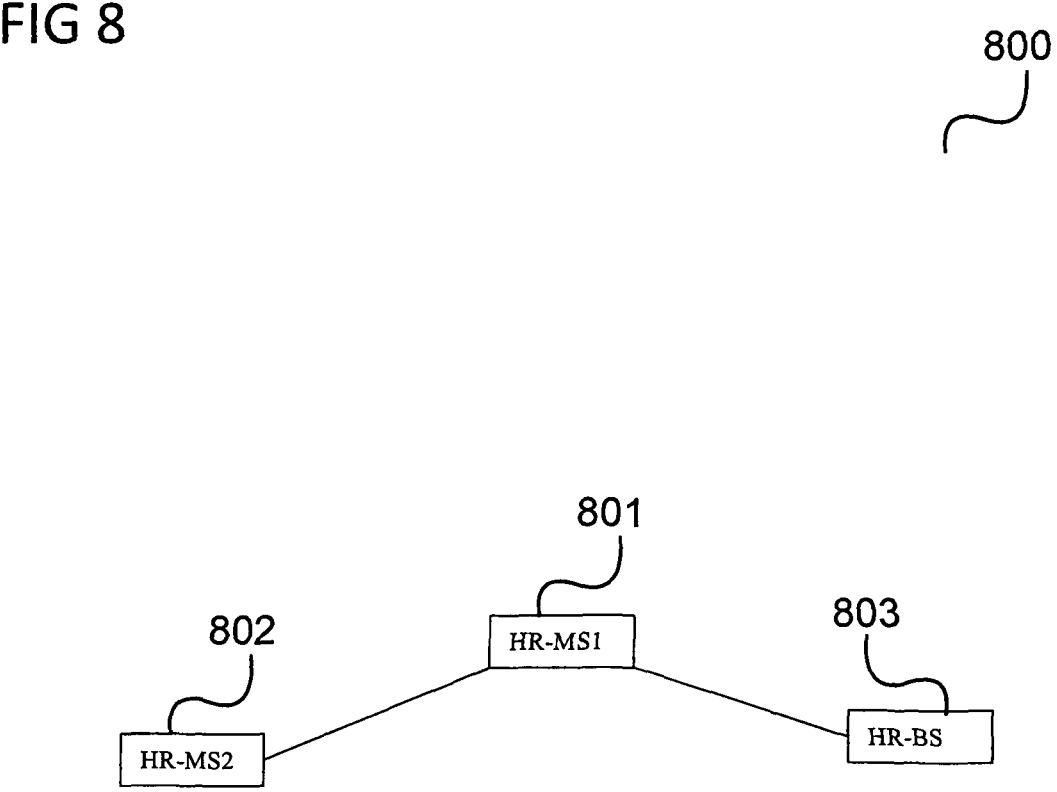
FIG. 8 shows a communication system according to an embodiment.

FIG. 8 shows a communication system 800 according to an embodiment.

The communication system 800 comprises a first mobile terminal (also referred to as HR-MS1) 801, a second mobile terminal (also referred to as HR-MS2) 802 and a communication network (also referred to as network side of the communication system 800) comprising a base station (also referred to as HS-BS) 803 and a backbone network 804. HR-MS1 is inside of coverage of HR-BS while HR-MS2 is outside of coverage of HR-BS. As stated earlier, a mobile station is said to be outside the coverage, or out-of-coverage, of an infrastructure station (HR-BS/HR-RS) if the mobile station cannot directly receive and transmit data and control messages from and to the infrastructure station; this can be due to limitation of the transmitting/receiving capabilities of the two stations and can also be due to either the mobile station or the infrastructure station do not engage in direct transmitting and receiving of data and control messages. The communication system 800 may be referred to as Use case 2.

The communication system 800 is for example a communication system according to an IEEE 802.16 standard.

In normal operation, the base station 803 provides coverage for the mobile terminals 801, 802 such that the mobile terminals 801, 802 can communicate via the base station 803. In some embodiments, the base station 803 may be a relay station.

In an embodiment, HR-MS1 is the forwarding entity, which is responsible for forwarding data and control messages from HR-MS2 to HR-BS and vice versa.

In this embodiment, HR-MS1 actually helps HR-BS extend its coverage. According to the current 802.16n SRD, coverage extension can also be achieved when HR-MS1 changes role to operate at an RS, i.e., not carrying out HR-MS FTN. However, there can be cases when it is not desirable for HR-MS1 to operate as an RS, as doing so may significantly increase the complexity at or the resources consumed by HR-MS1.

Association:

In this embodiment, the forwarding-forwarded relationship can be established as a result of a coverage-extension process, by which a BS-registered HR-MS first broadcasts preambles and network information to enable the out-of-coverage HR-MS to start network entry. Furthermore, as part of the coverage-extension process, HR-BS and BS-registered HR-MS decide, based on HR-MS's current operating conditions and other network conditions, whether to establish HR-MS FTN (with the out-of-coverage HR-MS) or the BS-registered HR-MS should switch role into a relay to support the out-of-coverage HR-MS.

Communication:

Additionally, the bi-directional communication link between the forwarding and forwarded HR-MSs may be enabled by at least one of:
  i) Frame-level synchronization: Forwarding HR-MS periodically broadcasts preamble signals so that forwarded HR-MS can obtain frame-level synchronization (with forwarding HR-MS);
  ii) Link-level synchronization: Forwarding and forwarded HR-MSs achieve OFDMA-symbol-level synchronization through the use of ranging signals;
  iii) Resource allocation/scheduling: The OFDMA resource (in time and frequency domain) for forwarding and forwarded HR-MSs to transmit preamble, ranging, data, and control messages are allocated by HR-BS.

HR-MS FTN Association:
Negotiating FTN Capabilities and Willingness:

When an HR-MS carries out network entry with a HR-BS (or HR-RS), it reports/negotiates FTN capabilities and willingness with the superordinate station. The process is the same as described in the flow chart in FIG. 2.

Coverage Extension:

In this embodiment, as HR-MS2 is outside the coverage of HR-BS, it needs the help of HR-MS1 (the BS-registered HR-BS) to carry out network entry with HR-BS. Obviously, this coverage extension is only possible when HR-MS1 and HR-MS2 are within favorable communication range of each other.

The process of coverage-extension, of which HR-MS FTN association (in Use Case 2) is one of the possible outcomes, comprises of the following steps:
  Under the direction of HR-BS, a BS-registered HR-MS broadcasts preambles, followed by network information, to enable a second nearby HR-MS to start network entry (this second HR-MS is outside the coverage of HR-BS). The broadcasted preambles can be similar, or the same, to those used by BS and RS in DL signaling. The network information should include enough information for out-of-coverage MS to send in initial ranging sequences. At the minimum, this network information includes the set of ranging codes and ranging opportunities (i.e., time and frequency resources within OFDMA frames) that can be used by out-of-coverage HR-MS to start initial ranging and automatic adjustment.
  Upon receiving initial ranging sequences from out-of-coverage HR-MS, the BS-registered HR-MS assists in the process of associating and registering the out-of-coverage HR-MS with BS. During this process, BS-registered HR-MS acts similar to an RS (or a transparent RS as specified in IEEE 802.16j standard).

Setting Up FTN Relationship:

After the out-of-coverage HR-MS has been registered with BS, a decision will be made (by HR-BS) on whether the assisting HR-MS should act as forwarding HR-MS or it should change role to an RS.

The decision on whether a HR-MS should act as forwarding HR-MS (for another HR-MS) can take into account: i) the HR-MS relay and FTN capabilities; ii) whether currently the HR-MS is already acting as forwarding HR-MS, and if yes, then for how many other nodes; iii) the HR-MS's power (battery) level; iii) the interference conditions surrounding the HR-MS.

HR-MS/HR-MS Synchronization:
Frame-Level Synchronization:

When both forwarding and forwarded HR-MSs are able to extract a common timing reference from DL preambles transmitted by BS or RS, in this embodiment, the forwarded HR-MS depends on forwarding MS to provide timing reference. This is achieved by the forwarding HR-MS periodically broadcasting preamble at predefined time.

OFDMA-Symbol-Level Synchronization:

The HR-MS/HR-MS ranging process is similar to what described in FIGS. 5 and 6.

Figure 9:
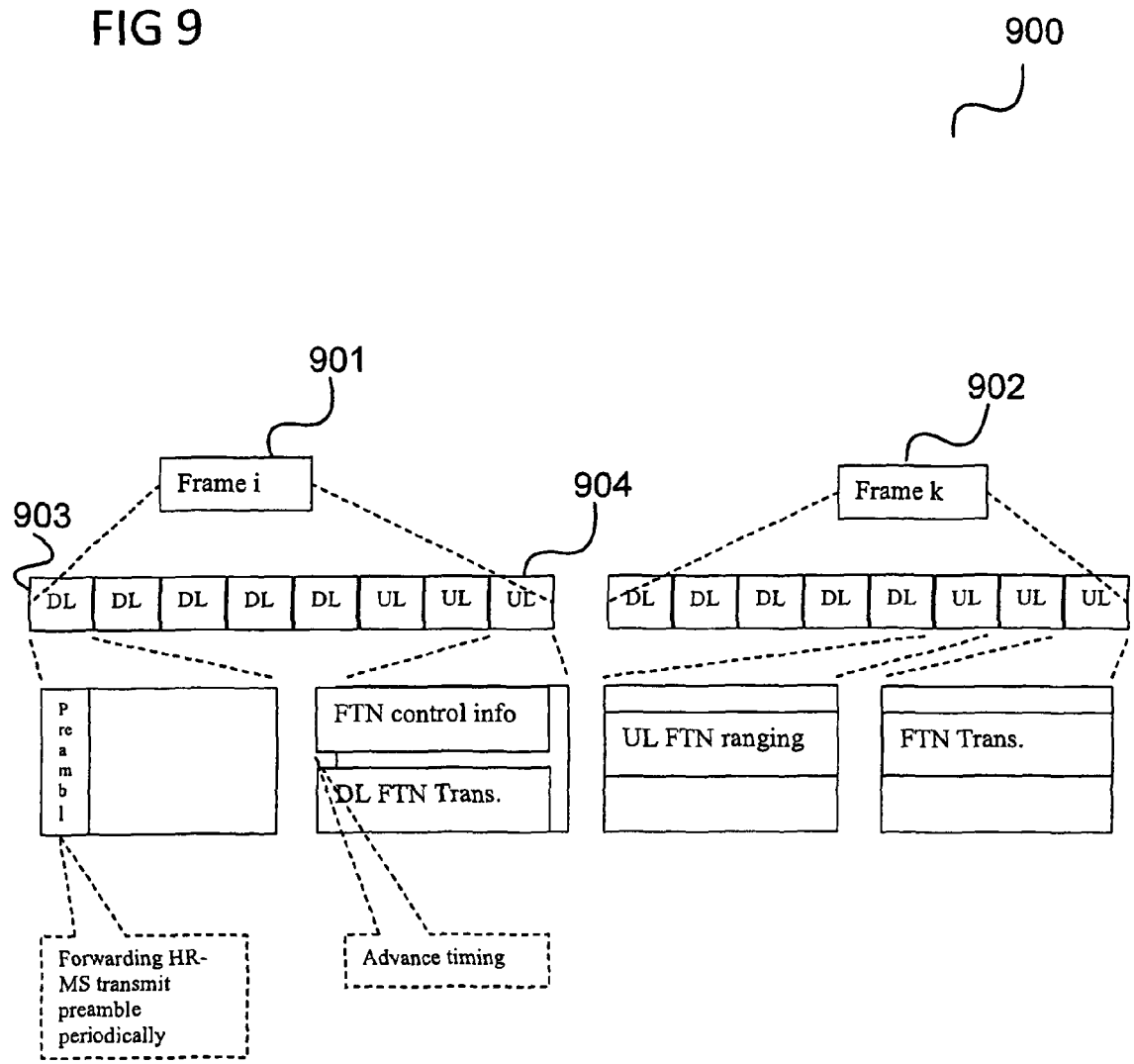
FIG. 9 shows a frame structure that supports FTN ranging and transmission according to an embodiment.

FIG. 9 shows a frame structure that supports FTN ranging and transmission according to an embodiment.

Set of frames 900 includes frame i 801 and frame k 802. Each frame 801 and 802 has downlink (DL) 803 and uplink (UL) 804 transmission areas.

Allocation and Scheduling for the HR-MS/HR-MS Link:

The bandwidth for preamble/ranging transmission and control/data exchange in the bi-directional HR-MS/HR-MS link is allocated/scheduled by HR-BS. The bandwidth can be allocated in either DL or UL transmission area (see the frame structure illustration).

Two approaches exist for scheduling ranging and data transmission in the HR-MS/HR-MS link:
  Separating ranging and data scheduling: BS allocates separate resources for ranging and control/data transmission. There is no predefined dependency between ranging allocation and communication allocation.
  Joint ranging/data scheduling: BS allocates resource for ranging, followed by resource for data transmission after a predefined time interval.

The resource allocation/scheduling information is broadcasted by HR-BS in Assignment A-MAP Information Element for IEEE 802.16m (and in similar control area in a frame in other OFDMA-based technologies). Forwarding HR-MSs need to decode the allocation/scheduling signals for itself as well as for forwarded HR-MS. Subsequently, forwarding HR-MS shall relay the resource allocation/scheduling information toward forwarded HR-MS.

Allocation and Scheduling for the Forwarding HR-MS/HR-BS Link:

The approaches for allocating/scheduling resources and transmitting data in the UL direction from forwarding HR-MS to HR-BS are similar to what specified above.

Frame Structure to Support HR-MS/HR-MS Link:

In this Figure, an embodiment is illustrated as an example of a frame structure in which FTN preamble, ranging and FTN transmissions (between forwarded/forwarding HR-MSs) are carried out. In this particular example, HR-BS schedules forwarding HR-MS to broadcast preamble periodically at the first OFDMA symbol of some frames. The periodicity can be in terms of super-frames.

Figure 10:
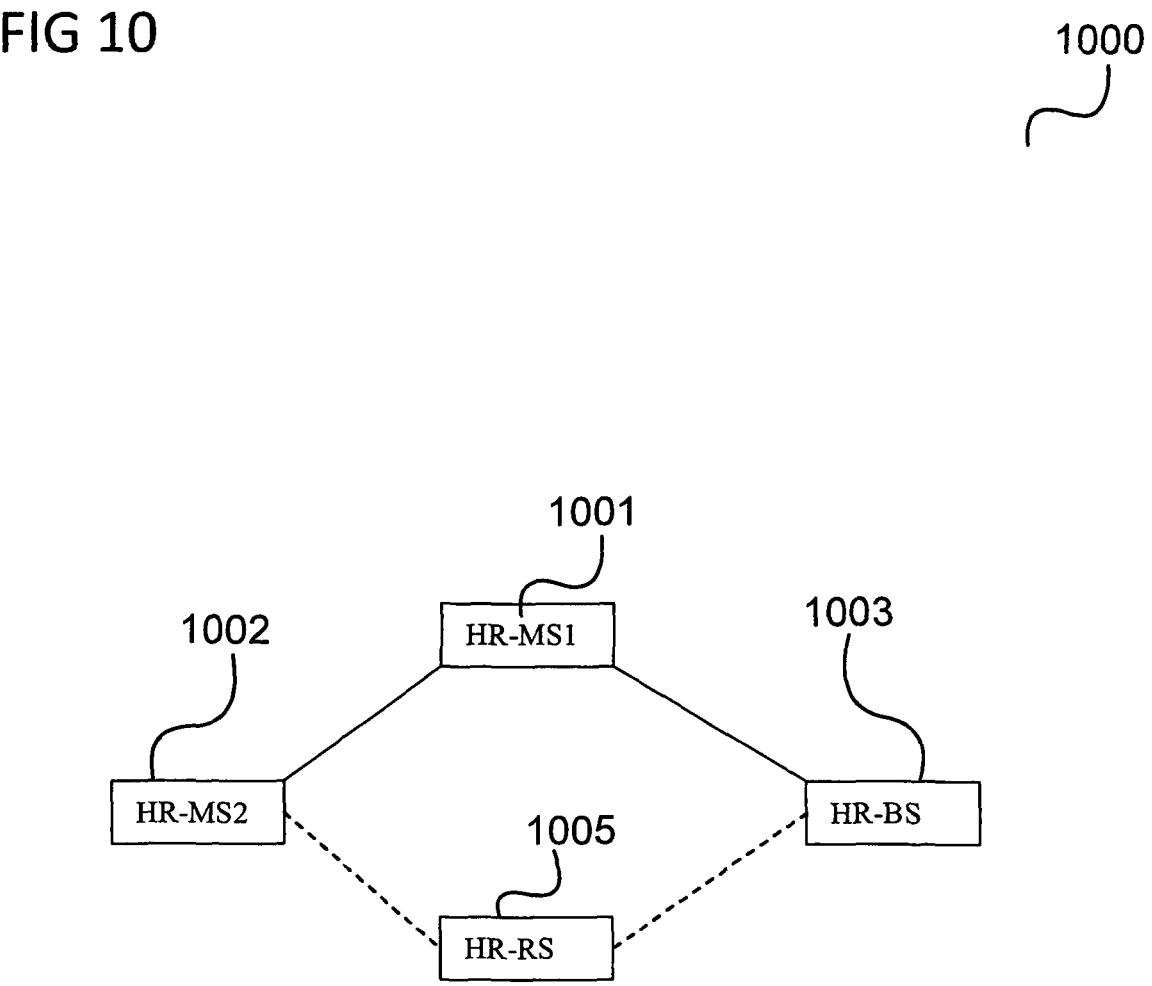
FIG. 10 shows a communication system according to an embodiment.

FIG. 10 shows a communication system 1000 according to an embodiment.

The communication system 1000 comprises a first mobile terminal (also referred to as HR-MS1) 1001, a second mobile terminal (also referred to as HR-MS2) 1002 and a communication network (also referred to as network side of the communication system 1000) comprising a base station (also referred to as HS-BS) 1003, a backbone network 1004, and a relay station (also referred to as HS-RS) 1005.

The communication system 1000 is for example a communication system according to an IEEE 802.16 standard.

In normal operation, the base station 1003 and relay station 1005 provide coverage for the mobile terminals 1001 and 1002 such that the mobile terminals 1001 and 1002 can communicate via the base station 1003 and the relay station 1005.

In an embodiment, the base station 1003 and the relay station 1005 can communicate to each other and one of them may act as an overall coordinator. For such a scenario, the overall coordinator will perform the functionalities specified for HR-BS in the subsequent descriptions.

In an embodiment, HR-MS1 is the forwarding entity, which is responsible for forwarding data and control messages from HR-MS2 to HR-BS and vice versa.

In this embodiment, employing HR-MS FTN may allow HR-MS2 to transmit at lower power, therefore conserve its energy, facilitate frequency reuse, and reduce interference to surrounding users. The use of HR-MS FTN can also enable HR-MS2 to transmit and receive at higher data rate even though it is far away from HR-BS. This is because the links between HR-MS1 and HR-MS2 and the link between HR-MS1 and HR-BS can support higher transmission rates.

Figure 11:
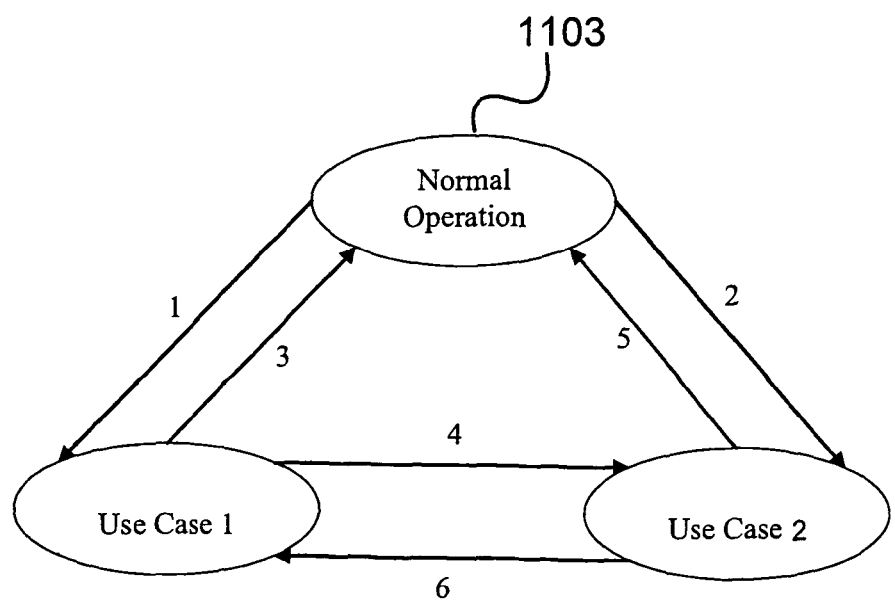
FIG. 11 shows transitions between different operating modes according to an embodiment.

FIG. 11 shows transitions between different operating modes according to an embodiment.

The different operating modes 1100 includes normal operation 1103, Use case 1, and Use case 2

Transitions 1 & 2 (from Normal Operation to FTN Operation):

Transitions from normal operation 1103 to Use case 1 or 2 can be triggered by the outcomes (data collected) from the neighbor discovery process. It can also be due to changes in link, interference, and other operating conditions within the network. The signaling procedure between HR-BS and potential forwarding/forwarded HR-MSs are the same as that described in FIGS. 3 and 8.

Transitions 3 & 4 (from FTN Use Case 1 to Normal & FTN Use Case 2):

Transitions from Use case 1 of HR-MS FTN to either Normal operation 1103 or Use case 2 can be triggered by changes in the link conditions between HR-BS, HR-MS1, and HR-MS2. To detect these changes, idle periods can be scheduled by HR-BS for HR-MS1, HR-MS2 to measure link qualities (e.g. strength of preamble signal from HR-BS and/or strength of sounding signals transmitted by HR-MSs).

Transitions 3, 4 can also be trigged by changes in the operating conditions of forwarding HR-MS. For example, if the battery level of forwarding HR-MS is low, it can signal HR-BS to abandon FTN operation.

Transitions 5 & 6 (from FTN Use Case 2 to Normal & FTN Use Case 1):

Transitions from Use case 1 of HR-MS FTN to either Normal operation 1103 or Use case 2 can be triggered by changes in the link conditions between HR-BS, HR-MS1, and HR-MS2. To detect these changes, idle periods can be scheduled by HR-BS for HR-MS1, HR-MS2 to measure link qualities (e.g. strength of preamble signal from HR-BS and/or strength of sounding signals transmitted by HR-MSs).

Transitions 3, 4 can also be trigged by changes in the operating conditions of forwarding HR-MS. For example, if the battery level of forwarding HR-MS is low, it can signal HR-BS to abandon FTN operation.

Additionally, the above block diagram may be arranged in a different order or manner and is merely a representation of the different operating modes.

Supporting Initial Ranging During Coverage Extension:

As described in FIG. 8, a BS-registered HR-MS can assist another HR-MS that is out-of-coverage of HR-BS to carry out network entry. In doing so, registered HR-MS broadcasts preambles and other necessary network information for the far-away HR-MS to start initial ranging.

In one embodiment where HR-BS and HR-MS are IEEE 802.16-2009 and 802.16m compatible, to enhance the effectiveness of this special ranging process, HR-BS will direct the registered HR-MS to:

A. Transmit the single preamble structure as used in 802.16-2009 (OFDMA-Wireless-MAN) instead of the two level Primary/Secondary Advance Preamble structure as used in 802.16m (Advanced Air Interface).

B. Either signal far-away HR-MS to turn off the random back-off mechanisms of initial ranging, or reduce the back-off window sizes to the minimum. Together with assigned ranging resources (ranging sequences and ranging slots), this signaling about removing/reducing/specifying random back-off should be transmitted immediately after the preamble.

C. Possibly specify OFDMA resources in consecutive frames, sub-frames for sending feedback to far-away HR-MS and receive follow-up adjusted ranging from far-away HR-MS. For example, resources in 4 contiguous frames within a super-frame can be specified such that: first frame is when preamble and network/ranging information is transmitted toward far-away HR-MS; second frame is when far-away HR-MS can transmit its first initial ranging attempt; third frame is to receive feedback, adjustment requests from BS-registered HR-MS; and the last frame is to when far-away HA-MS can transmit second ranging attempt with adjusted parameters. This can be carried out in sub-frame granularity (instead of frame-based) and can consist more than 4 frames/sub-frames.

HR-BS Coordinates UL Ranging and Direct HR-MS/HR-MS Ranging:

While two HR-MSs transmit/receive directly to/from each other, they may concurrently have connections toward their superordinate infrastructure station (HR-BS or HR-RS). In this case, both UL periodic ranging (toward HR-BS/HR-RS) and direct HR-MS/HR-MS ranging need to be carried out. HR-BS/HR-RS can coordinate the two ranging activities as follow:

A. UL periodic ranging is carried out as normal (e.g., as specified in IEEE 802.16-2009, 802.16m-2011). HR-BS/HR-RS also schedule direct HR-MS/HR-MS ranging.

B. If the resultant change in UL timing (due to estimation of time offset from UL periodic ranging) is greater than a predefined threshold, HR-BS/HR-RS will schedule follow-up direct HR-MS/HR-MS ranging, in anticipation that the distance between HR-MSs has significantly changed.

C. The predefined threshold of change in time offset that trigger follow-up direct ranging can be different for different HR-MSs. For example, when HR-MS1 and HR-MS2 engage in direct communication (including the case of HR-MS FTN), if HR-MS1 is closer to HR-BS, then the predefined threshold for HR-MS1 is smaller or equal to the predefined threshold for HR-MS2 (assuming HR-MS2 is within coverage of HR-BS/HR-RS and also carries out UL periodic ranging).

In the above discussion of coordinating UL periodic ranging and direct HR-MS/HR-MS ranging, the underlying assumption is that, if an HR-MS is within the coverage of an HR-BS (or HR-RS), all its direct ranging/data/control transmission toward another HR-MS will be scheduled in UL sub-frames and will obey the timing advance as required for other UL transmissions toward HR-BS/HR-RS. In other words, if to transmit to HR-BS, HR-MS has a UL timing advance of T (so that its UL signal is synchronized at HR-BS), then this timing advance will also be used when this HR-MS transmits directly to another HR-MS.

Supporting Network-Coding During HR-MS FTN:

In HR-MS FTN, forwarding HR-MS can carry out network-coding with the following specifications:

A. HR-MS FTN transmissions are scheduled in UL sub-frames of HR-BS/HR-RS.

B. Forwarding HR-MS transmits to forwarded HR-MS using the same timing advanced as required by UL transmissions toward HR-BS (or HR-RS). This allows HR-BS to be able to receive the messages transmitted from forwarding HR-MS toward forwarded HR-MS.

C. When forwarding HR-MS has two packets, one from HR-BS and need to be transmitted to forwarded HR-MS, and the other from forwarded HR-MS and need to be transmitted to HR-BS, forwarding HR-MS can carry out network coding over these two packets (e.g., using exclusive OR X-OR operation).

D. HR-MS then transmits the network-coded packet to both HR-BS and forwarded HR-MS.

E. Network-coding can be specified when the direct link between HR-MS/HR-MS is established; it can also be done in an opportunistic way, as and when possible at forwarding HR-MS. In such an opportunistic scenario, some control field will be added into a MAC PDU (protocol data unit) to signify network-coding operation.

Supporting Opportunistic Relaying During HR-MS/HR-MS Direct Communications:

When two HR-MSs who are within the coverage and control of a single infrastructure station (HR-BS/HR-RS) carry out direct communications, opportunistic relaying can be implemented at HR-BS/HR-RS as follows:

A. HR-MS direct transmissions are scheduled in UL sub-frames of HR-BS/HR-RS.

B. Each HR-MS transmits to the other HR-MS using the same timing advance as required by UL transmissions toward HR-BS (or HR-RS). This allows HR-BS to be able to receive (overhear) the messages transmitted from one HR-MS toward another HR-MS. This is also possible as HR-BS/HR-RS is the one who schedule resource for the direct link, and therefore know when to overhear the direct HR-MS transmissions.

C. HR-BS/HR-RS forwards the overheard messages to the desired HR-MS opportunistically.

In one embodiment, it can be specified that, if a direct transmission from an HR-MS to another HR-MS is unsuccessful and the HR-BS/HR-RS happens to receive the message, then HR-BS/HR-RS will be the node to carry out retransmission of this message.

Supporting Opportunistic HR-MS FTN:

Opportunistic HR-MS FTN may be defined as an operation in which there is no strict forwarding-forwarded association between HR-MSs. Instead, an HR-MS can opportunistically overhear UL transmissions from another and forward the overhead messages to the corresponding HR-BS/HR-RS. This can be implemented as follows:

A. HR-MSs carry out neighbor discovery and adjust their reception time to overhear packets transmitted by neighbors.

B. HR-MSs forward overheard packets toward HR-BS, when transmissions from the source HR-MS are subjected to prolong erroneous link conditions.

The various embodiments provide a method to support HR-MS forwarding in IEEE 802.16n. The various embodiments provide solutions for when the forwarded HR-MS is inside and also when the forwarded HR-MS is outside of the BS coverage. The various embodiments provide a framework to establish the forwarding-forwarded association between forwarding and forwarded HR-MS; to enable the bi-directional communication link between forwarding and forwarded HR-MS; and to support mode switching due to changes in network conditions.

| Term | Definition |
| --- | --- |
| BS | Base station |
| HR-BS | High Reliability Base Station. HR is used to refer to all stations that conform to the IEEE 802.16n standard |
| MS | Mobile station |
| HR-MS | High Reliability Mobile Station. HR is used to refer to all nodes that conform to the IEEE 802.16n standard |
| HR-MS1 | This is the forwarding HR-MS |
| HR-MS2 | This is the forwarded HR-MS |
| RS | Relay Station |
| HR-RS | High Reliability Relay Station. HR is used to refer to all nodes that conform to the IEEE 802.16n standard |
| FTN | Forwarding to Network, used to refer to operation in which one HR-MS helps forwarding data and control messages between another HR-MS and an infrastructure stations (HR-BS or HR-RS) |
| SRD | System Requirement Document. A document provided by the standard stating what is required for the new standard. |
| STID | Station Identifier Number |
| A-MAP | A map of the resource (frequency, time) allocated to each station for downlink and uplink connections towards the controlling station which may either be the HR-BS or HR-RS |

Supporting Coverage Extension in an 802.16m-based network:

In an embodiment, supporting coverage extension is based on transmitting 802.16m-2011 advance preambles together with network information.

Figure 12:
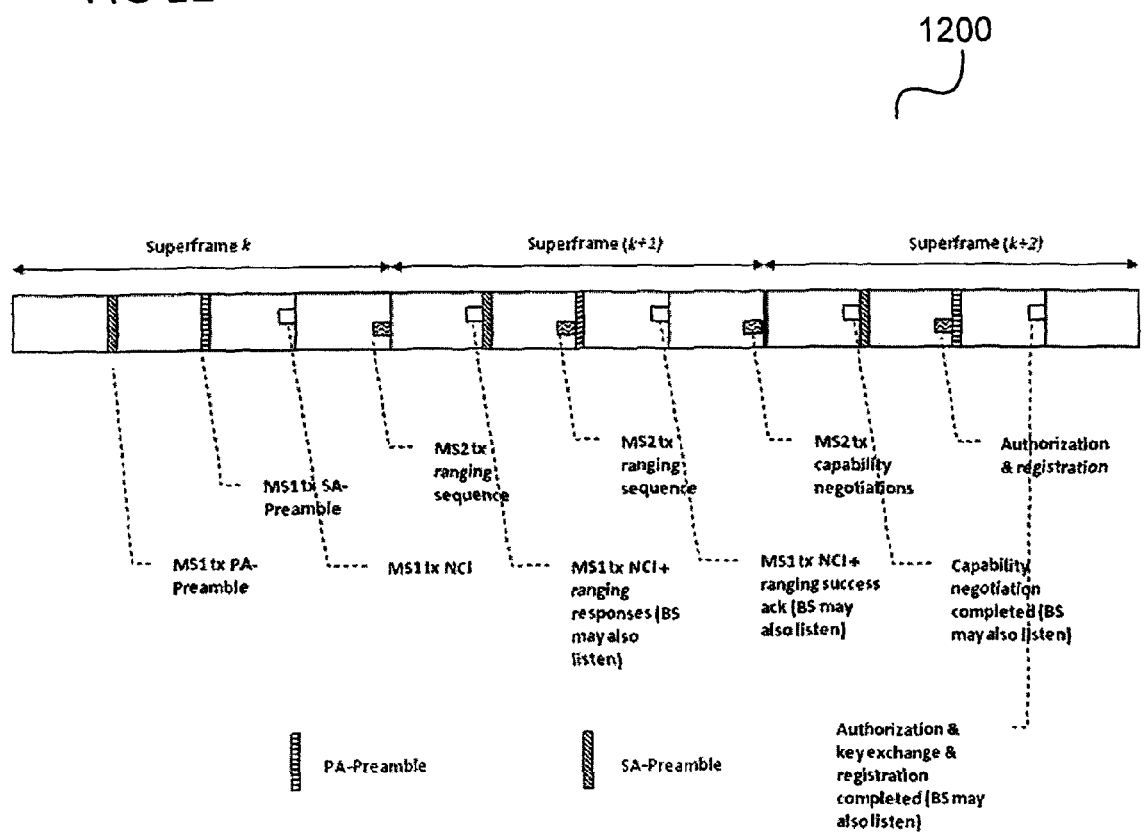
FIG. 12 shows a 802.16m-based coverage extension process according to an embodiment.

FIG. 12 illustrates a 16m coverage extension process according to an embodiment. The sequence of signaling exchanges 1200 spans superframe k, superframe k+1, and superframe k+2. Note that 1200 is for illustration purpose, and the sequence of signaling exchanges in the embodiment may span more or less number of consecutive superframes.

16m Coverage Extension Process:

This process, termed 16m coverage extension process, comprises of the following main steps:

A. BS schedules a registered MS (denoted MS1) to transmit Primary Advanced preamble (PA-preamble) and Secondary Advanced preamble. The PA-preamble is transmitted in the 2nd frame of a super-frame while the SA-preamble is transmitted in the 3rd frame of the super-frame.

B. After transmitting the SA-preamble, MS1 also transmits essential network configuration information (NCI) that enables another MS (denoted MS2) who is out-of-coverage of BS to obtain necessary configuration information to start sending a ranging signal toward MS1.

C. MS1, upon receiving the ranging signal from MS2 will exchange control messages with MS2 so that MS2 can carry out further ranging and automatic adjustments (if needed) and achieve time/frequency/power synchronization with MS1.

D. After MS2 has achieved synchronization with MS1, MS1 subsequently helps MS2 to carry out the rest of the network entry procedure with BS, including capability negotiations, authorization and authentication, and registration.

In the above 16m coverage extension process, upon receiving the SA-preamble transmitted by MS1, MS2 shall be able to recognize that this preamble is in fact transmitted by a forwarding MS, and not by a BS/RS or a Femtocell BS. In one embodiment, a set of SA-preambles that can be transmitted by MS1 in the 3rd frame of each super-frame shall be pre-defined and shall not overlap with the set of SA-preambles that can be transmitted by a BS/RS or a Femtocell BS during the 3rd frame of each super frame.

In the above 16m coverage extension process, upon receiving the SA-preamble transmitted by MS1, MS2 shall be able to know where to listen for the subsequent NCI (network configuration information) transmitted by MS1. This can be achieved by MS1 always transmitting NCI at a fixed time/frequency location relative to the location of the SA-preamble. In one embodiment, that fixed location for NCI is within the last sub-frame of the frame in which the SA-preamble is transmitted.

Another way to allow MS2 to determine the location of the NCI is by establishing a predefined one-to-one mapping between the way MS1 transmits the SA-preamble and the location of NCI. As an example, a function that maps the tuple [SA-preamble index, SA frequency segment index] to the location of NCI can be predefined.

In the above 16m coverage extension process, BS can schedule multiple registered MSs to transmit PA/SA preambles and perform subsequent forwarding activities. In that case, an out-of-coverage MS2 may be able to receive PA/SA preambles transmitted by different registered MSs. At the same time, these registered MSs may transmit NCI at the same or different time/frequency locations.

In one embodiment, all the above registered MSs shall transmit the same NCI at the same location. In that case, out-of-coverage MS2 can perform diversity combining to enhance the reception of the common NCI.

In another embodiment, different registered MS can transmit different NCI at different locations. In that case, MS2 shall select the one it wants to receive. This selection can be based on the signal strength of the SA-preambles being received by MS2. For example, if the signal strength of the SA-preamble transmitted by registered MS1 is stronger than that of the SA-preamble transmitted by registered MS1', then out-of-coverage MS2 can choose to listen to the NCI transmitted by MS1 only.

In the above 16m coverage extension process, the NCI transmitted by MS1 shall contain enough information for MS2 to configure its transceiver and start sending a ranging signal toward MS1. The NCI shall include configurations selected from what specified in the IEEE 802.16m-2011 Superframe Header Subpackets 1, 2 and 3.

The NCI shall also specify the set of ranging sequences and ranging channels for MS2 to transmit ranging signal toward MS1. To cater for the case when MS2 receives multiple SA-preambles from multiple registered MSs, the NCI can contain a mapping between SA-preamble sequence to the allocated ranging sequences and ranging channels. This mapping can also be pre-defined in advance, and therefore need not be specified in the NCI message.

After decoding the NCI and configure its transceivers, MS2 can transmit ranging signal toward MS1. This can be done with or without backoff and with or without random selection of ranging sequences and ranging channels.

In the above 16m coverage extension process, MS1 can listen on the allocated ranging channels to detect if any out-of-coverage MS tries to transmit ranging signal for network entry. If MS1 detects some signal is transmitted (either successful or with collision) MS1 shall broadcast a ranging response message in a subsequent pre-define time/frequency location. In one embodiment, MS1 can transmit NCI together with the ranging response message.

MS2, upon receiving the ranging responses from MS1, can carry out necessary actions to achieve time/frequency/power synchronization with MS1. After that, MS1 subsequently helps MS2 to carry out the rest of the network entry procedure with BS, including capability negotiations, authorization and authentication, and registration.

Note that the resources for MS1 and MS2 to transmit control/data signaling are assigned by BS. To further conserve bandwidth spent for coverage extension, BS can carry out the following dynamic allocation approach:

A. BS first allocates resources (PA/SA preambles, OFDMA resources, and ranging sequences, channels) for MS1 to broadcast preambles, NCI, and receive, response to ranging signal (from out-of-coverage MSs) for only a few frames. For example, in FIG. 13, resources can be allocated so that MS1 can receive and response to the first ranging signal from MS2 (i.e., at the 4th frame after the PA-preamble is transmitted).

B. BS then listens on the channel in which MS1 is supposed to transmit a ranging response to MS2. If there is no signal transmitted by MS1, BS can conclude that there is no out-of-coverage MS near to MS1 and therefore stop the resource allocation.

C. However, if BS detects a ranging response message sent by MS1 toward MS2, it will be able to determine how much extra resources need to be further reserved.

For the above 16m coverage extension process, the PA-preamble transmitted by registered MS1 can be the same as that transmitted by the BS.

For the above 16m coverage extension process, to ensure that the subset of SA-preambles that can be transmitted by an MS (like registered MS1) does not overlap with the subset of SA-preambles being transmitted by the infrastructure stations (BS, RS, Femto BS), in one embodiment, the SA-preamble set can be partitioned through setting the 20-bit field "SA_Preamble Partition for BS type" in the AAI-SCD message specified in 802.16m (or the corresponding message to be specified in 802.16n). In particular, the 20-bit field "SA_Preamble Partition for BS type" is set so that the last index of the preamble sequence corresponding to cell type "CSG-closed femto ABSs" is equal $x<255+256*n$ ($n=0$, or 1, or 2 is the index of the SA-preamble carrier set). Then, the set of SA-Preambles with index in between $(x+1)$ and $255+256*n$ can be used by an MS.

As an alternative, the subset of SA-preambles transmitted by an MS (like registered MS1) in the above 16m coverage extension process can overlap with those transmitted by infrastructure stations (BS, RS, Femto BS). In that case, an out-of-coverage MS (like MS2) can still recognize an SA-preamble transmitted by an MS by examining how the SA-preamble appears over time. In particular, preambles transmitted by an infrastructure station shall appear in pattern of [SA-preamble (beginning of $1^{st}$ frame)/PA-preamble (beginning $2^{nd}$ frame)/SA-preamble (beginning of $3^{rd}$ frame)/(possible SA-preamble (beginning of $4^{th}$ frame)]. On the other hand, preambles transmitted by an MS shall appear with a different pattern of [(No such SA-preamble in the $1^{st}$ frame)/PA-preamble (beginning $2^{nd}$ frame)/SA-preamble (beginning of $3^{rd}$ frame)/(no such SA-preamble in the $4^{th}$ frame)]. In other words, there will be no SA-preamble transmitted by MS in the $1^{st}$ and $4^{th}$ frames of each super-frame. With this distinction, a receiving out-of-coverage MS can recognize whether an SA-preamble is transmitted by a registered MS.

As an alternative, an out-of-coverage MS can verify whether an SA-preamble is transmitted by an MS by searching for the NCI field that is supposed to follow the SA-preamble (if it is indeed transmitted by an MS). This, again, allow the subset of SA-preambles transmitted by an MS to overlap with those transmitted by infrastructure stations.

For the above 16m coverage extension process, in one embodiment, the segment index and preamble index of SA preamble are different from that of the SA preamble broadcasted by BS. BS can select this segment and preamble indices taking into account the SA preambles transmitted by other stations within the cell.

For the above 16m coverage extension process, as described in an earlier embodiment, one way for an out-of-coverage MS to know the location of the NCI (Network Configuration Information) after receiving an SA-preamble transmitted by an inside-of-coverage MS is through a pre-defined mapping of [SA-preamble_index, SA_frequency_segment_index] to the location of NCI. By location of NCI, reference is made to the following:

The exact time (i.e., beginning of sub frame) in which the NCI is transmitted;

The type of the sub frame in which the NCI is transmitted, i.e., how many OFDMA symbols there are in that sub frame;

The PHY subcarrier configuration (permutation) of the Logical Resource Units (LRUs) that are used to carry the NCI.

In one embodiment, the NCI can be transmitted in the last sub frame of a frame in which an SA-preamble is transmitted by an MS. From [SA-preamble_index, SA_frequency_segment_index], the out-of-coverage MS then needs to identify the OFDM Cyclic Prefix (possible values are 1/16, 1/8, 1/4), the time-gap between the first OFDMA symbol in which SA-preamble is transmitted and the beginning of the last sub frame (depending on values of DL Offset and TTG, RTG), and the type of the sub frame. These parameters can be communicated by first partitioning the set of frame configurations in Table 800, 801, and 802 of IEEE 802.16m-2011 into different groups, and assigning to each group a particular (subsets) of [SA-preamble_index, SA_frequency_segment_index].

For the above 16m coverage extension process, the NCI can be transmitted in the same DL subframe in which the registered MS transmits the SA-preamble. With that, [SA-preamble_index, SA_frequency_segment_index] can still be used to determine important OFDMA configuration such as Cyclic Prefix, and type of subframe.

Given a choice of subframe in which the NCI is to be transmitted, the PHY subcarrier configuration of the LRUs carrying the NCI shall be determinable for the out-of-coverage MS. In one embodiment, the NCI shall always be transmitted using a fixed set of DLRUs (Distributed LRUs) within the chosen subframe. Note that the configuration of these DLRUs may not be the same as that specified by the serving BS for normal BS-MS communications. In that case, the BS shall not schedule any normal transmission in any LRU containing any subcarrier occupied by the NCI.

If there is a need for different registered MSs to transmit NCI in different sets of DLRUs, each of these sets shall be determinable from the combination [SA-preamble_index, SA_frequency_segment_index]. In one embodiment, each of the sets of DLRUs is determined based on the IDCELL value corresponding to the SA preamble transmitted by each registered MS. Note that according to 802.16m, IDCELL=256*n+Idx, where n=0, 1, 2 is the SA-preamble subcarrier segment index and Idx is the index of the transmitted SA preamble within the segment ([3]).

As an alternative to what specified in the above 16m coverage extension process, BS can schedule a registered MS to transmit PA/SA preambles for multiple super-frames before transmitting the NCI. After the NCI is transmitted, the subsequent operations as described in A.II.1 or in this section shall apply.

As described in the above 16m coverage extension process, the transmitted NCI contains information on how an out-of-coverage MS can transmit ranging signal toward the potential forwarding (registered) MS. In general, to minimize switching complexity, the LRUs allocated for ranging (of out-of-coverage MS) should be allocated in a different frame compared to that of the NCI. In one embodiment, ranging opportunities can be scheduled in the $4^{th}$ frame of the superframe in which the registered MS transmit PA/SA preambles.

BS shall also schedule resource for the potential forwarding MS to respond to the ranging signal from outside-of-coverage MS. This resource shall be allocated in some of the UL subframes within the $2^{nd}$ and $3^{rd}$ frames of the superframe. The information regarding this acknowledgement channel shall also be included in the NCI. BS may also listen on the LRUs scheduled for potential forwarding MS to respond to out-of-coverage MS. If BS overhears that MS tries to response to some other MS, BS may schedule extra resources in subsequent superframe for this activity.

The ranging channel for out-of-coverage MS may follow the same UL PHY structure as that specified by the serving BS. This configuration is also transmitted to out-of-coverage MS through NCI.

Upon receiving a decodable ranging signal from an out-of-coverage MS in the scheduled ranging channel, a registered MS shall transmit acknowledgement (ACK) message to inform the out-of-coverage MS of the ranging status (i.e., similar to those status of success/continue/abort defined in 802.16m). This should be transmitted using the same timing advance value as if the forwarding MS transmits to the serving BS. This ACK message can be scheduled dynamically in a UL sub frame, and can be signaled toward the out-of-coverage MS through NCI.

After the initial ranging process has been completed, the registered MS can forward a CDMA Allocation AMAP IE (similar to the AAI CDMA Allocation AMAP IE in 802.16m) to allocate bandwidth for the out-of-coverage MS to send in ranging request message (similar to the AAI-RNG-REQ in 802.16m). As different registered MS can transmit different CDMA Allocation AMAP IEs for different out-of-coverage MS, these messages shall be differentiated based on Random Access ID, (RA-ID, similar to that specified in 802.16m), which is derived from the way out-of-coverage MS transmitting ranging code toward registered MS.

Note on the cell-search operation of an out-of-coverage MS:

An MS starts searching for PA/SA preambles in a normal manner, i.e., following the pattern of [SA-PA-SA-[ignored]] for each superframe. The MS would most likely look for a PA preamble first before looking for SA preamble.

After the first capture of PA followed by SA preambles, the MS should assume that these are normal preambles transmitted by a BS. It then continues to look for the SA preamble at the beginning of the next superframe. At this point, if the SA preamble detected in the $3^{rd}$ frame of the previous superframe does not match the current SA preamble, the MS shall conclude that the previous SA preamble was in fact transmitted by an MS.

As an alternative to what specified in the above 16m coverage extension process, the registered MS can transmit PA-preamble in location other than the beginning of $2^{nd}$ frame of a superframe.

As an alternative to what specified in the above 16m coverage extension process, the registered MS can transmit SA-preamble in location other than the beginning of $3^{rd}$ frame of a superframe.

For what have been specified in the above 16m coverage extension process, and subsequent alternatives, the NCI can be transmitted in the following way:

The registered MS breaks the NCI into multiple sub-packets, i.e., sub-NCIs.

The location of the first sub-NCI (termed Initial NCI, or I-NCI) is determinable from PA/SA-preambles transmitted by the registered MS.

The location of a subsequent sub-NCI (termed Supplementing NCI, or S-NCI) can be determinable from the transmitted PA/SA-preambles and the contents of those sub-NCIs (including the I-NCI) that have been previously transmitted.

The sub-NCIs can be transmitted in the same or different frames, and in either downlink or uplink areas of a frame.

In one embodiment, the I-NCI is placed in the last sub frame of the frame in which the registered MS transmits an SA-preamble. For that, the specific location of the I-NCI can be:

The last 4 physical resource units (PRUs) of all $N_{PRU}$ available PRUs in the operating channel, e.g., $N_{PRU}=24$ for 5 Mhz channel, 48 for 10 Mhz, and 96 for 20 Mhz channel (IEEE 802.16m Draft 12, 2011). Furthermore, these PRUs shall follow localized sub band permutation (refer to IEEE 802.16m Draft 12, 2011 for details).

At a predefined uplink Distributed Logical Resource Units (DLRUs). From the point of view of an out-of-coverage MS attempting to decode the I-NCI, the UL sub frame in which I-NCI is located has only one frequency partition FP0. All $N_{PRU}$ in this sub frame are distributed LRUs. The permutation and frequency partition of this sub frame can be described by USAC=0 (all minibands without sub band), UFPC=0 (reuse 1 only), $UCAS_{SB,0}=0$ (no sub band CRU allocated), and $UCAS_{MB,0}=0$ (no miniband CRU allocated). The I-NCI, in this case, occupies a predefined set of $N_{I-NCI}$ DLRUs of this sub frame. Furthermore, the tile permutation of this sub frame is carried out as defined in 16.3.7.3.2 (IEEE 802.16m Draft 12, 2011), with the IDcell being calculated in a modified way as:

$$IDcell=256\ mod(n+a,3)+mod(Idx+b,256),$$

where Idx is the preamble index and n is the Preamble subcarrier set index of the SA-Preamble transmitted by the registered MS; a, b are known constant, for example a=b=1.

In another embodiment, the I-NCI is placed in the same DL sub frame in which the registered HR-MS transmit SA-preamble. For that, the specific location of the I-NCI can be:

The last 4 physical resource units (PRUs) of all $N_{PRU}$ available PRUs in the operating channel (e.g., $N_{PRU}=24$ for 5 Mhz, 48 for 10 Mhz, and 96 for 20 Mhz channel). Furthermore, these PRUs shall follow localized sub band carrier permutation (refer to IEEE 802.16m Draft 12, 2011 for details).

At a predefined downlink Distributed Logical Resource Units (DLRUs). The I-NCI spans the last 5 OFDM symbols, which form a type-3 sub frame within the first sub frame. From the point of view of an out-of-coverage MS attempting to decode I-NCI, the DL sub frame in which I-NCI is located has only one frequency partition FP0. All $N_{PRU}$ in this sub frame are distributed LRUs. The permutation and frequency partition of this sub frame can be described by DSAC=0 (all minibands without sub band), DFPC=0 (reuse 1 only), $DCAS_{SB,0}=0$ (no sub band CRU allocated), and $DCAS_{MB,0}=0$ (no miniband CRU allocated). The I-NCI occupies the last $N_{I-NCI}$ DLRUs of this sub frame. Furthermore, the subcarrier permutation of this sub frame is carried out as defined in 16.3.7.3.2 (IEEE 802.16m Draft 12, 2011), with the IDcell being calculated in a modified way as:

$$IDcell=256\ mod(n+a,3)+mod(Idx+b,256),$$

where Idx is the preamble index and n is the Preamble subcarrier set index of the SA-Preamble transmitted by the registered MS; a, b are known constant, for example a=b=1.

In another embodiment, the I-NCI is placed in the first sub frame of the first superframe that follows a superframe in which the registered MS transmit SA-preamble. In this sub frame, BS also transmit superframe header (SFH). The I-NCI shall span the last 5 OFDM symbols, which form a type-3 sub frame within the first sub frame. From the point of view of an out-of-coverage MS attempting to decode I-NCI, the DL sub frame in which I-NCI is located has only one frequency partition FP0. All $N_{PRU}$ in this sub frame are distributed LRUs. The permutation and frequency partition of this sub frame can be described by DSAC=0 (all minibands without sub band), DFPC=0 (reuse 1 only), $DCAS_{SB,0}=0$ (no sub band CRU allocated), and $DCAS_{MB,0}=0$ (no miniband CRU allocated). The I-NCI occupies the last $N_{I-NCI}$ DLRUs of this sub frame. Furthermore, the subcarrier permutation of this sub frame is carried out as defined in 16.3.7.3.2 (IEEE 802.16m Draft 12, 2011), with the IDcell being calculated in a modified way as:

$$IDcell=256\ mod(n+a,3)+mod(Idx+b,256),$$

where Idx is the preamble index and n is the Preamble subcarrier set index of the SA-Preamble transmitted by the registered HR-MS; a, b are known constant, for example a=b=1.

In one embodiment, SA-preamble shall be allocated to registered HR-MS so that, given the predefined values of constants a and b, the IDCell calculated using the above equations is equal the IDCell of the HR-BS.

Upon receiving a ranging signal from some MS, a registered MS can report the ranging reception to the BS before responding to (the node that transmits) the ranging signal. If the BS receives reports from multiple MSs, the BS can pick a subset of the receiving MSs to respond to the ranging signal(s). The decision of BS, in choosing a registered MS to respond to the ranging signal, can be based on the measurements sent in the reports from different MS.

For what specified above, the NCI can specify several ranging opportunities (ranging sequences and ranging channels) so that, after transmitting a ranging signal and not receiving a response/acknowledgement before some predefined time-out period, a new (out-of-coverage) MS can retransmit another ranging signal.

Operation of 802.16m-Based HR-MS Forwarding to Network:

One or more embodiments support HR-MS forwarding to network under on 802.16m-2011 TDD baseline and comprises of the following main activities:

The forwarding HR-MS periodically transmits PA-Preamble in the first OFDMA symbol of the $2^{nd}$ frames of some super-frames and SA-Preamble in the first OFDMA symbol of the $3^{rd}$ frames of some super-frames. The periodicity in which PA/SA-Preambles are transmitted shall be made known to the forwarded HR-MS;

The forwarding HR-MS periodically transmits S-NCI in some predefined resource location within some UL subframes. The resource location and periodicity of S-NCI transmission shall be made known to the forwarded HR-MS;

The transmission of I-NCI by the forwarding HR-MS can be signaled to the forwarded HR-MS in advanced in the S-NCI or in a control message. When scheduled, I-NCI shall be transmitted in the same way that is used to transmit I-NCI for the network entry process of an outside-of-coverage HR-MS;

A forwarding control channel called Forwarding MAP (F-MAP) is transmitted by forwarding HR-MS and contains OFDMA resource allocations related to the forwarded HR-MSs. The location of F-MAP can be fixed for each forwarding HR-MS, or it can be signaled in the S-NCI or in a control message;

The forwarding HR-MS specifies resource allocations for its attached forwarded HR-MSs in the F-MAP based on relevant resource allocation and/or control signaling from HR-BS/RS;

The forwarded HR-MS reads the F-MAP, recognizes OFDMA resources allocated for its transmission/reception and carries out the corresponding activities;

All of the above communications, apart from the transmission of I-NCI, follow the subcarrier resource mapping of the HR-BS. The transmission of I-NCI may or may not follow the subcarrier resource mapping of the HR-BS.

For the transmission of PA/SA-Preambles by the forwarding HR-MS:

In one embodiment, the forwarding HR-MS transmits PA-Preamble in the first symbol of the $2^{nd}$ frame and transmits SA-Preamble in the first symbol of the $3^{rd}$ frame of every super-frame as long as it has an attached forwarded HR-MS;

In another embodiment, the forwarding HR-MS transmits A/SA-Preambles once every Tp super-frames, where Tp>1;

In another embodiment, the forwarding HR-MS transmits PA/SA-Preambles in an alternating fashion. In particular, in one super-frame, the forwarding HR-MS transmits PA-Preamble in the first symbol of the $2^{nd}$ frame while in the next super-frame, the forwarding HR-MS transmits SA-Preamble in the first symbol of the $3^{rd}$ frame and the alternating pattern continues;

In another embodiment, the forwarding HR-MS periodically transmits only PA-Preambles and not SA-Preambles (with the possible periodicity as specified above);

In another embodiment, the forwarding HR-MS periodically transmits only SA-Preambles and not PA-Preambles (with the possible periodicity as specified above);

The HR-BS can direct the forwarding HR-MS to switch between different patterns of transmitting PA/SA-Preambles as described in the above embodiments. Such pattern switching shall be made known to the forwarded HR-MS.

For the transmission of S-NCI by the forwarding HR-MS:

The content of S-NCI transmitted during forwarding to network operation, i.e., when there is at least one forwarded HR-MS attached to the forwarding HR-MS, can be different from the content of S-NCI transmitted to assist network entry of an outside-of-coverage HR-MS; the S-NCI in this case can be named differently, e.g., P-NCI (Periodic NCI).

In the time domain, the S-NCI spans the last 5 OFDMA symbols of the allocated uplink sub-frame;

In the frequency domain, S-NCI occupies a number of contiguous Logical Resource Units (LRUs), the LRUs occupied by S-NCI are either signaled in I-NCI or a control message sent to forwarded HR-MS.

In one embodiment, S-NCI is transmitted in a number of contiguous uplink (UL) Distributed Logical Resource Units (DLRU) that follow those DLRUs reserved for UL control channels of the MS-BS connections. When the number of DLRUs reserved for UL control channels changes, which leads to change to the location of S-NCI, the forwarding HR-MS shall inform the change to forwarded HR-MS in advanced. One way to do so is through some field in the S-NCI message itself;

In another embodiment, S-NCI can be transmitted in some Continuous Logical Resource Units (CLRUs).

The forwarding HR-MS shall transmit I-NCI in the following situations:

When there are changes in system configurations that can affect the forwarding operation. Examples of these changes are changes to frame configuration, OFDMA sub-carrier mapping;

When the HR-BS/RS wants the forwarding HR-MS to participate in another round of coverage extension process, i.e., to help another outside-of-coverage and not associated HR-MS to start network entry. In this situation, if there is no change to the system configurations, the existing forwarded HR-MSs may not need to be aware of the transmission of I-NCI.

For the transmission of F-MAP by forwarding HR-MS:

F-MAP spans the last 5 OFDMA symbols of the sub frame in which it is transmitted;

The F-MAP is located in a number of contiguous Logical Resource Units (LRUs) of which the location can be determined from the location of the S-NCI and/or some fields in the S-NCI and/or from a control message sent to the forwarded HR-MS.

Within each sub frame in which F-MAP is transmitted, F-MAP region can be divided into one or multiple F-MAP blocks, each occupies a number of contiguous LRUs. F-MAP blocks can be received and decoded independently from each other.

The F-MAP can be skipped in a particular frame.

The transmission resources allocated to the forwarded HR-MS is signaled and interpreted in the following way:

For messages transmitted in the DL from HR-BS to forwarded HR-MS:

When HR-BS wants to transmit a DL message to the forwarded HR-MS, it specifies a DL Assignment A-MAP IE using the format as defined in 802.16m standard (Section 16.3.5.5.2.4 of IEEE 802.16m-2011, IEEE published standard); the HR-BS uses the STID assigned to the forwarded HR-MS (after successful network entry) to identify the DL Assignment A-MAP IE, i.e. through CRC masking as described in Table 849 of IEEE 802.16m-2011, IEEE published standard;

Using the STID of the forwarded HR-MS, the forwarding HR-MS can decode the above DL Assignment A-MAP IE in the similar way it decodes its own DL Assignment A-MAP IEs using its own STID. When decoding the DL Assignment A-MAP IE using the STID of the forwarded HR-MS, the forwarding HR-MS may interpret some fields differently. The forwarding HR-MS then proceeds to receive the DL message from HR-BS, on behalf of the forwarded HR-MS. In most cases, such a DL message is transmitted in the same DL sub frame in which the signaling DL Assignment A-MAP IE is transmitted;

Next, the forwarding HR-MS needs to determines which resource it can use to forward the message it receives from HR-BS toward the forwarded HR-MS. Regarding the resource used by the forwarding HR-MS to forward the received data from HR-BS to the forwarded HR-MS:

In one embodiment, the resource is explicitly signaled by the HR-BS to the forwarding HR-MS in a UL Assignment A-MAP IE that follows the above DL Assignment A-MAP IE. The UL Assignment A-MAP IE uses the STID of the forwarded HR-MS, e.g., the CRC mask of the Assignment A-MAP is constructed using the STID of the forwarded HR-MS. There can be some field in the original DL Assignment A-MAP IE that tells the forwarding HR-MS of the presence of the related UL Assignment A-MAP IE;

In another embodiment, the resource is implicitly determined based on the content of the DL Assignment A-MAP IE. In other words, for DL messages destined for the forwarded HR-MS, there is a fixed mapping between the resource allocated in downlink link, i.e., from HR-BS to the forwarding HR-MS, and the resource allocated in the forwarding link, i.e., from the forwarding HR-MS to the forwarded HR-MS. One such mapping can be specified as follows:

In the time domain: First, both HR-BS and forwarding HR-MS calculate the earliest time, i.e., earliest sub-frame, at which the forwarding HR-MS can transmit F-MAP after finishing processing the DL Assignment A-MAP IE sent by the HR-BS. This earliest time of F-MAP depends on the DL processing time requirement of the forwarding HR-MS, and has been agreed in advanced with the HR-BS (as currently specified in 802.16m standard IEEE 802.16m-2011, IEEE published standard) and on the periodicity of the F-MAP which has also been agreed in advanced. The chosen sub frame to transmit F-MAP is at a certain offset from the earliest sub frame. The offset can be determined based on some field within the DL Assignment A-MAP IE. If there are multiple F-MAP blocks within the sub frame, the DL Assignment A-MAP IE also identifies which F-MAP block should be used for signaling. Next, the resource for the forwarding link can be assigned in the same sub-frame that the earliest F-MAP is transmitted;

In the frequency domain: The resource in the forwarding link occupies a number of contiguous LRUs. The index of the starting LRU can be at a certain offset to the index of the starting LRU that is allocated to the DL transmission from HR-BS to the forwarding HR-MS. This offset can be agreed in advanced, or can be signaled inside the original DL Assignment A-MAP IE. The number of LRUs that the transmission in the forwarding link occupies is calculated to fit the size of the message transmitted by the HR-BS (and destined for the forwarded HR-MS), taking into account the difference in data rates between the DL link and the forwarding link.

After the forwarding HR-MS determines the resource it can use to forward the message received from HR-BS toward the forwarded HR-MS, the forwarding HR-MS signals this resource allocation to the forwarded HR-MS in F-MAP. Based on the signaling in F-MAP, the forwarded HR-MS can receive the message forwarded by the forwarding HR-MS.

For the messages transmitted in the UL from the forwarded HR-MS to HR-BS:

When HR-BS wants to allocate resource for the forwarded HR-MS to transmit a UL message, it specifies a UL Assignment A-MAP IE using the format as defined in 802.16m standard (IEEE 802.16m-2011, IEEE published standard); the HR-BS uses the STID assigned to the forwarded HR-MS (after successful network entry) to identify the UL Assignment A-MAP IE;

Using the STID of the forwarded HR-MS, the forwarding HR-MS can decode the above UL Assignment A-MAP IE in a similar way it decodes its own UL Assignment A-MAP IEs using its own STID. When decoding the UL Assignment A-MAP IE using the STID of the forwarded HR-MS, the forwarding HR-MS may interpret some fields differently.

The forwarding HR-MS signals the resource allocated by HR-BS to the forwarded HR-MS through F-MAP. This happens in the an F-MAP after the forwarding HR-MS finishes processing the above UL Assignment A-MAP IE from HR-BS. The particular location of F-MAP used for this signaling may depend on the content of the UL Assignment A-MAP IE;

When the forwarded HR-MS receives a UL allocation through a F-MAP transmitted in a particular uplink sub frame, it shall carry out transmission in a uplink sub frame that satisfies:

The time gap between the F-MAP sub frame and the sub frame in which the forwarded HR-MS starts transmission shall be greater than or equal to the time required for the forwarded HR-MS to process the F-MAP;

The uplink sub-frame is not the one reserved for the transmission of S-NCI or F-MAP;

In one embodiment, the chosen uplink sub frame is the earliest one that satisfies the above conditions. In another embodiment, there is a fixed time offset between the location of the F-MAP that contains UL allocation and the sub frame in which the forwarded HR-MS transmit its UL message;

When the forwarded HR-MS transmits data/control MAC PDUs on a uplink sub frame, the transmission shall span the last 5 OFDMA symbols of the sub frame;

The forwarded HR-MS can use the normal uplink control channels such as feedback channels and bandwidth request channels allocated by HR-BS for the uplink physical control (see Section 16.3.8 of IEEE 802.16m-2011, IEEE published standard). When doing so, the physical format of uplink control channels shall be the same as that used by a normal HR-MS that is directly associated with HR-BS. Note that these control channels normally span 6 OFDMA symbols of an uplink sub frame.

HR-BS and forwarding HR-MS shall adjust their uplink communication to cater for the uplink transmissions by the forwarded HR-MS in the following ways:

Sub-frame conflict avoidance: When HR-BS allocates uplink resource for the forwarding HR-MS for its own uplink transmission, i.e., using the STID of the forwarding HR-MS, if the allocated sub frame that is calculated based on the currently specified 802.16m A-MAP relevance and timing (see Section 16.2.14.2.2 of IEEE 802.16m-2011, IEEE published standard) is the same as a sub frame that is allocated to one of the attached forwarded HR-MSs, the sub frame allocated to the forwarding HR-MS shall be delayed until the earliest sub frame that is not allocated to any of its attached forwarded HR-MSs. As both HR-BS and forwarding HR-MS are fully aware of the uplink allocations to the attached forwarded HR-MSs, this shifting of uplink sub frame allocated to forwarding HR-MS is understood and applied by both HR-BS and forwarding HR-MS;

Provision of transceiver switching time: the forwarding HR-MS may need to switch between transmitting and receiving states during uplink subframes. This is to allow forwarded HR-MS to transmit to the forwarding HR-MS in an uplink sub frame. To do so:

If a forwarded HR-MS is going to transmit in a particular uplink sub frame and the transmission does not span the $1^{st}$ OFDMA symbol of that sub frame, and if prior to that sub frame, the forwarding HR-MS is in the transmitting state, then the forwarding HR-MS shall switch from the transmitting to the receiving state during the $1^{st}$ OFDMA symbol of the sub frame allocated to the forwarded HR-MS to transmit;

If a forwarded HR-MS is going to transmit in a particular uplink sub frame and the transmission spans the entire sub frame, and if in the sub frame that precedes the first sub frame, the forwarding HR-MS also needs to transmit to the HR-BS, then the transmission by the forwarding HR-MS shall not occupy the last OFDMA symbol of the sub frame that is used by the forwarding HR-MS to transmit to the HR-BS. The forwarding HR-MS shall use this unoccupied last OFDMA symbol for switching from the transmitting state to the receiving state;

If a forwarded HR-MS is going to transmit in a particular uplink sub frame and if the forwarding HR-MS needs to transmit to the HR-BS in the next uplink sub frame, then the transmission by the forwarding HR-MS in this next sub frame shall not occupy the first OFDMA symbol of the sub frame. The forwarding HR-MS shall use this unoccupied first OFDMA symbol for switching from the receiving state to the transmitting state;

Given the above specifications, one approach to simplify the two-way communications between forwarding and forwarded HR-MS is to classify all frames into forwarding and reversed frames so that:

The uplink subframes of forwarding frames are used for the forwarding HR-MS to transmit to its attached forwarded HR-MS;

The uplink subframes of reversed frames are used for the forwarding HR-MS to receive from its attached forwarded HR-MS.

Note that the forwarding HR-MS can still transmit to its serving HR-BS/RS in uplink subframes of both forwarding and reversed frames. Note also that the above restriction in the transmitting/receiving modes of the forwarding/forwarded HR-MS does not apply to the transmission and reception of PA/SA-Preambles. PA-Preambles is transmitted in the first OFDMA symbol of the $2^{nd}$ frame while SA-Preamble is transmitted in the first OFDMA symbol of the $3^{rd}$ frame within a superframe.

In the following description, one specific implementation of one embodiment of what have been specified above for HR-MS forwarding to network operation is described:

The $1^{st}$ and $3^{rd}$ frames of each superframe are classified as forwarding frames while the $2^{nd}$ and $4^{th}$ frames are classified as reversed frames;

A forwarding HR-MS only transmits I/S-NCI, F-MAP, and data/control messages toward its forwarded HR-MS in uplink subframes within forwarding frames; the forwarding HR-MS only receives from its forwarded HR-MS in uplink subframes within reversed frames;

During network entry of out-of-coverage HR-MS, if S-NCI is transmitted in the $1^{St}$ frame, feedbacks to out-of-coverage HR-MS's signaling is transmitted in the same sub frame and LRUs specified for S-NCI, but in the $3^{rd}$ frame. On the other hand, if S-NCI is transmitted in the $3^{rd}$ frame then the feedbacks to out-of-coverage HR-MS's signaling is transmitted in the same sub frame and LRUs specified for S-NCI, but in the $1^{st}$ frame of the next superframe.

During normal HR-MS forwarding to network operation, S-NCI and F-MAP can be transmitted in either $1^{st}$ or $3^{rd}$ frames.

Within a uplink sub frame where F-MAP is transmitted, F-MAP region is divided into independent F-MAP blocks. Each F-MAP block spans a number of contiguous LRUs. Each F-MAP block can signal one or multiple resource allocations for forwarded HR-MS. F-MAP blocks can be received and decoded independently from each other.

Different forwarding HR-MS can share the same F-MAP blocks but the HR-BS shall ensure that at one instance, no more than one forwarding HR-MS transmits allocation signaling message inside a particular F-MAP block.

For forwarding transmissions from forwarding HR-MS toward forwarded HR-MS, if the allocation signaling message is transmitted in an F-MAP block within a particular sub frame, then the corresponding forwarding transmission shall also be located within the same sub frame;

For reversed transmissions from forwarded HR-MS toward forwarding HR-MS, if the allocation signaling message is transmitted in an F-MAP block within a particular sub frame with index "n" within a forwarding frame, then the corresponding reversed transmission shall be located in the sub frame with the same sub frame index "n" but within the next reversed frame.

Figure 13:
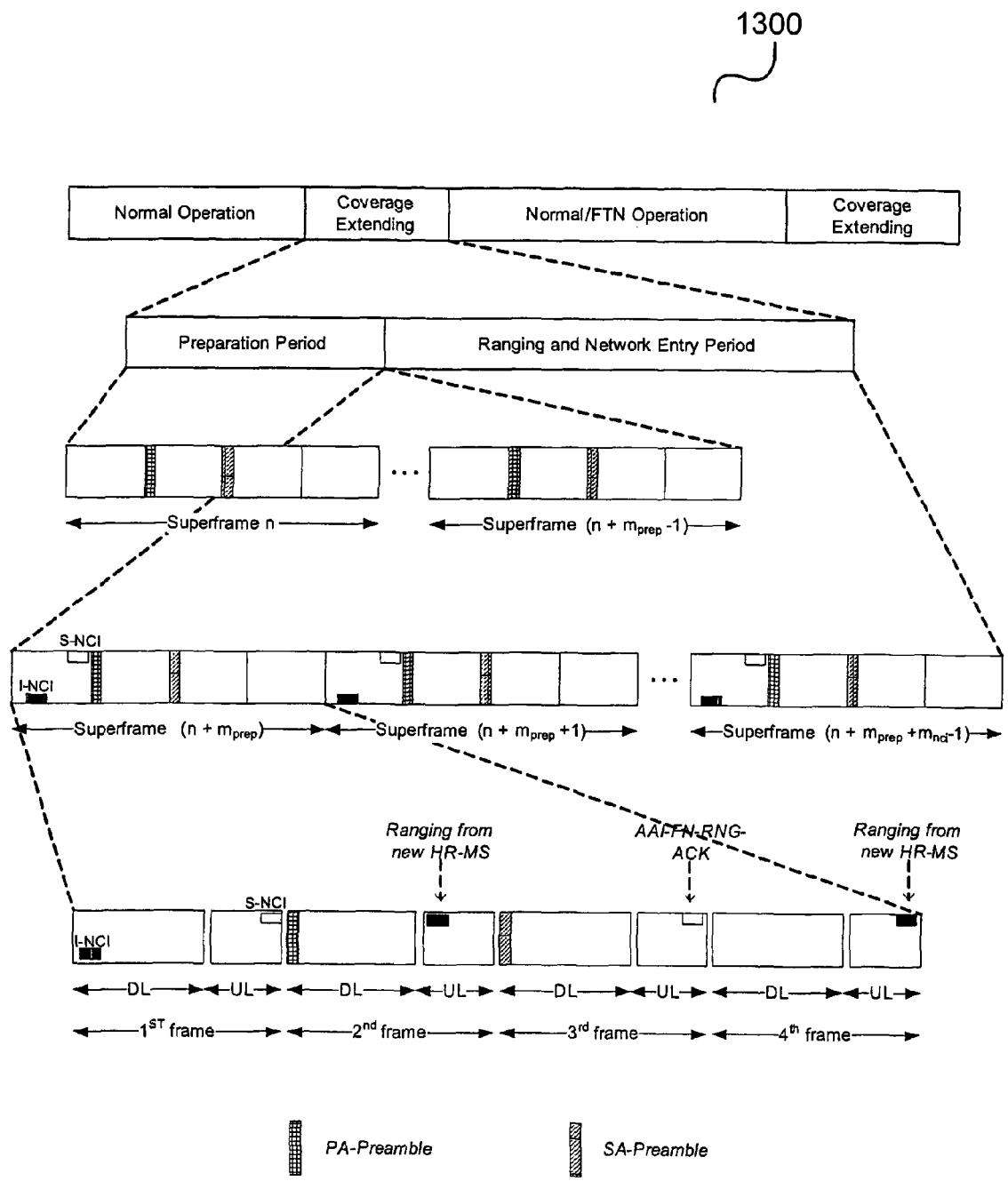
FIG. 13 shows a 802.16m-based coverage extension process according to another embodiment.

FIG. 13 shows a 802.16m-based coverage extension process according to an embodiment.

The 16m coverage extension process 1300 includes a normal operation, a coverage extending operation, a normal/forward-to-network operation, and another coverage extending operation.

S1: Specific Procedure for Coverage Extension and Subsequent FTN Operation in 802.16m-based HR Networks:
S1.1 Network Entry Involving 802.16m-Based Forwarding HR-MS For an HR-MS that is out-of-coverage of any HR-BS/RS but within reach of a forwarding HR-MS, the process of network entry can be described as follows.

The procedure starts when serving HR-BS/RS transmits an AAI-FN-CONFIG-CMD message to instruct one or a group of its directly-associated HR-MS to carry out a coverage-extending process. The format of AAI-FN-CONFIG-CMD message is defined in Table 1 and includes, among other fields, the following information:

IDCell corresponding to the SA-Preamble to be transmitted by the scheduled HR-MS or group of HR-MS. The SA-Preamble shall be selected from the last 10 sequences in each subcarrier segment. The scheduled HR-MS shall also transmit PA-Preamble, however this preamble is the same as that transmitted by serving HR-BS and therefore need not be specified.

$t_{adv}$: the timing advance that should be used by the scheduled HR-MS (or group of HR-MS) when transmitting PA/SA-Preambles. This offset is with respect to the DL frame timing as seen by the scheduled HR-MS.

$n_{start}$: the superframe number in which the new coverage-extending process should be started.

$m_{prep}$: the number of superframes, counting from the superframe with number $n_{start}$, that the scheduled HR-MS (or group of HR-MS) shall transmit PA/SA-Preambles without transmitting Network Configuration Information (NCI).

$m_{nci}$: the number of superframes in which NCI is to be transmitted, i.e., the NCI shall be transmitted in superframes ($n_{start}+m_{prep}$) to ($n_{start}+m_{prep}+m_{nci}-1$).

The number of ranging opportunities per superframe, this value can be one (ranging opportunity is allocated in $2^{nd}$ frame) or two (ranging opportunities are allocated in $2^{nd}$ and $4^{th}$ frames).

The location of the channel used to feedback to the new HR-MS (if pre-allocated).

The power setting to be used by scheduled HR-MS (or group of HR-MS) when transmitting preambles and NCI.

Upon receiving the AAI-FN-CONFIG-CMD message, the scheduled HR-MS or group of HR-MS, from now on simply referred to as forwarding HR-MS, shall start transmitting the specified PA/SA-Preambles in superframe $n_{start}$. The forwarding HR-MS transmits PA-Preamble in the first symbol of the $2^{nd}$ frame and SA-Preamble in the first symbol of the $3^{rd}$ frame of every superframe with superframe number from $n_{start.}$ to ($n_{start}+m_{prep.}-1$).

TABLE 1

AAI-FN-CONFIG-CMD message.

| Field | Size (bits) | Value/Description | Condition |
|---|---|---|---|
| Superframe Number Action ($n_{start}$) | 4 | LSBs of the superframe number in which the coverage-extending cycle should be started. | Mandatory |
| IDCell | 10 | IDCell (SA-Preamble index Idx and subcarrier set indexn) to be used by the scheduled HR-MS (If Two-Phase Discovery is used, the HR-BS should assign pre-access SA-Preamble to groups of HR-MS based on their service characteristics.) | Mandatory |
| Number of Preamble-only Superframes ($m_{prep}$) | 4 | Indicates the number of superframes (starting from superframe with number $n_{start}$) in which the scheduled HR-MS should broadcast PA/SA-Preambles. No NCI shall be transmitted during these superframes. | Mandatory |
| Number of Superframes with I/S-NCI ($m_{nci}$) | 2 | Indicates the number of superframes (starting from superframe with number $n_{start}+m_{prep}$) that the scheduled HR-MS transmits I/S-NCI. | Mandatory |
| Subframe index for S-NCI | 3 | The 2 LSB bits indicate the index of the UL subframe in which S-NCI is transmitted. The MSB bit indicates the frame in which S-NCI is transmitted. MSB bit == 0 indicate the $1^{st}$ frame while MSB bit = 1 indicate the $3^{rd}$ frame. | Mandatory |
| LRU starting index for S-NCI | 6 | Indicates the starting index of the LRUs allocated for S-NCI | Mandatory |
| Frame containing the ranging opportunity | 1 | 0b0: The ranging opportunity is located at $2^{nd}$ frame within a superframe 0b1: The ranging opportunity is located at $4^{th}$ frame within a superframe | Mandatory |
| Number of Ranging Opportunities ($m_{rng}$) | 2 | The number of ranging opportunities that are allocated after each S-NCI | Mandatory |

TABLE 1-continued

AAI-FN-CONFIG-CMD message.

| Field | Size (bits) | Value/Description | Condition |
|---|---|---|---|
| If (Support of WirelessMANOFDMA with FDM-based UL PUSC Zone){ | | | |
| Subframe offset of the RCH | 2 | Indicates the subframe offset ($O_{SF}$) of the RCH allocation. The range of values is $0 \leq O_{SF} \leq 3$ | |
| Start RP code information of the RCH | 4 | Indicates the $k_{ns}$, which is the parameter for start of the RP code group ($r_{ns0}$). $r_{ns0}(k_{ns}) = 16 \times k_{ns} + 1$, $k_{ns} = 0, 1, \ldots, 15$ | |
| Number of RP codes allocated for coverage extension ranging | 2 | Indicates the number of RP codes and the particular codes that can be used for ranging with the forwarding HR-MS. | |
| }else{ | | | |
| Subframe offset of the S-RCH | 2 | Indicates the subframe offset ($O_{SF}$) of the S-RCH allocation | |
| Start RP code information of the S-RCH | | Indicates the ks that is the parameter controlling the start root index of the RP codes ($r_{s0}$), $r_{s0} = 6 \times k_s + 1$ The range of values is $0 \leq k_s \leq 15$ | |
| Transmission timing offset of SRCH | 3 | Indicates $N_{RTO}$, which is the parameter used for the calculation of the sample number, $T_{RTO}$, which is applied to advance the ranging signal transmission timing relative to the defined uplink transmission timing point based on the frame structure from AMS perspective when AMS conducts initial or handover ranging in a femtocell. $T_{RTO} = \text{floor}(N_{RTO} \times (T_g - 2) \times F_s)$ (samples) where $N_{RTO} = \min(RTD/(T_g - 2), 7)$, and RTD is the round trip delay from the femto-ABS to the overlay macro-ABS. The range of values is $0 \leq N_{RTO} \leq 7$. | |
| } | | | |
| HR-MS Preamble Timing Advance ($t_{adv}$) | [TBD] | Timing advanced that should be used by scheduled HR-MS when transmitting PA/SA-Preamble, relative to the beginning of each frame as seen by the scheduled HR-MS. | Optional |
| HR-MS EIRP | 5 | Unsigned integer from 1 to 64 in units of 1 dBm, where 0b00000 = 0 dBm and 0b11111 = 31 dBm | Mandatory |
| HR-MS to HR-MS Feedback Resource Index | 11 | 512 FFT size: 0 in first2 MSB bits + 9 bits for resource index 1024 FFT size: 11 bits for resource index 2048 FFT size: 11 bits for resource index Resource index includes location and allocation size. | Optional |
| HR-MS to HR-BS Report Resource Index | 11 | 512 FFT size: 0 in first2 MSB bits + 9 bits for resource index 1024 FFT size: 11 bits for resource index | Optional |

TABLE 1-continued

AAI-FN-CONFIG-CMD message.

| Field | Size (bits) | Value/Description | Condition |
|---|---|---|---|
| | | 2048 FFT size: 11 bits for resource index Resource index includes location and allocation size. | |
| If(Two-Phase Discovery){ Threshold If(Post-access parameters to be pre-assigned){ | [TBD] | | |
| Post IDCell | 10 | IDCell (SA-Preamble index Idx and subcarrier set index n) to be used by the scheduled HR-MS after detecting ranging signal above a specified threshold. (The HR-BS should assign post-access SA-Preamble such that they will be unique within physical proximity.) | |
| Number of Superframes with NCI ($m_{nci}$) | 2 | Indicates the number of superframes (starting from superframe with number $n_{start} + m_{prep}$) that the scheduled HR-MS transmits NCI. | Mandatory |
| Start RP code information of the S-RCH | 4 | | |
| Number of Ranging Opportunities ($m_{rng}$) | 2 | Indicates the number of ranging opportunities given to outside-of-coverage HR-MS | Mandatory |
| Subframe offset of Ranging Channel | 2 | Indicates the subframe offset ($O_{SF}$) of the RCH allocation. The range of values is $0 \leq O_{SF} \leq 3$ | Mandatory |
| } } | | | |

Next, the forwarding HR-MS transmits NCI in superframes with number from ($n_{start}+m_{prep}$) to ($n_{start}+m_{prep}+m_{nci}-1$). During these $m_{nci}$ superframes, the forwarding HR-MS continues to transmit PA/SA-Preambles as specified above.

The NCI is divided into two subpackets, i.e., Initial Network Configuration Information (I-NCI) and Supplementing Network Configuration Information (S-NCI). I-NCI is transmitted first, with its location determinable from the SA-Preamble transmitted by the forwarding HR-MS, as specified in 6.12.3.2.2.2.2.

The I-NCI shall be transmitted in the last $N_{I-NCI}$ Distributed LRUs (DLRUs) in the first subframe of a superframe.— Within the selected subframe, the I-NCI shall occupy the last 5 OFDM symbols, i.e., effectively forming a Type-3 subframe. From the point of view of an out-of-coverage HR-MS or a forwarded HR-MS attempting to decode I-NCI, the DL subframe in which I-NCI is located has only one frequency partition $FP_0$. All $N_{PRU}$ in this subframe are distributed LRUs. The permutation and frequency partition of this subframe can be described by DSAC=0 (all minibands without subband), DFPC=0 (reuse 1 only), $DCAS_{SB,0}$=0 (no subband CRU allocated), and $DCAS_{MB,0}$=0 (no miniband CRU allocated). Definitions of these parameters are given in 6.3.4. Furthermore, the subcarrier permutation of this subframe is carried out as defined in 6.3.7.3.2, with the IDcell being calculated in the following modified way:

$$IDcell=256 \bmod(n+1,3)+\bmod(Idx+1,256),$$

where Idx is the preamble index and n is the preamble subcarrier set index of the SA-Preamble transmitted by the registered HR-MS.

I-NCI is transmitted by an HR-MS under the following cases:
  When the HR-MS is instructed by its serving HR-BS/RS to help in a network entry process for some out-of-coverage HR-MS, as described in 6.12.3.2.1.1.
  When there are changes in system configurations that affect the communication between a forwarding HR-MS and its attached forwarded HR-MS. In this case, the transmission of I-NCI shall be made known in advance to the attached forwarded HR-MS through the field "I-NCI Transmission Indicator" in the S-NCI.
  When I-NCI is transmitted for network entry of out-of-coverage HR-MS, if the transmitting HR-MS already has some attached forwarded HR-MS, it may set the field "I-NCI Transmission Indicator" to inform its attached forwarded HR-MS accordingly. This allows the transmitted I-NCI to be used by both unassociated HR-MS for network entry and by attached HR-MS for system configuration updates.

TABLE 2

| Syntax | Size (bits) | Notes |
| --- | --- | --- |
| BS IDcell | 10 | |
| Frame Configuration Index | 6 | The mapping between value of this index and frame configuration is listed in Table 149, Table 150, and Table 151 |
| If (WirelessMAN-OFDMA with FDM-based UL PUSC Zone Support){ | | True if Frame configuration index is equal to 5, 7, 9, 11, 13, 15, 20, 21, 22, 23, 24, 25, 26, 27, 28, 29 or 30 for 5/10 MHz channel bandwidth according to Table 149; 4, 6, 8 or 10 for 8.75 MHz channel bandwidth according to Table 150; 3 or 5 (with CP = 1/8) for 7 MHz channel bandwidth according to Table 151. False if Frame configuration index is something else |
| UL_Permbase | 7 | Indicates UL_Permbase used in WirelessMAN-OFDMA system with FDM-based UL PUSC Zone. |
| Reserved | [TBD] | |
| }else{ | | |
| USAC | 5/4/3 | Indicates the number of subbands $K_{SB}$ as defined in Table 246 to Table 248 in 6.3.7.2.1 For 2048 FFT size, 5 bits For 1024 FFT size, 4 bits For 512 FFT size, 3 bits |
| UFPC | 4/3/3 | Indicate the frequency partition configuration as defined in Table 249 to Table 251 in 6.3.7.2.3 For 2048 FFT size, 4 bits For 1024 FFT size, 3 bits For 512 FFT size, 3 bits |
| UFPSC | 3/2/1 | Indicate the number of subbands allocated to FPi (i > 0) in 6.3.7.2.3 For 2048 FFT size, 3 bits For 1024 FFT size, 2 bits For 512 FFT size, 1 bits |
| $UCAS_{SB0}$ | 5/4/3 | Indicates the number, of subband-based CRUs in FP0 in 6.3.7.3.1 For 2048 FFT size, 5 bits For 1024 FFT size, 4 bits For 512 FFT size, 3 bits |
| $UCAS_{MB0}$ | 5/4/3 | Indicates the number of miniband-based CRUs in FP0 in 6.3.7.3.1 For 2048 FFT size, 5 bits For 1024 FFT size, 4 bits For 512 FFT size, 3 bits |
| } | | |
| Subframe index for S-NCI | 3 | The 2 LSB bits indicate the index of the UL subframe in which S-NCI is transmitted. The MSB bit indicates the frame in which S-NCI is transmitted. MSB bit == 0 indicate the $1^{st}$ frame while MSB bit = 1 indicate the $3^{rd}$ frame. |
| LRU starting index for S-NCI | 6 | Indicates the starting index of the LRUs allocated for S-NCI |

TABLE 3

| Syntax | Size (bits) | Notes |
| --- | --- | --- |
| If (Support of WirelessMANOFDMA with FDM-based UL PUSC Zone){ | | |
| Subframe offset of the RCH | 2 | Indicates the subframe offset ($O_{SF}$) of the RCH allocation. The range of values is $0 \leq O_{SF} \leq 3$ |
| Start RP code information of the RCH | 4 | Indicates the $k_{ns}$, which is the parameter for start of the RP code group ($r_{ns0}$). $r_{ns0}(k_{ns}) = 16 \times k_{ns} + 1, k_{ns} = 0, 1, \ldots, 15$ |

TABLE 3-continued

S-NCI

| Syntax | Size (bits) | Notes |
|---|---|---|
| Number of RP codes allocated for coverage extension ranging }else{ | 2 | Indicates the number of RP codes and the particular codes that can be used for ranging with the forwarding HR-MS. |
| Subframe offset of the S-RCH | 2 | Indicates the subframe offset ($O_{SF}$) of the S-RCH allocation |
| Start RP code information of the S-RCH | | Indicates the ks that is the parameter controlling the start root index of the RP codes ($r_{s0}$). $r_{s0} = 6 \times k_s + 1$ The range of values is $0 \leq k_s \leq 15$ |
| Transmission timing offset of SRCH | 3 | Indicates $N_{RTO}$, which is the parameter used for the calculation of the sample number, $T_{RTO}$, which is applied to advance the ranging signal transmission timing relative to the defined uplink transmission timing point based on the frame structure from AMS perspective when AMS conducts initial or handover ranging in a femtocell. $T_{RTO} = \text{floor}(N_{RTO} \times (T_g - 2) \times F_s)(\text{samples})$ where $N_{RTO} = \min(RTD/(T_g - 2), 7)$, and RTD is the round trip delay from the femto-ABS to the overlay macro-ABS. The range of values is $0 \leq N_{RTO} \leq 7$. |
| } Frame containing the ranging opportunity | 1 | 0b0: The ranging opportunity is located at $2^{nd}$ frame within a superframe 0b1: The ranging opportunity is located at $4^{th}$ frame within a superframe |
| Number of ranging opportunities | 2 | The number of ranging opportunities that are allocated after each S-NCI. |
| UCASi | 3/2/1 | Indicates the number of total allocated CRUs, in a unit of a subband, for FPi ($i \geq 0$) in 6.3.7.3.1 For 2048 FFT size, 3 bits For 1024 FFT size, 2 bits For 512 FFT size, 1 bits |
| Forwarding EIRP | 5 | Unsigned integer from 1 to 31 in units of 1 dBm, where 0b00000 = 1 dBm and 0b11111 = 31 dBm. |
| HR-MS Transmit Power Limitation Level | 5 | Unsigned 5-bit integer. Specifies the maximum allowed HR-MS transmit power. Values indicate power levels in 1 dB steps starting from 0 dBm. |
| EIRxPIR,min | 5 | Unsigned integer from −133 to −102 in units of 1 dBm, where 0b00000 = −133 dBm and 0b11111 = −102 dBm. |
| Pre-access S-NCI Indicator | 1 | Indicates whether this is a pre-access S-NCI that is used for Group Discovery mode 0b0: not a pre-access S-NCI 0b1: pre-access S-NCI |

The S-NCI shall be transmitted in NS-NCI contiguous DLRUs of an uplink subframe. The index of the uplink subframe and the index of the starting LRU in which S-NCI is transmitted are signaled in the I-NCI fields "Subframe index for S-NCI" and "LRU starting index for S-NCI", respectively. When transmitted, S-NCI spans the last 5 OFDMA symbols of the selected subframe.

When a new HR-MS detects the PA/SA-Preambles and I/S-NCI transmitted by the forwarding HR-MS and decides to start initial ranging through the forwarding HR-MS, the following process shall be carried out:

- The new HR-MS, after acquiring downlink synchronization and uplink transmission parameters through PA/SA-Preambles and I/S-NCI, shall pick one of the ranging codes specified in S-NCI using a uniform random process. The HR-MS shall send the selected ranging code on the first allocated ranging opportunity specified in S-NCI.
- Upon receiving the ranging code from the new HR-MS, the forwarding HR-MS is supposed to respond with an AAI-FN-RNG-ACK message. If the new HR-MS has previously transmitted a ranging code in a ranging opportunity which is not the last opportunity, the new HR-MS shall expect to receive an AAI-FN-RNG-ACK message (Table 4) from the forwarding HR-MS before the next ranging opportunity. If the new HR-MS does not receive such an AAI-FN-RNG-ACK message, it shall pick another ranging code using a uniform random process and transmit on the coming ranging opportunity. The new HR-MS may ramp-up its transmit power as specified in S-NCI. If the new HR-MS transmits a ranging code in the last ranging opportunity specified in S-NCI, it shall expect to receive an AAI-FN-RNG-ACK message within T31 Timer. The number of ranging opportunity allocated is specified by the field "Number of ranging opportunities" in S-NCI.
- The AAI-FN-RNG-ACK message provides responses to all the successfully received ranging preamble codes in the ranging opportunity preceding its transmission.

There are four possible ranging status responses from the forwarding HR-MS to the new HR-MS in the AAI-FN-RNG-ACK message, i.e., Continue: The forwarding HR-MS informs the new HR-MS of needed adjustments (e.g., time, power, and possibly frequency corrections) and a status notification of "continue".

Success: The forwarding HR-MS informs the new HR-MS of status "success", but may have adjustment suggestions to the new HR-MS if necessary. With status success, the forwarding HR-MS shall inform the new HR-MS of a BW allocation in the uplink for the new HR-MS to send AAI-RNG-REQ message.

Abort: The forwarding HR-MS informs the new HR-MS to abort the current initial ranging process.

Second Phase: This status notification is only applicable if the current coverage extension process follows the Two-Phase approach, as specified in AAI-FN-CONFIG-CMD message. The forwarding HR-MS informs the new HR-MS to prepare to receive post-access preambles and post-access S-NCI. This status shall only be sent once, i.e., it shall not be given when the new HR-MS has already been carrying out ranging using post-access preambles and post-access S-NCI from forwarding HR-MS.

Based on the received response of ranging status, the new HR-MS performs the following:

Upon receiving a Continue status notification and parameter adjustments in AAI-FN-RNG-ACK message, the new HR-MS shall adjust its parameters accordingly and continue the ranging process by randomly selecting one ranging code and transmitting in the next available ranging opportunity, or as instructed in the AAI-FN-RNG-ACK message.

Upon receiving a Success status notification, the new HR-MS shall wait for the forwarding HR-MS to inform it of a BW allocation in the UL to send AAI-RNG-REQ message (defined in 802.16m-2011). The forwarding HR-MS forwards the corresponding request to the serving HR-BS, and subsequently acts on behalf of the HR-BS in sending an AAI-RNG-RSP message to the new HR-MS. If the new HR-MS does not receive BW allocation for AAI-RNG-REQ within T3 or the AAI-RNG-REQ/RSP (defined in 802.16m-2011) is not completed in 128 frames, it stops the process and may try to associate with another HR-MS or a HR-BS/RS.

Upon receiving an Abort status notification, the new HR-MS shall stop the ranging process. It shall not attempt to restart initial ranging with a forwarding HR-MS transmitting the same SA-Preamble.

Upon receiving Second Phase status notification, the new HR-MS waits for post-access PA/SA-Preambles and post-access S-NCI to be transmitted by forwarding HR-MS. Upon receiving post-access PA/SA-Preambles and S-NCI, the new HR-MS start a new round of initial ranging following steps as described above. The initial transmission power for the ranging is determined based on the last ranging prior to detection of post-access SA-Preamble and S-NCI.

HR-BS assigns and transfers a TSTID by AAI-RNG-RSP message when ranging status is Success. Initial ranging process is over after receiving the AAI-RNG-RSP message. The TSTID is used until STID is newly assigned and received at successful registration.

TABLE 4

| | | AAI-FN-RNG-ACK message | |
|---|---|---|---|
| Field | Size (bits) | Value/Description | Condition |
| For (j = 0; j < N Received Codes; j++) { | | | |
| Ranging Preamble Code Index | 2 | Ranging preamble code index received in this ranging opportunity. | |
| Ranging Status | 2 | Indicate whether ranging preamble code or UL burst is received within acceptable limits by forwarding HR-MS. 0b00 = success 0b01 = continue 0b10 = abort 0b11 = second phase | |
| If(Ranging Status == 0b00 or 0b01){ | | | |
| Adjustment parameters indication (API) | 3 | Bit 0: Time offset adjustment indication. Bit 1: Power level adjustment indication Bit 2: Frequency offset adjustment indication | |
| If( API Bit 0==0b1 ) { | | | |
| Timing offset adjustment | 15 | Amount of time required to adjust AMS transmission (in units of 1/Fs). MSB 1 bit represents the sign of the value. That is, the value is negative(−) if the MSB = 0b1, and the value is positive(+) if the MSB = 0b0. LSB 14 bits represent timing offset correction value of [1 . . . 16384] that | |

TABLE 4-continued

AAI-FN-RNG-ACK message

| Field | Size (bits) | Value/Description | Condition |
|---|---|---|---|
| | | corresponds to 0x0000~0x3FFF, respectively. The AMS shall advance its transmission time if the value is negative (i.e., MSB = 0b1) and delay its transmission time if the value is positive (i.e., MSB = 0b0). | |
| }<br>If( API Bit 1==0b1 ) {<br>Power level adjustment | 4 | Power level adjustment that expresses the change in power level (in multiples of 1 dB) that the AMS shall apply to its current transmission power for initial ranging. MSB 1 bit represents the sign of the value. That is, the value is negative(−) if the MSB = 0b1, and the value is positive(+) if the MSB = 0b0. LSB 3 bits represent power level correction value of [1 . . . 8] that corresponds to 0b000~0b111, respectively | |
| }<br>If (API Bit 2==0b1) {<br>Frequency offset adjustment | 9 | Frequency offset adjustment. Relative change in transmission frequency. The correction is 2% of the subcarrier spacing (f) multiplied by the 9-bit number interpreted as a signed integer. MSB 1 bit represents the sign of the value. That is, the value is negative(−) if the MSB = 0b1, and the value is positive(+) if the MSB = 0b0. LSB 8 bits represent frequency offset correction value of [1 . . . 256] that corresponds to 0x00~0xFF, respectively | |
| }<br>} | | | |

The behavior of the forwarding HR-MS and serving HR-BS/RS during initial ranging of the new HR-MS shall be as follows.

After transmitting NCI (i.e., in I/S-NCI messages), the forwarding HR-MS shall monitor the specified ranging opportunities for any initial-ranging attempt by new HR-MS.

When the forwarding HR-MS detects one or more ranging codes transmitted on the allocated ranging opportunities, it shall calculate signal strength and necessary adjustments (time, power, frequency corrections). An AAI-FN-RNG-ACK message shall be transmitted to the new HR-MS.

If resource in the uplink area has been pre-allocated by HR-BS for the forwarding HR-MS to transmit AAI-FN-RNG-ACK message, the forwarding HR-MS shall transmit an AAI-FN-RNG-ACK message to the new HR-MS, with corresponding status and adjustments (if necessary). The HR-BS shall also monitor the pre-allocated resource for the AAI-FN-RNG-ACK in order to carry out any further proactive resource allocation for the coverage extending process.

If resource has not been pre-allocated for the forwarding HR-MS to transmit AAI-FN-RNG-ACK message, the forwarding HR-MS shall transmit an AAI-HR-RNG-REP report to the HR-BS. The AAI-HR-RNG-REP message contains signal strength and possibly necessary adjustments for the new HR-MS. The HR-BS may receive AAI-HR-RNG-REP messages from multiple scheduled forwarding HR-MS. The HR-BS is supposed to follow up with an AAI-FN-RNG-FLU (Table 5) message before the next allocated ranging opportunity of the coverage extending process if there is any. The AAI-FN-RNG-FLU message specifies the forwarding HR-MS that shall transmit an AAI-FN-RNG-ACK message to the new HR-MS, if such a message needs to be transmitted. The resource to transmit such an AAI-FN-RNG-ACK message has been pre-specified in the original AAI-FN-CONFIG-CMD message, and has been made known to the new HR-MS through the S-NCI.

After the ranging status has become Success, HR-BS shall allocate bandwidth in the uplink to allow the new HR-MS to transmit AAI-RNG-REQ message. The forwarding HR-MS shall recognize this allocation IE in the A-MAP and inform the new HR-MS accordingly (using a CDMA Allocation IE).

The HR-BS may request the forwarding HR-MS to report any ranging attempt, whether they have crossed the response threshold or not, for management purposes.

TABLE 5

AAI-FN-RNG-FLU message

| Field | Size (bits) | Value/Description | Condition |
|---|---|---|---|
| For (j = 0; j < Number of ranging codes; j++) { | | | |
| Ranging Code Index | 2 | Ranging preamble code index to be followed up. | Mandatory |
| Frame number | 4 | 4 LSBs of the frame number in which the ranging code was received | Mandatory |
| Subframe offset of the received ranging preamble } | 2 | Indicates the subframe offset ($O_{SF}$) where the ranging code was received | Mandatory |

The above coverage operation is illustrated in FIG. 13.

S1.2 Frame Structure to Support 16m-Based FTN Operation:

A forwarding HR-MS and an inside-of-coverage forwarded HR-MS fully follow the superframe and frame configurations set by the serving HR-BS/RS, as described in 802.16m-2011. A forwarded HR-MS that is out-of-coverage of the serving HR-BS/RS obtains essential superframe and frame configurations through A-Preambles and control channels from its corresponding forwarding HR-MS. These forwarding control channels include I-NCI, S-NCI, Forwarding MAP (F-MAP).

From the point of view of forwarding and forwarded HR-MS, the frames within each superframe are classified into forwarding and reversed frames. The forwarding HR-MS transmits to its forwarded HR-MS in uplink subframes of forwarding frames. The forwarding HR-MS receives from its forwarded HR-MS in uplink subframes of reversed frames. The $1^{st}$ and $3^{rd}$ frames of each superframe are classified as forwarding frames while the $2^{nd}$ and $4^{th}$ frames of each superframe are classified as reversed frames. The restriction in transmitting/receiving modes of the forwarding and forwarded HR-MS does not apply to the transmission and reception of PA/SA-Preambles.

Resources for HR-MS Direct Communications and HR-MS Forwarding to Network shall be scheduled by the serving HR-BS/RS. Serving HR-BS/RS can schedule direct communication in an on-demand and dynamic manner, and can multiplex this with transmissions between HR-MS and HR-BS/HR-RS.

To optimize the signaling and switching cost and improve QoS provisioning to HR-MS direct communication, serving HR-BS/HR-RS can schedule resource for DC/FTN zone for multiplexing DC/FTN transmissions. An HR-MS DC/FTN Zone is an area of continuous OFDMA resources in time and logical subchannels or resource units. The size and location of DC/FTN zone is dynamically or semi-stationary determined by the serving HR-BS.

S1.3 Control Structure to Support 16m-Based FTN Operation:

Physical control signaling for BS-controlled HR-MS FTN includes PA/SA-Preambles, I-NCI/S-NCI/P-NCI, F-MAP that are transmitted by forwarding HR-MS, HR-MS-to-HR-MS feedback channels and ranging channels that are used by both forwarding and forwarded HR-MS, and Forwarded-link BR channel that is used by forwarded HR-MS.

As described earlier, under the instruction of the serving HR-BS/RS, an HR-MS transmits PA/SA-Preambles, together with I/S-NCI, to help an out-of-coverage HR-MS to carry out network entry and get associated with the serving HR-BS/RS. After the out-of-coverage HR-MS has successfully completed network entry, it becomes a forwarded HR-MS that is attached to the helping/forwarding HR-MS.

A forwarding HR-MS shall periodically transmit PA/SA-Preambles as long as there is at least one out-of-coverage forwarded HR-MS attached to it. PA-Preamble shall be transmitted in the first OFDMA symbol of the $2^{nd}$ frame of a superframe, while SA-Preamble shall be transmitted in the first OFDMA symbol of the $3^{rd}$ frame of a superframe. The periodicity of PA/SA-Preamble transmission can be different from that applied during the network entry of an out-of-coverage HR-MS. The periodicity of PA/SA-Preamble transmission is informed to the forwarded HR-MS at the end of the network entry process and is updated through the field "Preamble Periodicity" in the S-NCI.

The format and transmission of I-NCI and S-NCI have been described above.

The P-NCI (Table 6) shall be transmitted in NP-NCI contiguous DLRUs of an uplink subframe. A forwarding HR-MS shall periodically transmit P-NCI as long as there is at least one out-of-coverage forwarded HR-MS attached to it. During this operation, S-NCI can be transmitted in either 1st or 3rd frame of a superframe. The frame-location and periodicity of P-NCI transmission shall be made known to the forwarded HR-MS through a control message.

The index of the uplink subframe and the index of the starting LRU in which P-NCI is transmitted are the same as that used for the transmission of S-NCI. When transmitted, P-NCI spans the last 5 OFDMA symbols of the selected subframe.

TABLE 6

P-NCI

| Syntax | Size (bits) | Notes |
|---|---|---|
| Superframe number | 12 | |
| If (Support of WirelessMANOFDMA with FDM-based UL PUSC Zone){ | | |
| Subframe offset of the RCH | 2 | Indicates the subframe offset ($O_{SF}$) of the RCH allocation. The range of values is $0 \leq O_{SF} \leq 3$ |
| Start RP code information of the RCH | 4 | Indicates the $k_{ns}$, which is the parameter for start of the RP code group ($r_{ns0}$). $r_{ns0}(k_{ns}) = 16 \times k_{ns} + i$, $k_{ns} = 0, 1, \ldots, 15$ |
| Number of RP codes allocated for coverage extension ranging }else{ | 2 | Indicates the number of RP codes and the particular codes that can be used for ranging with the forwarding HR-MS. |

TABLE 6-continued

P-NCI

| Syntax | Size (bits) | Notes |
|---|---|---|
| Subframe offset of the S-RCH | 2 | Indicates the subframe offset ($O_{SF}$) of the S-RCH allocation |
| Start RP code information of the S-RCH | | Indicates the ks that is the parameter controlling the start root index of the RP codes ($r_{s0}$). $r_{s0} = 6 \times k_s + 1$ The range of values is $0 \leq k_s \leq 15$ |
| Transmission timing offset of SRCH | 3 | Indicates $N_{RTO}$, which is the parameter used for the calculation of the sample number, $T_{RTO}$, which is applied to advance the ranging signal transmission timing relative to the defined uplink transmission timing point based on the frame structure from AMS perspective when AMS conducts initial or handover ranging in a femtocell. $T_{RTO} = \text{floor}(N_{RTO} \times (T_g - 2) \times F_s)$(samples) where $N_{RTO} = \min(\text{RTD}/(T_g - 2), 7)$, and RTD is the round trip delay from the femto-ABS to the overlay macro-ABS. The range of values is $0 \leq N_{RTO} \leq 7$. |
| } | | |
| Preamble Periodicity | 2 | Indicates the pattern by which the forwarding HR-MS transmits PA/SA-Preambles during HR-MS FTN 0b00: PA-Preamble is transmitted in the $1^{st}$ symbol of the $2^{nd}$ frame of every superframe while SA-Preamble is transmitted in the $1^{st}$ symbol of the $3^{rd}$ frame of every superframe 0b01: PA/SA-Preambles are transmitted once every two superframes 0b10: PA/SA-Preambles are transmitted alternatively, with PA-Preamble being transmitted in odd-number superframes and SA-Preamble being transmitted in even-number superframes 0b11: Reserved |
| Subframe index for F-MAP | 3 | The 2 LSB bits indicate the index of the UL subframe in which F-MAP is transmitted. The MSB bit indicates the frame in which F-MAP is transmitted. MSB bit == 0 indicate the $1^{st}$ frame while MSB bit = 1 indicate the $3^{rd}$ frame. |
| LRU starting index for F-MAP | 6 | Indicates the starting index of the LRUs allocated for F-MAP |
| F-MAP Size | 2 | Indicates the number of LRUs allocated to the F-MAP |
| I-NCI/S-NCI Transmission Indicator | 2 | Indicate the next transmission of I-NCI/S-NCI 0b00: No plan for I-NCI/S-NCI transmission 0b01: I-NCI/S-NCI is going to be transmitted in the next superframe 0b10: I-NCI/S-NCI is going to be transmitted in two superframes from the current superframe 0b11: Reserved |
| PI IE is transmitted | 1 | 1b indicates PI IE is transmitted by HR-MS |
| If PI transmitted { | | |
| Subframe index for PI SI_PI | 3 | The 2 LSB bits indicate the index of the UL subframe in which PI is transmitted. The MSB bit indicates the frame in which PI is transmitted. MSB bit == 0 indicate the 1st frame while MSB bit = 1 indicate the 3rd frame |
| LRU starting index for LRU_PI | 6 | Indicates the starting index of the LRUs allocated for PI |
| } | | |

The Forwarding MAP (F-MAP) carries service control information. Service control information consists of assignment information and power control information. For each forwarding HR-MS, its F-MAP region occupies a number of contiguous DLRUs within an uplink subframe in a forwarding frame. Each F-MAP region is further divided into F-MAP blocks. F-MAP blocks can be received and decoded independently from each other. The index of the first LRU allocated to the F-MAP region, together with its size, for each forwarding HR-MS is specified in P-NCI. When transmitted, F-MAP spans the last 5 OFDMA symbols of the subframe.

The timing interpretation of the F-MAP assignments shall be as follows:
- For forwarding transmissions from forwarding HR-MS toward forwarded HR-MS, if the allocation signaling is transmitted in an F-MAP block within a particular subframe, then the corresponding forwarding transmission shall also be located within the same subframe.
- For reversed transmissions from forwarded HR-MS toward forwarding HR-MS, if the allocation signaling message is transmitted in an F-MAP block within a particular subframe with index "n" within a forwarding frame, then the corresponding reversed transmission shall be located in the subframe with the same subframe index "n" but within the next reversed frame.

F-MAP block format when not supporting Wireless MAN-OFDMA FDM-based UL PUSC Zone:
Within each F-MAP region, resource is allocated to F-MAP blocks in the following manner:
Collect all 6×5 tiles of the allocated DLRUs, each tile contains 26 data tones;
Each F-MAP block occupies two consecutive tiles.
The two 6×5 tiles allocated to each F-MAP block contains 52 data tones, of which the first $N_{F\text{-}MAP\_IE}=48$ data tones are used to carry one F-MAP IE.

F-MAP block format for supporting WirelessMAN-OFDMA FDM-based UL PUSC Zone
Within each F-MAP region, resource is allocated to F-MAP blocks in the following manner:
Collect all 4×5 tiles of the allocated DLRUs, each tile contains 14 data tones;
Each F-MAP blocks occupies 4 consecutive tiles.
The three 4×5 tiles allocated to each F-MAP block contains 56 data tones, of which the first $N_{F\text{-}MAP\_IE}=48$ data tones are used to carry one F-MAP IE.

The following table specifies FTN Assignment A-MAP IE that is transmitted by HR-BS toward forwarding HR-MS to specify resource for the forwarding (reversed) channel.

TABLE 7

FTN Assignment A-MAP IE format

| Syntax | Size (bits) | Notes |
|---|---|---|
| Forwarding Assignment A-MAP_IE{ | | |
| A-MAP IE Type | 4 | Extended Assignment A-MAP IE |
| Extended Assignment A-MAP IE Type | 4 | Value is set to 0xD |
| $I_{SizeOffset}$ | 5 | Offset use to compute burst size index |
| MEF | 1 | MIMO encoder format<br>0b0: SFBC<br>0b1: Vertical Encoding with only 1 stream |
| Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size |

TABLE 7-continued

FTN Assignment A-MAP IE format

| Syntax | Size (bits) | Notes |
|---|---|---|
| Transmitter Indicator | 1 | 0b0: Forwarding HR-MS<br>0b1: Forwarded HR-MS |
| HFA | 3 | HARQ Feedback Allocation |
| ACID | 4 | HARQ channel identifier |
| Number of valid frames | 2 | Number of consecutive forwarding or reversed frames that this resource allocation applies to |
| Extra Resource Indicator | 1 | 0b0: No extra resource can be granted<br>0b1: Extra resource can be requested |
| F-MAP Block Index | 3 | Index of the F-MAP block within the F-MAP region of the forwarding HR-MS to be used to communicate the allocation to forwarded HR-MS |
| Reserved | 1 | |
| } | | |

Forwarding HR-MS signal resource allocation to its forwarded HR-MS through an F-MAP IE, which is specified in Table 8. Each F-MAP IE is CRC-masked by the STID of the forwarded HR-MS in the same way the DL/UL assignment A-MAP IEs are masked.

TABLE 8

F-MAP IE format

| Syntax | Size (bits) | Notes |
|---|---|---|
| F-MAP IE{ | | |
| F-MAP IE Type | 2 | |
| $I_{SizeOffset}$ | 5 | Offset use to compute burst size index |
| MEF | 1 | MIMO encoder format<br>0b0: SFBC<br>0b1: Vertical Encoding with only 1 stream |
| Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size |
| HFA | 3 | HARQ Feedback Allocation |
| AI-SN | 1 | HARQ identifier sequence number |
| ACID | 4 | HARQ channel identifier |
| Allocation offset | 2 | 0b00: offset equal −1<br>0b01: offset equal 0<br>0b10: offset equal 1<br>0b11: Reserved |
| Number of valid frames | 2 | Number of consecutive forwarding or reversed frames that this resource allocation applies to |
| Reserved | 1 | To make the size of this IE equal 32 bits |
| } | | |

Direct-link feedback channel (DL-FBCH) carry channel quality feedback, MIMO feedback, and event-driven indicators between forwarding and forwarded HR-MS. DL-FBCH follows the same physical structure as that of the Primary Fast Feedback channel, i.e., PFBCH. However, the encoding mechanism for DL-FBCH is not the same as that for PFBCH. The OFDMA resource allocated to PFBCH shall be time-shared by DL-FBCH.

Ranging channel is used by both forwarding and forwarded HR-MS to achieved transmission synchronization between them.

The transmission of initial ranging code by the new HR-MS shall follow:

For frame configuration without FDM-based UL PUSC zone support:

In the time domain, the S-RCH allocation is specified by the subframe offset $O_{SF}$ transmitted in S-NCI, i.e., ranging opportunity is located at mod$(O_{SF}+1, NUL)^{th}$ uplink AAI subframe of a particular frame. The information for ranging frequency resource allocation, i.e., the subband index for ranging resource allocation is determined by the IDcell of the superordinate HR-BS (transmitted in I-NCI) and the allocated number of subbands $R_{SB}$ according to the following equation, where $R_{SB}$ is $L_{SB\text{-}CRU, FPi}/4$, where $L_{SBCRU, FPi}$ is the number of allocated subband CRUs for $FP_i$ corresponding to reuse 1 partition or power-boosted reuse 3 partition only if there is no reuse 1 partition.

$I_{SB,s}=\text{mod}(IDcell+1, R_{SB})$, where $I_{SB,s}$ denotes the subband index (0, . . . , $R_{SB}-1$) for ranging resource allocation among $R_{SB}$ subbands.

For frame configuration with FDM-based UL PUSC zone support:

The un-associated HR-MS shall transmit ranging preamble in a similar way to what specified in 802.16m-2011.

As all uplink control channels described in 6.3.8, including feedback channels, BR channel, Ranging channel span 6 OFDMA symbols of the allocated subframe, so do the corresponding physical control channels between forwarding and forwarded HR-MS. When forwarded HR-MS transmits control/data messages toward forwarding HR-MS, the transmissions span the last 5 OFDMA symbols of the corresponding subframe.

When HR-BS allocates uplink resource for the forwarding HR-MS for its own uplink transmission, if the allocated subframe that is calculated based on the A-MAP relevance and HARQ timing is the same as a subframe that is allocated to one of the attached forwarded HR-MSs, the subframe allocated to the forwarding HR-MS shall be delayed until the earliest subframe that is not allocated to any of the forwarding HR-MS's forwarded HR-MSs.

The forwarding HR-MS may also need to switch between transmitting and receiving states during uplink subframes to allow forwarded HR-MS to transmit to the forwarding HR-MS in an uplink subframe. When doing so:

If a forwarded HR-MS is going to transmit in a particular uplink subframe and the transmission does not span the first OFDMA symbol of that subframe, and if prior to that subframe, the forwarding HR-MS is in the transmitting state, then the forwarding HR-MS shall switch from the transmitting to the receiving state during the unoccupied first OFDMA symbol of the subframe allocated to the forwarded HR-MS to transmit.

If a forwarded HR-MS is going to transmit in a particular uplink subframe and the transmission spans the entire subframe, and if in the subframe that precedes the first subframe, the forwarding HR-MS also needs to transmit to the HR-BS, then the transmission by the forwarding HR-MS shall not occupy the last OFDMA symbol of the subframe that is used by the forwarding HR-MS to transmit to the HR-BS. The forwarding HR-MS shall use this unoccupied last OFDMA symbol for switching from the transmitting state to the receiving state.

If a forwarded HR-MS is going to transmit in a particular uplink subframe and if the forwarding HR-MS needs to transmit to the HR-BS in the next uplink subframe, then the transmission by the forwarding HR-MS in this next subframe shall not occupy the first OFDMA symbol of the subframe. The forwarding HR-MS shall use this unoccupied first OFDMA symbol for switching from the receiving state to the transmitting state.

S1.4 Support of HARQ Operation:

HARQ functions are supported for unicast transmissions to/from forwarded HR-MS. The detailed HARQ operation depends on whether the forwarded HR-MS is inside or outside of HR-BS/RS coverage.

The procedure for HARQ transmissions from an inside-of-coverage forwarded HR-MS toward the serving HR-BS/RS can be described as follows.

HR-BS/RS initiates the process by transmitting a UL assignment A-MAP IE corresponding to the STID of the forwarded HR-MS.

Forwarding HR-MS, by decoding the UL assignment A-MAP IE using STID of its associated forwarded HR-MS, recognizes the scheduled UL transmission and shall attempt to receive the scheduled transmission. For the forwarded HR-MS, the UL HARQ transmission follows the same specifications for UL HARQ in 802.16m-2011.

Based on the UL HARQ specifications in 802.16m-2011, serving HR-BS/RS transmits the corresponding HARQ ACK/NACK toward the forwarded HR-MS. The forwarding HR-MS shall also attempt to receive the DL HARQ feedback from serving HR-BS/RS.

If the feedback from serving HR-BS/RS is an NACK while the forwarding HR-MS was able to successfully decode the UL transmission from the forwarded HR-MS, the forwarding HR-MS shall transmit an ACK in an UL HARQ feedback channel and wait for the UL resource to be assigned by serving HR-BS/RS to forward the successfully decoded packet. Here, the UL HARQ feedback channel used by the forwarding HR-MS shall be specified by the same "HFA" field in the original UL assignment IE (that is used to specify the DL HARQ feedback channel for the serving HR-BS/RS). HR-BS allocated UL resource to the forwarding HR-MS using an UL assignment A-MAP IE with the STID of the forwarding HR-MS. The forwarding HR-MS recognizes that the UL assignment A-MAP IE is for forwarding the packet received from forwarded HR-MS by comparing the ACID field of the first UL assignment A-MAP (for forwarded HR-MS and with forwarded HR-MS's STID) and the second US assignment A-MAP (for forwarding HR-MS and with forwarding HR-MS's STID).

For the case when forwarded HR-MS is outside of coverage of HR-BS/RS, HARQ is carried out in a hop-by-hop/stop-and-wait manner. In the DL (UL), the forwarding HR-MS follows HARQ operation as specified in 802.16m-2011 to receive (transmit) unicast data traffic and unicast MAC control messages from (to) the serving HR-BS/RS on behalf of its associated forwarded HR-MS. In the DL (UL), the forwarding HR-MS only forwards successfully decoded packets toward forwarded HR-MS (HR-BS/RS). The HARQ procedures for transmissions between HR-BS/RS and forwarded HR-MS are described next.

The procedure for HARQ transmissions from HR-BS/RS toward an outside-of-coverage forwarded HR-MS can be described as follows.

HR-BS/RS initiates the process by transmitting a DL assignment A-MAP IE corresponding to the STID of the forwarded HR-MS.

Forwarding HR-MS, by decoding the DL assignment A-MAP IE using STID of its forwarded HR-MS, recognizes the scheduled DL transmission and proceeds to receive according to the HARQ procedure described in 802.16m-2011. Following that procedure, upon successfully decoding the DL packet (destined for its forwarded HR-MS), the forwarding HR-MS transmits an ACK toward the HR-BS/RS.

HR-BS/RS allocates resource in the UL for the forwarding HR-MS to forward the received packet toward its forwarded HR-MS. This allocation is conveyed through an FTN Assignment A-MAP IE corresponding to the STID of the forwarded HR-MS, with the same value of ACID as specified in the original DL assignment A-MAP IE. By matching the ACID field of the DL assignment A-MAP IE and FTN Assignment A-MAP IE, the forwarding HR-MS can recognize the resource allocated for the HARQ forwarding operation. This assignment IE can be transmitted before or after HR-BS/RS receives the ACK from forwarding HR-MS. In either case, the resource allocation only becomes valid from the forwarding frame that follows the frame in which forwarding HR-MS transmits ACK toward the HR-BS/RS. The resource allocation will be valid for a number of consecutive forwarding frames specified by the field "Number of valid frames" of the FTN Assignment A-MAP IE.

After successfully decoding the packet from HR-BS/RS, forwarding HR-MS transmits F-MAP IE and the corresponding HARQ subpacket toward the forwarded HR-MS. The location of the F-MAP block to be used is specified in the original FTN Assignment A-MAP IE. The fields Resource Index, HFA, and ACID are copied from the original FTN Assignment A-MAP IE to the F-MAP IE. The HARQ operation between forwarding and forwarded HR-MSs follows a synchronous procedure as specified bellow:

HARQ subpackets are generated and transmitted as specified in 6.2.14.1, with the forwarding HR-MS behaves like an ABS.

HARQ subpacket is transmitted toward the forwarded HR-MS in the subframe that is specified by the "Allocation offset" field in the F-MAP IE.

The forwarded HR-MS shall attempt to decode the burst. If the decoding is successful, the forwarded HR-MS sends an ACK toward the forwarding HR-MS in the frame that follows the HARQ transmission, i.e., in the next reversed frame. Otherwise, the forwarded HR-MS sends an NACK in the frame that follows the HARQ transmission. The HARQ feedback channel used to convey ACK/NACK is specified by the HFA field of the F-MAP IE.

If the HARQ feedback from the forwarded HR-MS is an ACK, the forwarding HR-MS transmits an ACK toward the HR-BS/RS.

If the HARQ feedback from the forwarded HR-MS is an NACK and the resource allocated for forwarding the packet is still valid (based on the field "Number of valid frames" of the original FTN Assignment A-MAP IE), the forwarding HR-MS shall carry out retransmission in the same allocated resource in the next forwarding frame. Otherwise, the forwarding HR-MS may request for extra resource from HR-BS/RS by sending a NACK toward HR-BS/RS. Whether or not a request for extra resource should be sent is specified by the field "Extra Resource Indicator" in the original FTN Assignment A-MAP IE.

In the previous steps, when forwarding HR-MS sends ACK/NACK toward HR-BS/RS, it shall do so using the same HARQ feedback channel specified by the HFA field of the FTN Assignment A-MAP IE. This means that such a HARQ feedback channel is used by forwarding HR-MS during forwarding frames (to transmit to HR-BS/RS) and by forwarded HR-MS during reversed frames (to feedback to forwarding HR-MS).

The procedure for HARQ transmissions from a outside-of-coverage HR-MS toward HR-BS/RS can be described as follows.

HR-BS initiates the process by transmitting an FTN Assignment A-MAP IE corresponding to the STID of the forwarded HR-MS.

Forwarding HR-MS, by decoding the FTN Assignment A-MAP IE using STID of its forwarded HR-MS, recognizes the scheduled FTN transmission. Forwarding HR-MS then translates the FTN Assignment A-MAP IE into an F-MAP IE and transmits toward the corresponding forwarded HR-MS in the coming forwarding frame. The location of the F-MAP block to be used for the transmission is specified in the FTN Assignment A-MAP IE. The fields Resource Index, HFA, and ACID are copied from the Forwarding Assignment A-MAP IE to the F-MAP IE.

Based on the received F-MAP IE, the forwarded HR-MS starts transmission toward forwarding HR-MS. The HARQ operation between forwarded and forwarding HR-MSs follows a synchronous procedure as specified bellow:

HARQ subpackets are generated and transmitted as specified in 802.16m-2011, with the forwarded HR-MS behaves like an AMS.

HARQ subpacket is transmitted toward the forwarding HR-MS in the subframe that is specified by the "Allocation offset" field in the F-MAP IE. In particular, if the F-MAP IE is transmitted in an F-MAP block within a particular subframe with index "n" within a forwarding frame, then the corresponding HARQ transmission shall be located in the subframe with index equal "Allocation offset+n" within the next reversed frame.

The forwarding HR-MS shall attempt to decode the burst. If the decoding is successful, the forwarding HR-MS sends an ACK toward the forwarded HR-MS in the frame that follows the HARQ transmission, i.e., in the next forwarding frame. Otherwise, the forwarding HR-MS sends an NACK in the frame that follows the HARQ transmission. The HARQ feedback channel used to convey ACK/NACK is specified by the HFA field of the F-MAP IE.

If the HARQ feedback from the forwarding HR-MS is an NACK and the resource allocated for HARQ transmission from forwarded HR-MS is still valid (based on the field "Number of valid frames" of the original FTN Assignment A-MAP IE), the forwarded HR-MS shall carry out retransmission in the same allocated resource in the next forwarding frame.

Upon successfully decoding the packet from the forwarded HR-MS, the forwarding HR-MS shall proceed to forward the received packet to the HR-BS/RS. The UL resource for the forwarding HR-MS to forward such a packet is allocated through an UL assignment A-MAP IE. This UL assignment A-MAP IE corresponds to the STID of the forwarding HR-MS with the same ACID field as in the original FTN Assignment A-MAP IE. By matching the ACID field of the UL assignment A-MAP IE and FTN Assignment A-MAP IE, the forwarding HR-MS can recognize the resource allocated for the HARQ forwarding operation. The UL assignment A-MAP IE can be sent in either of the following ways:

It is transmitted when forwarding HR-MS, upon successfully decoding the packet from forwarded HR-MS, transmits an ACK to the HR-BS/RS on the same HARQ feedback channel specified by the HFA field in the original FTN Assignment A-MAP IE.

It is transmitted when forwarding HR-BS/RS, upon monitoring the HARQ feedback channel specified by the HFA field in the original FTN Assignment A-MAP IE, detects an ACK transmitted by forwarding HR-MS toward forwarded HR-MS.

Figure 14:
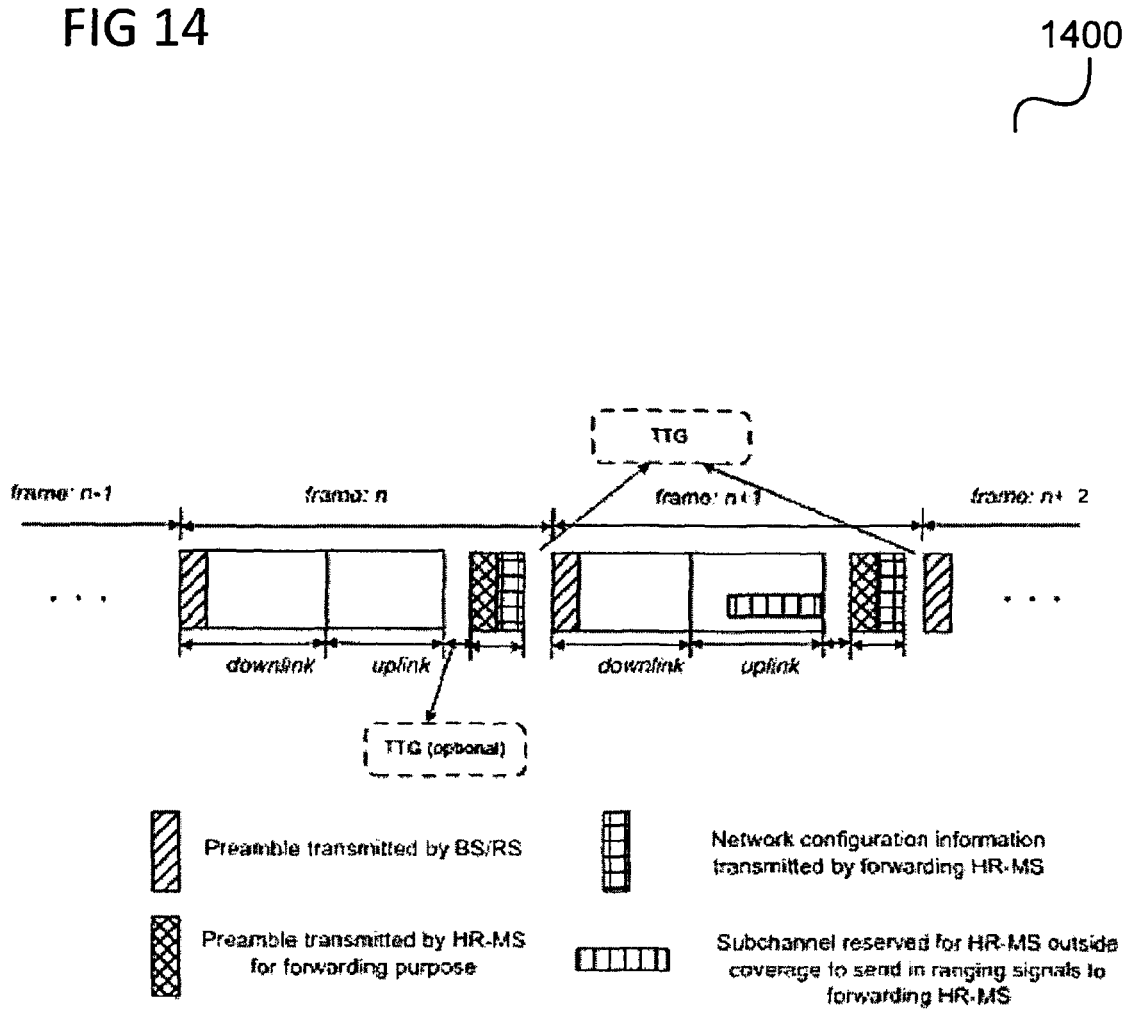
FIG. 14 shows a 802.16-2009-based coverage extension process according to an embodiment.

16e Coverage Extension Process:

FIG. 14 shows a 16e coverage extension process according to an embodiment.

The 16e coverage extension process 1400 includes frame n−1, frame n, frame n+1, and frame n+2.

In an embodiment, a method is provided for the coverage extension for 802.16e network 1. Some HR-MS may be required to help HR-BS/HR-RS in coverage extension.
2. The 802.16e based HR-BS may reserve some time, for example two or three symbol durations, for HR-MS who helps HR-BS/HR-RS in forwarding to transmit the coverage extension signals.
3. In case three preamble durations are reserved, the first one may be used as TTG.
4. Other HR-MSs associated to the same HR-BS/HR-RS who are not transmitting state should listening to channel and use the signal for neighbor discovery.
5. The HR-MS should transmit a preamble in the first symbol reserved if only two symbol durations are reserved.
6. The HR-MS should transmit a preamble in the second symbol reserved if three symbol durations are reserved.
7. The HR-MS who may in forwarding should transmit some network configuration information following the preamble. The information is similar to what contained in the Frame Control Head of 802.16e network. A ranging sub-channel and ranging code allocation information should contain in the transmitted network configuration information. The location of ranging channel can be a few frames later than the current frame, not necessarily to be the frame next to the current one.
8. For HR-MS outside the coverage that has intension to associate with the HR-BS, it may send in ranging code after receiving the preamble and network configuration information transmitted by the forwarding HR-MS.

Coverage Extension in 802.16-2009-Based Networks:

Additionally, in another embodiment, FIG. 14 may also show a method for the coverage extension for 802.16e network.

Some HR-MS may be required to help HR-BS/HR-RS in coverage extension.

The 802.16e based HR-BS may reserve some time, for example three or four symbol durations, for HR-MS who helps HR-BS/HR-RS in forwarding to transmit the coverage extension signals. The first symbol duration can either be used as gap for transceiver to change their state or being used to transmit preambles. System configuration information may be transmitted for network discovering purpose. Symbol duration follows the preamble can be used to transmit system configuration information. For example, in case duration of three symbols is reserved, the first symbol is used for preamble transmission and the second and third symbols are used for system configuration information transmission. In case duration of four symbols or more is reserved, the first symbol may be used as gap for transceiver state change and rest duration is used for preamble and system information transmission. Another possibility is to let the HR-MS transmit preambles at the same location as the frame preamble transmitted by the HR-BS. In this case, the HR-MS may derive the location of system configuration from information contained in the preamble, for example the index of preambles. The HR-MS may transmit the system configuration information at a predefined location, the location can be either at the uplink or downlink. After receive this system configuration information, the HR-MS outside coverage can derive the location of sub-channels for it to send in access/registration request.

Other HR-MSs associated to the same HR-BS/HR-RS who are not transmitting state should listening to channel and use the signal for neighbor discovery.

The HR-MS who may in forwarding may transmit some network configuration information following the preamble. The information is similar to what contained in the Frame Control Header of 802.16e network. A ranging sub-channel and ranging code allocation information should contain in the transmitted network configuration information. The location of ranging channel can be a few frames later than the current frame, not necessarily to be the frame next to the current one.

For HR-MS outside the coverage that has intension to associate with the HR-BS, it may send in ranging code after receiving the preamble and network configuration information transmitted by the forwarding HR-MS.

After receiving the ranging code from HR-MS outside the coverage, the HR-MS who transmit the preamble and/or network configuration information may forward the information to base station.

Method to Support HR-MS Forwarding to Network in 802.16-2009-Based HR Network:

One of the requirements of the currently being developed IEEE 802.16n standard is to support HR-MS forwarding to network (FTN), i.e., when one HR-MS helps forward data and control messages between another HR-MS and an HR-BS/RS. Specifications must be made based on two standard baselines, i.e., IEEE 802.16m-2011 (IEEE 802.16TM-2011, IEEE Standard for Local and metropolitan area networks; Part 16: *Air Interface for Broadband Wireless Access Systems; Amendment* 3: Advanced Air Interface," May 2011), also referred to as 802.16.1, and 802.16-2009 (IEEE Std. 802.16TM-2009, "IEEE Standard for Local and metropolitan area networks; Part 16: Air Interface for Broadband Wireless Access Systems," May 2009), also referred to as 802.16Rev3. An embodiment of this disclosure describes the corresponding approach to support HR-MS FTN for the 802.16n network that is based on the 802.16-1009-baseline.

In an embodiment, termed 802.16-2009-based Coverage Extension Scheme, comprises:

The serving HR-BS/RS reserves a zone at the end of the uplink sub frame for the purpose of signaling between forwarding and forwarded HR-MS. The reserved zone, called Forwarding Control Zone (FCZ), consists of at least 3 OFDMA symbols.

Within some FCZ zones, the serving HR-BS/RS schedule a forwarding HR-MS to transmit a preamble in one OFDMA symbol. The preamble is taken from the same set of frame preambles transmitted by HR-BS/RS. The preamble is assigned to the forwarding HR-MS by the serving HR-BS/RS.

In the 2 OFDMA symbols that immediately follow the OFDMA symbol in which the forwarding HR-MS transmits the preamble, the forwarding HR-MS transmits a signaling message called MS Frame Control Header (M-FCH).

In the OFDMA slots that follow the M-FCH, the forwarding HR-MS transmits Network Configuration Information (NCI). Here, one OFDMA slot is a time-frequency resource unit defined as a one OFDMA subchannel by two consecutive OFDMA symbols, as specified for the DL transmission in 802.16-2009 (IEEE Std. 802.16TM-2009, "IEEE Standard for Local and metropolitan area networks; Part 16: Air Interface for Broadband Wireless Access Systems," May 2009).

A new/unassociated HR-MS which is able to receive those preamble, M-FCH, and NCI from the forwarding HR-MS and decides to carry out network entry through this forwarding HR-MS shall transmit CDMA ranging codes toward the forwarding HR-MS. The CDMA ranging codes are transmitted in some FCZ zones that are different from the FCZ zones in which the forwarding HR-MS transmits preambles, M-FCH, and NCI.

The forwarding HR-MS, upon detecting a CDMA ranging code from the new HR-MS in some FCZ zone, shall assist the new HR-MS to complete network entry with the serving HR-BS.

When the new HR-MS has completed network entry and become associated with the network through the forwarding HR-MS, the newly associated HR-MS is termed forwarded HR-MS. Subsequently, the forwarding HR-MS continue to forward data and control messages between the serving HR-BS and the forwarded HR-MS.

OFDMA resources for data and control messages between forwarding and forwarding HR-MS are allocated within the uplink sub frame of the serving HR-BS/RS. Resources for data communication are allocated outside of the FCZ zone. The serving HR-BS/RS allocates communication resources to the forwarded HR-MS through an UL-MAP information element (UL-MAP IE) addressing to the forwarding HR-MS. Upon receiving such a resource allocation, the forwarding HR-MS conveys the allocation to the allocated HR-MS through an information element within the so-called Forwarding MAP (F-MAP). F-MAP is located within the FCZ zone.

OFDMA resources are also allocated for fast-feedback between forwarding and forwarded HR-MS. These feedback channels can be used to support power control.

In the above 802.16-2009-based Coverage Extension Scheme, when the forwarding HR-MS transmits M-FCH and NCI in the FCZ, the OFDMA subcarriers shall be allocated to this FCZ in the same way they are allocated to the first DL zone of the serving HR-BS, with the exception that the IDCell (or DL_PermBase) parameter used for OFDMA subcarrier allocation is the one conveyed by the preamble transmitted by the forwarding HR-MS.

In the above 802.16-2009-based Coverage Extension Scheme, when the forwarding HR-MS transmits M-FCH, the location of the M-FCH within FCZ is determined in the same way that the location of the FCH is determined within the first DL zone of the serving HR-BS, i.e., as specified in Section 8.4.4 (IEEE Std. 802.16TM-2009, "IEEE Standard for Local and metropolitan area networks; Part 16: Air Interface for Broadband Wireless Access Systems," May 2009), with the exception that the IDCell (or DL_PermBase) parameter used for OFDMA subcarrier allocation is the one conveyed by the preamble transmitted by the forwarding HR-MS.

In the above 802.16-2009-based Coverage Extension Scheme, the format of the M-FCH is similar to the format of the FCH transmitted by a base station, with the following exceptions (non-exclusive):

One of the reserved bits inside the FCH is set to 1 inside the M-FCH. This allows a new/unassociated HR-MS who detects the preamble and M-FCH from the forwarding HR-MS to differentiate these from a preamble and FCH transmitted by an HR-BS/RS.

Instead of conveying information regarding the DL-MAP as in the FCH, in the M-FCH, information regarding NCI is conveyed.

In the above 802.16-2009-based Coverage Extension Scheme, upon reading the M-FCH, a new/unassociated HR-MS shall be able to locate and decode the NCI. The NCI shall be transmitted in the OFDMA slots that follow the M-FCH and within the same FCZ, with a possible slot offset. Such slot offset specifies the gap between the end of M-FCH and the beginning of the corresponding NCI, and is conveyed inside the M-FCH.

In the above 802.16-2009-based Coverage Extension Scheme, the NCI conveys instruction for a new HR-MS to start sending in CDMA ranging codes toward the forwarding HR-MS. These instructions include the CDMA ranging codes that can be used, and the ranging slot in which the codes can be transmitted.

In one embodiment, the ranging slots are allocated inside the FCZ within a frame which is different from the frame in which M-FCH and NCI are transmitted. In another embodiment, the ranging slots are allocated in the portion of the uplink sub frame that is outside of the FCZ. In both cases, OFDMA subcarriers shall be allocated to the area in which the ranging codes are transmitted in the same way they are allocated to the uplink sub frame of the serving HR-BS/RS, as specified in Section 8.4.6 of IEEE Std. 802.16TM-2009, "IEEE Standard for Local and metropolitan area networks; Part 16: Air Interface for Broadband Wireless Access Systems," May 2009. The parameters governing this OFDMA subcarrier allocation are conveyed inside the NCI.

In the above 802.16-2009-based Coverage Extension Scheme, upon decoding a ranging code transmitted by the new HR-MS, the HR-MS shall response with the ranging status and possible time/frequency/power adjustments.

In one embodiment, the ranging response from the forwarding HR-MS is transmitted inside the FCZ within the frame that follows the frame in which the CDMA ranging code was transmitted. In another embodiment, the ranging response from the forwarding HR-MS is transmitted inside the normal uplink portion (that is outside of the FCZ) of the frame that follows the frame in which the CDMA ranging code was transmitted. In both cases, the location of the ranging response shall be conveyed inside either the NCI or F-MAP.

In the above 802.16-2009-based Coverage Extension Scheme, the F-MAP is transmitted inside the FCZ, with its location specified inside the NCI that is transmitted in the same FCZ. In one embodiment, the location of the F-MAP is specified through the slot offset and F-MAP length. The slot offset specifies the gap between the end of the NCI and the beginning of the F-MAP.

In the above 802.16-2009-based Coverage Extension Scheme, the coding/modulation schemes used for NCI are conveyed inside the M-FCH.

In one embodiment, the coding/modulation schemes used for the F-MAP, ranging response, and any other transmissions from the forwarding HR-MS inside the FCZ are the same as that of the NCI. In another embodiment, the coding/modulation schemes of F-MAP, ranging response are explicitly specified inside the NCI.

In the above 802.16-2009-based Coverage Extension Scheme, the F-MAP conveys OFDMA resource allocation in both directions, i.e., from forwarding HR-MS and from forwarded HR-MS. For each resource allocation, transmission parameters such as coding/modulation and transmit power shall be conveyed within an F-MAP information element.

In the above 802.16-2009-based Coverage Extension Scheme, the fast-feedback channels in the direction from the forwarded toward the forwarding HR-MSs shall be allocated inside the FCZ. The configuration of such channels shall be the same as that of the normal uplink fast-feedback channels defined in IEEE 802.16-2009 (IEEE Std. 802.16TM-2009, "IEEE Standard for Local and metropolitan area networks; Part 16: Air Interface for Broadband Wireless Access Systems," May 2009). Fast-feedback channel is allocated to the forwarded HR-MS through F-MAP.

An Embodiment to Support HR-MS FTN in 802.16n Network Following the 802.16-2009-Baseline:
Supporting Bandwidth Requests from Forwarded MS:

In other embodiments, supporting bandwidth requests from forwarded MSs is a critical component in coverage extension. The various embodiments illustrate two approaches to allow an out-of-coverage forwarded MS (denoted MS3) to request bandwidth to transmit data/control messages toward its forwarding MS (denoted MS1). The first approach is based on transmitting Bandwidth Request (BR preambles) in an uplink sub frame. The second approach is based on transmitting another type of BR preambles in the first symbol of the fourth frame of a superframe.

Figure 16:
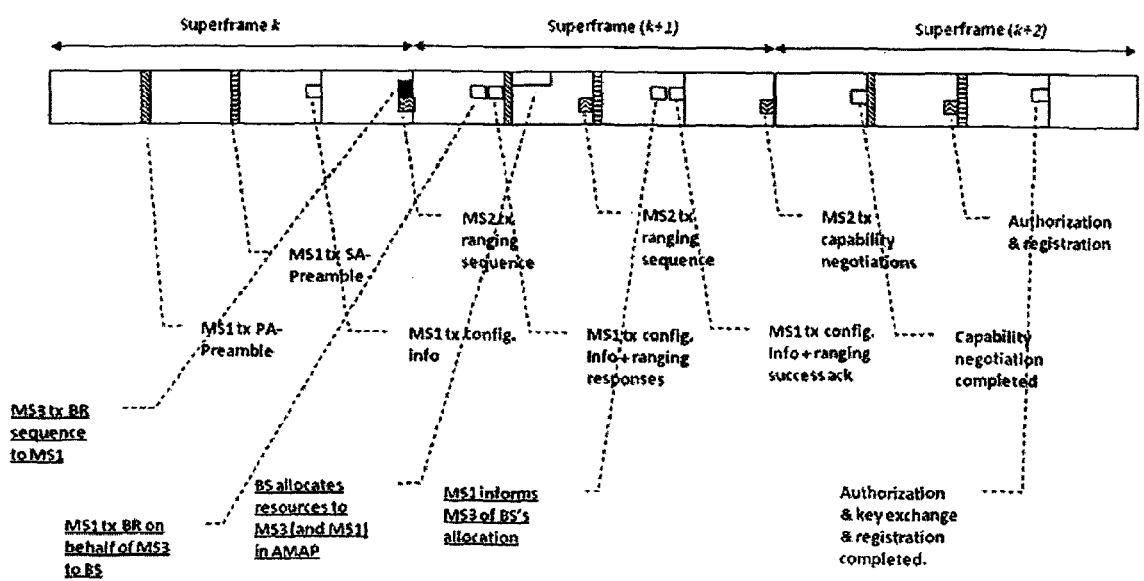
FIG. 16 shows transmitting BR preambles in UL sub frame according to an embodiment.

FIG. 16 shows transmitting BR preambles in UL sub frame according to an embodiment.

The transmitting BR preambles in UL sub frame process 1600 includes superframe, superframe k+1, and superframe k+2.

This embodiment includes properties of uplink bandwidth requests in 802.16-2009 and 802.16m. This embodiment provides that that the forwarding MS1 is in charge of forwarding the BR messages to BS. In particular, this approach comprises of the following steps:

A. BS schedules resources in an uplink sub frame for MS3 to transmit BR messages to MS1.

B. MS1, upon receiving BR messages from MS3, forwards the requests to BS.

C. BS announces bandwidth allocations for MS3 in A-MAP.

D. MS1 reads the A-MAP, discovers resource assignments for MS3, and forwards this information to MS3.

In the above process, the BR sequences transmitted by MS3 can be the same as those transmitted by an MS in a normal 16m contention-based bandwidth-request procedure.

In the above process, upon receiving BR request messages from MS3, MS1 may decide to donate part of its uplink allocation (given to MS1 by BS) to MS3. MS3 can use this donated uplink resource to transmit time-critical data/control messages, or to further illustrate its needs for bandwidth.

In this embodiment, Out-of-coverage MS3 transmits BW requests to registered MS1 via a Bandwidth Request preamble in a uplink sub frame (also illustrated is an out-of-coverage MS2 going through network entry following our proposed coverage extension approach).

Figure 17:
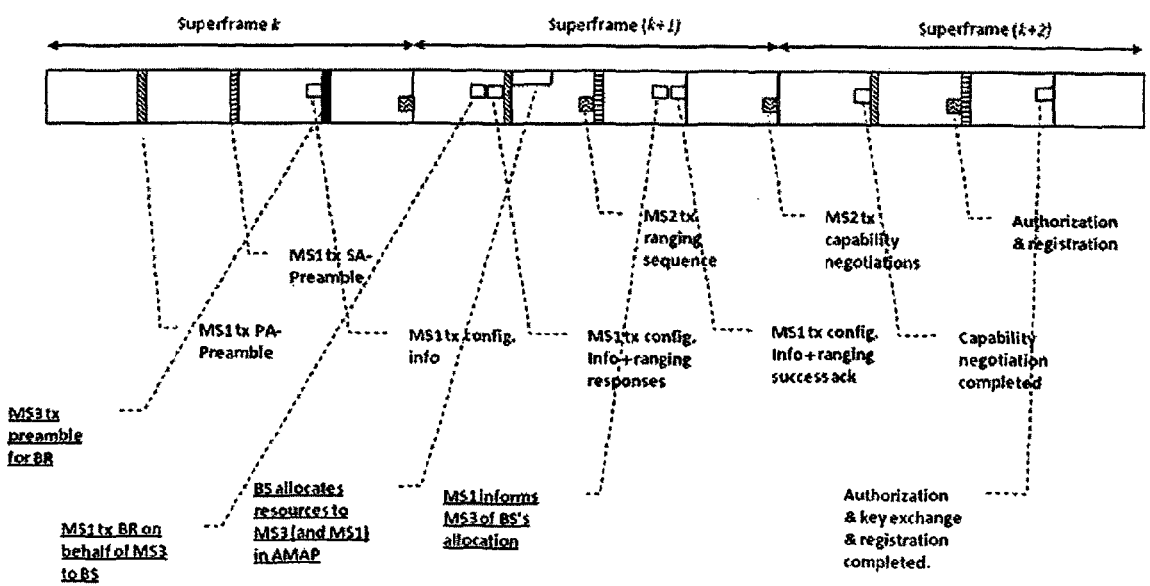
FIG. 17 shows transmitting BR preambles in first OFDMA symbol of the fourth frame according to an embodiment.

FIG. 17 shows transmitting BR preambles in first OFDMA symbol of the fourth frame according to an embodiment.

The transmitting BR preambles in first OFDMA symbol of the fourth frame process 1700 includes superframe, superframe k+1, and superframe k+2.

This approach is different from the approach in FIG. 16 in the way that the bandwidth request is transmitted as a preamble during the first OMDMA symbol of the fourth frame within a superframe. In 802.16m, BS and RS normally do not transmit preamble at the fourth frame (as this location is sometime used for downlink location based services). The process goes as follows:

A. MS3 picks a preamble among a set of predefined preambles and maps it into the first OFMA symbol of the fourth frame of a superframe and transmit toward MS1.

B. MS1, upon receiving BR preamble from MS3, forwards the requests to BS.

C. BS announces bandwidth allocations for MS3 in A-MAP.

D. MS1 reads the A-MAP, discovers resource assignments for MS3, and forwards this information to MS3.

In the above process, MS1 shall always monitor the first OFDMA symbol of the fourth frame to determine if any preamble is transmitted. Furthermore, when receiving a preamble being transmitted in this location, MS1 shall be able to determine if such preamble was transmitted by one of the MSs that MS1 helps forwarding data. This can be achieved by multiplexing some control message within the preamble sequence. Such control message, say, includes information about MS3 (and its bandwidth desire). Another method to allow MS1 to determine whether the received preamble is from one of its associated forwarded MSs is by allocating non-overlapping set of preambles to MSs associated with different forwarding MSs. The preamble sequences need not span the whole system bandwidth.

After detecting the request from MS3, the actions taken by MS1 are similar to those in FIG. 16.

In an embodiment, out-of-coverage MS3 transmits BW requests to registered MS1 via a preamble transmitted at the first symbol of the $4^{th}$ frame (also illustrated is an out-of-coverage MS2 going through network entry following our proposed coverage extension approach).

S2: Another Embodiment to Support HR-MS FTN in 802.16n Network following the 802.16-2009-Baseline:
S2.1: TDD Frame Structure to Support 802.16-2009-Based FTN A forwarding HR-MS and an inside-of-coverage forwarded HR-MS fully follow the frame configurations set by the serving HR-BS/RS, as described in 802.16-2009.

Figure 15:
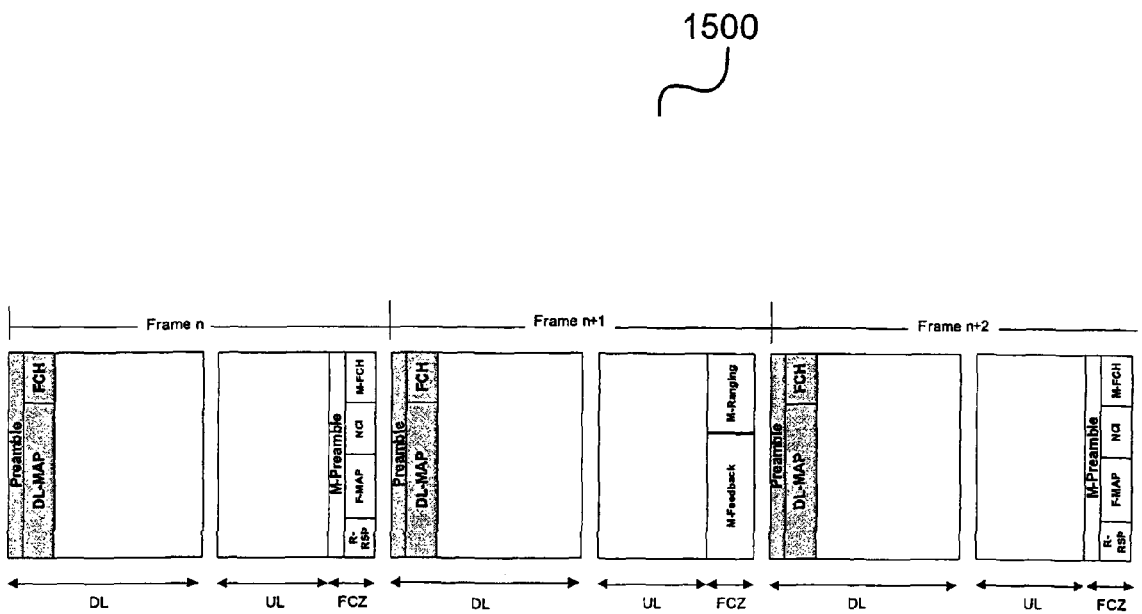
FIG. 15 shows a frame structure to support 802.16-2009-based forwarding to network according to an embodiment.

To support a forwarded HR-MS that is outside-of-coverage of the serving HR-BS/RS, the TDD frame structure in FIG. 15 shall be applied. The serving HR-BS/RS reserves a zone, called Forwarding Control Zone (FCZ), at the end of the uplink subframe for carrying control signaling between forwarding and forwarded HR-MS. The FCZ consists of 3 OFDMA symbols and is assigned to forwarding and forwarded HR-MS in an alternating manner, i.e., in one frame, the FCZ is reserved for forwarding HR-MS to transmit control signaling while in the next frame, the FCZ is reserved for forwarded HR-MS to transmit control signaling, and so on.

For frames in which FCZ is allocated to transmissions by forwarding HR-MS:

In the first OFDMA symbol of the FCZ, forwarding HR-MS transmits a preamble that is assigned from the same set of frame preambles used by HR-BS/RS. In the remaining two OFDMA symbols of the FCZ, the forwarding HR-MS transmits MS Frame Control Header (M-FCH), Network Configuration Information (NCI), Forwarding MAP (F-MAP), and responses to ranging from forwarded HR-MS. The format of M-FCH is described in Tables 9.1 and 9.2. By decoding the M-FCH, a new HR-MS can subsequently receive NCI. The information carried inside the NCI allows a new HR-MS to receive F-MAP and ranging responses. The format of NCI and F-MAP are described in Table 10 and Table 11, respectively. The FCZ zone has PUSC subcarrier allocations and follows the same specifications for the first DL zone of an HR-BS, with the IDCell being that of the preamble transmitted by the forwarding HR-MS.

For frames in which FCZ is allocated to transmissions by forwarded HR-MS:

Forwarded HR-MS transmits ranging codes and fast feedback channels over the three OFDMA symbols in the allocated FCZ. OFDMA subcarrier allocation for this FCZ follows the same specifications for the UL subframe of HR-BS.

M-FCH carries Forwarding zone prefix information. The structure of Forwarding zone prefix is similar to the DL frame prefix transmitted by serving HR-BS, with a 1-bit field "Forwarding_HR-MS_Indicator" set to 0bi to let outside-of-coverage HR-MS know that the transmission is by a forwarding HR-MS. The content of Forwarding zone prefix is described in Table 9.1 for FFT sizes of 2048, 1024, and 512, and in Table 9.2 for FFT size of 128.

TABLE 9.1

OFDMA Forwarding Zone Prefix format for FFT sizes except 128

| Syntax | Size (bit) | Notes |
| --- | --- | --- |
| Forwarding_Frame_Prefix_Format( ) { | | |
| Used subchannel bitmap | 6 | Bit 0: Subchannel group 0<br>Bit 1: Subchannel group 1<br>Bit 2: Subchannel group 2<br>Bit 3: Subchannel group 3<br>Bit 4: Subchannel group 4<br>Bit 5: Subchannel group 5 |
| Forwarding_HR-MS_Indicator | 1 | Shall be set to 1. Note: equal to zero in the FCH transmitted by HR-BS |
| Repetition_Coding_Indicator | 2 | 0b00: No repetition coding on NCI<br>0b01: Repetition coding of 2 used on NCI<br>0b10: Repetition coding of 4 used on NCI<br>0b11: Repetition coding of 6 used on NCI |
| Coding_Indicator | 2 | 0b00: CC encoding used on NCI<br>0b01: BTC encoding used on NCI<br>0b10: CTC encoding used on NCI<br>0b11: ZT CC encoding used on NCI |
| NCI_Length | 6 | |
| Subchannel offset for NCI | 3 | Indicates the gap, in number of subchannels, between the end of M-FCH and the beginning of NCI. |
| Reserved } | 4 | Shall be set to zero |

Used Subchannel Bitmap

A bitmap indicating which groups of subchannel are used on this zone for coverage extension. A value of 1 means used by this segment, and '0' means not used by this segment.

Forwarding_HR-MS_Indicator

Indicates to the receiving HR-MS that this is a Forwarding zone prefix (from a forwarding HR-MS), and not a DL frame prefix.

Repetition_Coding_Indication

Indicates the repetition code used for the NCI.

Coding_Indication

Indicates the FEC encoding code used for the NCI. The NCI shall be transmitted with QPSK modulation at FEC rate ½.

NCI_Length

Defines the length in slots of the burst which contains the NCI.

Before being mapped to M-FCH, the 24-bit forwarding zone prefix shall be duplicated to form a 48-bit block, which is the minimal FEC block size.

TABLE 9.1

OFDMA Forwarding Zone Prefix format for FFT sizes except 128

| Syntax | Size (bit) | Notes |
|---|---|---|
| Forwarding_Frame_Prefix_Format( ) { | | |
| Used subchannel bitmap | 1 | 0: Subchannel 0 is used for segment 0, Subchannel 1 is used for segment 1, Subchannel 2 is used for segment 2, 1: Use all subchannels |
| Forwarding_HR-MS_Indicator | 1 | Shall be set to 1. Note: equal to zero in the FCH transmitted by HR-BS |
| Repetition_Coding_Indicator | 2 | 0b00: No repetition coding on NCI 0b01: Repetition coding of 2 used on NCI 0b10: Repetition coding of 4 used on NCI 0b11: Repetition coding of 6 used on NCI |
| Coding_Indicator | 2 | 0b00: CC encoding used on NCI 0b01: BTC encoding used on NCI 0b10: CTC encoding used on NCI 0b11: ZT CC encoding used on NCI |
| NCI_Length | 4 | |
| Subchannel offset for NCI | 2 | Indicates the gap, in number of subchannels, between the end of M-FCH and the beginning of NCI. |
| } | | |

Before being mapped to the M-FCH, the 12-bit Forwarding zone prefix shall be repeated four times to form a 48-bit block, which is the minimal FEC block size.

Subchannels are allocated to the M-FCH and NCI in the same way they are allocated to FCH and DL-MAP, as described in 802.16-2009.

The NCI message is transmitted by forwarding HR-MS to allow an outside-of-coverage HR-MS to carry out network entry. This message also contains configuration information used during FTN operation.

TABLE 10

NCI message format

| Syntax | Size (bit) | Notes |
|---|---|---|
| NCI_Message_Format( ) { | — | — |
| Management Message Type = [TBD] | 8 | — |
| PHY Synchronization Field | 8 | Specified in Table 319, 8 bits for frame duration. |
| Operator ID | 8 | 8 LSBs of the Operator ID |
| Reduced_NCI | 1 | |
| If(Reduced_NCI == 0b0){ | | |
| No. OFDMA symbols | 8 | For TDD, the number of OFDMA symbols in the UL subframe |
| UL_PermBase | 7 | UL_PermBase parameter for the subcarrier permutation to be used on the UL channel. |
| UL allocated subchannels bitmap | 70/22 | This is a bitmap describing the physical subchannels allocated to the segment in the UL, when using the UL PUSC permutation. The LSB shall correspond to subchannel 0. For any bit that is not set, the corresponding subchannel shall not be used by the SS on that segment. Equal 70 for 2048, 1024 FFT Equal 22 for 512, 256 FFT |
| Subchannel offset for ranging feedback | 7 | This value indicates start subchannel offset. Number of OFDMA slots allocated for ranging feedback in this case is fixed at 2. |
| }else{ | | |
| Subchannel offset for ranging | 5 | Counted from the beginning of FCZ assigned for transmissions by forwarded HR-MS |
| Ranging Method | 1 | 0b0: Initial ranging over two symbols 0b1: BR/periodic ranging over one symbol |
| Initial ranging codes | 5 | Indicates the CDMA codes used for initial ranging toward the forwarding HR-MS. 2 MSBs indicate index of starting code: 0b00: starting code index = 0 0b01: starting code index = 4 |

TABLE 10-continued

NCI message format

| Syntax | Size (bit) | Notes |
|---|---|---|
| | | 0b10: starting code index = 8 |
| | | 0b11: starting code index = 16 |
| | | 3 LSBs indicate number of codes used. The codes are contiguous from the starting code. |
| Forwarding HR-MS EIRP | 7 | Signed in units of 1 dBm. |
| EIRxPIR,max | 16 | Initial ranging maximum equivalent isotropic received power at forwarding HR-MS. Signed in units of 1 dBm. |
| Subchannel offset for ranging feedback | 7 | Counted from the beginning of FCZ. Number of OFDMA slots allocated for ranging feedback is fixed at 2. |
| Duration for ranging feedback | 2 | In OFDMA slots |
| Reserved | 1 | |
| } | | |
| F-MAP Length | 4 | In OFDMA slots |
| Subchannel offset for F-MAP | 5 | Indicates the gap, in number of subchannels, between the end of NCI and the beginning of F-MAP. |
| F-MAP repetition coding indicator | 2 | 0b00: No repetition coding on NCI<br>0b01: Repetition coding of 2 used on NCI<br>0b10: Repetition coding of 4 used on NCI<br>0b11: Repetition coding of 6 used on NCI |
| } | | |

Forwarding HR-MS transmits F-MAP in the FCZ zone to let its attached forwarded HR-MS know of the OFDMA resource allocations in the uplink subframe.

TABLE 11

F-MAP message format

| Syntax | Size (bit) | Notes |
|---|---|---|
| F-MAP_Message_Format( ) { | — | — |
| Management Message Type = [TBD] | 8 | — |
| No. of OFDMA symbols | 8 | For TDD, the number of OFDMA symbols in the UL subframe |
| Allocation Start Time | 30 | |
| Frame_Usage_Code | 2 | 0b00: Both next frame and the one following it are used for forwarding direction<br>0b01: Next frame is used for forwarding direction while the one following it is used for reversed direction<br>0b10: Next frame is used for reversed direction while the one following it is used for forwarding direction<br>0b11: Both next frame and the one following it are used for reversed direction |
| for (i=1; i <= n; i++){<br>   F-MAP_IE( )<br>} | | |
| if !(byte boundary){<br>Padding Nibble | 4 | Padding to reach byte boundary |
| }<br>} | | |

Each F-MAP IE has the format as described in Table 12.

TABLE 12

F-MAP IE format

| Syntax | Size (bit) | Notes |
|---|---|---|
| F-MAP_IE( ) { | — | — |
| Frame Indicator | 1 | 0b0: The burst is scheduled in the next frame<br>0b1: The burst is scheduled in the frame that follows the next frame. |
| CID | 16 | — |
| Extended_F-MAP_IE | 1 | |
| if(Extended_F-MAP_IE == 0b1){<br>Extended F-MAP IE<br>}else{ | | |
| FEC Code type and Modulation type | 5 | Values from 0 to 31 are interpreted as defined in Table 574. |

TABLE 12-continued

F-MAP IE format

| Syntax | Size (bit) | Notes |
|---|---|---|
| if ((Frame_Indicator == 0b0 && Frame_Usage_Code == 0b10 \|\| 0b11) \|\| (Frame_Indicator == 0b1 && Frame_Usage_Code == 0b00 \|\| 0b01)) { | | This allocation is for forwarded HR-MS |
| Ranging data ratio | 5 | Reducing factor in units of 1 dB, between the power used for this burst and power used for CDMA ranging. It shall be encoded as signed integer. |
| OFDMA symbol offset indicator | 6 | Represent number k which is used to calculate OFDMA symbol offset using the formula: Symbol_offset = 3*Round(k*4/3), where Round(x) returns the integer nearest to x. |
| Subchannel offset | 7 | The lowest index subchannel used for carrying the burst, starting from subchannel 0. |
| Duration | 7 | Indicates the duration, in units of OFDMA slots, of the allocation |
| }else{ | | |
| OFDMA symbol offset | 8 | This value indicates start symbol offset of this F-MAP allocation. The reference point of this offset is the start of UL subframe. |
| Subchannel offset | 7 | The lowest index subchannel used for carrying the burst, starting from subchannel 0. |
| Duration | 10 | Indicates the duration, in units of OFDMA slots, of the allocation |
| } } } | | |

Each Extended F-MAP IE has the format as described in Table 13.

TABLE 13

Extended F-MAP IE format

| Syntax | Size (bit) | Notes |
|---|---|---|
| Extended-F-MAP_IE( ) { | — | — |
| EFUC | 4 | 0x0 ... 0xF |
| Length | 4 | Length in bytes of Unspecified Data field |
| Unspecified data | variable | |
| } | | |

EFUC is defined in Table 14.

TABLE 14

EFUC code assignment

| EFUC (hexadecimal) | Usage |
|---|---|
| 0x0 | Fast-feedback for forwarded HR-MS |
| 0x1 ... 0xF | Reserved |

The format of fast feedback IE is specified in Table 15.

TABLE 15

Fast feedback IE format

| Syntax | Size (bit) | Notes |
|---|---|---|
| Fast-Feedback IE( ) { | — | — |
| EFUC | 4 | 0x0 |
| Length | 4 | 0x1 |
| Subchannel offset | 7 | The lowest index subchannel used for carrying the burst, starting from subchannel 0. |
| Reserved | 1 | |
| } | | |

Within FCZ zone, subchannels are allocated for M-FCH in the same way they are allocated to FCH in the first DL zone of HR-BS/RS. Subchannels are allocated for NCI in the same way that they are allocated to DL-MAP. Subchannel allocation for F-MAP is specified inside the NCI.

Ranging channel is used by both forwarding and forwarded HR-MS to achieve transmission synchronization between them. The forwarding HR-MS makes use of the same periodic ranging channel allocated by HR-BS for its periodic synchronization with HR-BS. The forwarded HR-MS transmit ranging signal in the last 2 OFDMA symbols within the FCZ zone.

Fast-feedback channels are allocated in the FCZ zone for forwarded HR-MS to feedback to its forwarding HR-MS. If the forwarding HR-MS is supposed to receive feedback from its forwarded HR-MS, it shall not transmit UL signal toward the serving HR-BS in the 4$^{th}$ OFDMA symbol counting from the end of the corresponding uplink subframe. Resources for fast-feedback channels of forwarded HR-MS shall be signal by forwarded HR-MS through the Fast-feedback Extended F-MAP IE described in Table 15 above.

S2.2: Network Entry Involving a 802.16-2009-Based Forwarding HR-MS

For an HR-MS that is inside-of-coverage of an HR-BS/RS, the network entry process is as described in 802.16-2009.

For an HR-MS that is outside-of-coverage of any HR-BS/RS but within reach of a forwarding HR-MS, the process of network entry can be described as follows.

The procedure starts when serving HR-BS/RS transmits an FN-CONFIG-CMD message to instruct one or a group of its directly-associated HR-MS to carry out a coverage-extending process. The transmitted FN-CONFIG-CMD (Table 16) message includes, among other fields, the following information:

- Index of the preamble to be transmitted by the forwarding HR-MS
- The parameters determining the transmissions of -Frame Control Header (M-FCH), Network Configuration Information (NCI), and Forwarding MAP (F-MAP).
- The parameters allowing a new HR-MS to transmit ranging signal to and receive ranging response from the directly-associated HR-MS.

TABLE 16

FN-CONFIG-CMD

| Syntax | Size (bit) | Notes |
|---|---|---|
| FN-CONFIG-CMD_Message_Format{ | | |
| Management Message Type = [TBD] | 8 | — |
| Frame number action ($n_{start}$) | 4 | 4 LSBs of frame number in which the coverage-extending process should be started |
| Preamble index | 7 | As specified in Table 437, 438, 439 |
| Number of ranging opportunities ($m_{rng}$) | 4 | Ranging opportunities are allocated in every frame that immediately follows a frame in which the forwarding HR-MS transmits preamble, M-FCH, and NCI |
| Used subchannel bitmap | 6 | Bit 0: Subchannel group 0<br>Bit 1: Subchannel group 1<br>Bit 2: Subchannel group 2<br>Bit 3: Subchannel group 3<br>Bit 4: Subchannel group 4<br>Bit 5: Subchannel group 5 |
| Repetition_Coding_Indicator | 2 | 0b00: No repetition coding on NCI<br>0b01: Repetition coding of 2 used on NCI<br>0b10: Repetition coding of 4 used on NCI<br>0b11: Repetition coding of 6 used on NCI |
| NCI Coding_Indicator | 2 | 0b00: CC encoding used on NCI<br>0b01: BTC encoding used on NCI<br>0b10: CTC encoding used on NCI<br>0b11: ZT CC encoding used on NCI |
| NCI_Length | 6 | Defines the length of NCI length in OFDMA slots |
| Subchannel offset for NCI | 3 | Indicates the gap, in number of subchannels, between the end of M-FCH and the beginning of NCI. |
| Subchannel offset for ranging feedback | 7 | Counted from the beginning of FCZ. Number of OFDMA slots allocated for ranging feedback is fixed at 2. |
| Subchannel offset for ranging | 5 | Counted from the beginning of FCZ assigned for transmissions by forwarded HR-MS |
| Ranging Method | 1 | 0b0: Initial ranging over two symbols<br>0b1: BR/periodic ranging over one symbol |
| Initial ranging codes | 5 | Indicates the CDMA codes used for initial ranging toward the forwarding HR-MS.<br>2 MSBs indicate index of starting code:<br>0b00: starting code index = 0<br>0b01: starting code index = 4<br>0b10: starting code index = 8<br>0b11: starting code index = 16<br>3 LSBs indicate number of codes used. The codes are contiguous from the starting code. |

TABLE 16-continued

FN-CONFIG-CMD

| Syntax | Size (bit) | Notes |
|---|---|---|
| Forwarding HR-MS EIRP | 7 | Signed in units of 1 dBm. |
| EIRxPIR,max | 16 | Initial ranging maximum equivalent isotropic received power at forwarding HR-MS. Signed in units of 1 dBm. |
| F-MAP Length | 4 | In units of OFDMA slots |
| Subchannel offset for F-MAP | 5 | Indicates the gap, in number of subchannels, between the end of NCI and the beginning of F-MAP. |
| F-MAP repetition coding indicator | 2 | 0b00: No repetition coding on NCI<br>0b01: Repetition coding of 2 used on NCI<br>0b10: Repetition coding of 4 used on NCI<br>0b11: Repetition coding of 6 used on NCI |
| Two-phase Indicator | 1 | Indicate whether a two-phase coverage extending process is to be carried out.<br>0b0: Single phase<br>0b1: Two phase |
| If (Two-phase Indicator == 0b1){ | | |
| Threshold | 6 | The mean CINR measured on the CDMA ranging code above which the forwarding HR-MS should report its reception to serving HR-BS. |
| } | | |
| Reserved | 3 | |
| } | | |

Prior to sending out the FN-CONFIG-CMD message, HR-BS/RS reserves a Forwarding Control Zone (FCZ) of three OFDMA symbols at the end of uplink sub-frame. This zone reservation is achieved by defining a UL_Zone_IE( ).

Upon receiving the FN-CONFIG-CMD message, the scheduled HR-MS or group of HR-MS, from now on simply referred to as forwarding HR-MS, shall start transmitting the specified preamble in the first OFDMA symbol of the FCZ, followed by M-FCH and NCI in the remaining two OFDMA symbols. The formats of M-FCH and NCI are described in Tables 9.1, 9.2, and 10, respectively. The M-FCH carries similar information to the FCH transmitted by HR-BS, and allows the new HR-MS to receive the NCI, which follows M-FCH.

When a new HR-MS detects the preamble, M-FCH, and NCI transmitted by the forwarding HR-MS and decides to start initial ranging through the forwarding. HR-MS, the following process shall be carried out:

- The new HR-MS, after acquiring synchronization and uplink transmission parameters shall choose one ranging CDMA code from those specified in NCI using a uniform random process. The new HR-MS shall send the selected ranging CDMA code on a ranging slot uniformly selected from those specified in NCI. The new HR-MS is only allowed to transmit a ranging code in the frame that immediately follows a frame in which the NCI containing ranging allocation is transmitted.
- Upon successfully receiving the ranging code from the new HR-MS, the forwarding HR-MS is supposed to respond with an RNG-RSP message within T3 Timer. If the new HR-MS does not receive RNG-RSP from the forwarding HR-MS, it shall wait for the next M-FCH/NCI from the forwarding HR-MS and transmit another ranging signal as specified above.
- There are four possible ranging status responses from the forwarding HR-MS to the new HR-MS in the RNG-RSP message, i.e., Continue: The forwarding HR-MS informs the new HR-MS of needed adjustments (e.g., time, power, and possibly frequency corrections) and a status notification of "continue".

Success: The forwarding HR-MS informs the new HR-MS of status "success", but may have adjustment suggestions to the new HR-MS if necessary. With status success, the forwarding HR-MS shall inform the new HR-MS of a BW allocation in the uplink for the new HR-MS to send RNG-REQ message.

Abort: The forwarding HR-MS informs the new HR-MS to abort the current initial ranging process.

Second Phase: This status notification is only applicable if the current coverage extension process follows the Two-Phase approach, as specified in FN-CONFIG-CMD message. The forwarding HR-MS informs the new HR-MS to prepare to receive post-access preambles and post-access NCI. This status shall only be sent once, i.e., it shall not be given when the new HR-MS has already been carrying out ranging using post-access preambles and post-access NCI from forwarding HR-MS.

Upon receiving a Continue status notification and parameter adjustments, the new HR-MS shall adjust its parameters accordingly and continue the ranging process by selecting one ranging CDMA code from those specified in NCI with equal probability and transmitting in the next available ranging opportunity.

Upon receiving a Success status notification, the new HR-MS shall wait for the forwarding HR-MS to inform it of a BW allocation in the UL to send RNG-REQ message. The forwarding HR-MS forwards the corresponding request to the serving HR-BS, and subsequently acts on behalf of the HR-BS in sending an RNG-RSP message to the new HR-MS. Initial ranging process for the new HR-MS is over after receiving RNG-RSP message which includes a valid Basic CID. If the new HR-MS does not receive bandwidth allocation for RNG-REQ within T3, it stops the process and try to associate with another HR-MS or a HR-BS/RS.

Upon receiving an Abort status notification, the new HR-MS shall stop the ranging process. It shall not attempt to restart initial ranging with a forwarding HR-MS transmitting the same preamble.

Upon receiving Second Phase status notification, the new HR-MS waits for post-access preamble and post-access NCI to be transmitted by forwarding HR-MS. Upon receiving post-access preamble and NCI, the new HR-MS starts a new round of initial ranging following steps described above. The initial transmission power for the ranging is determined based on the last ranging prior to detection of post-access preamble and NCI.

The behavior of the forwarding HR-MS and serving HR-BS/RS during initial ranging of the new HR-MS shall be as follows.

After transmitting NCI, the forwarding HR-MS shall monitor the specified ranging opportunities in the next frame for any initial-ranging attempt by new HR-MS.

When the forwarding HR-MS detects one or more CDMA ranging codes transmitted on the allocated ranging slots, it shall calculate signal strength and necessary adjustments (time, power, frequency corrections). An RNG-RSP message shall be transmitted to the new HR-MS.

RNG-RSP message shall be transmitted in the FCZ, with the location specified inside the NCI. The HR-BS shall also monitor the pre-allocated resource for the RNG-RSP in order to carry out any further proactive resource allocation for the coverage extending process.

The forwarding HR-MS can also transmit an HR-RNG-REP report to the HR-BS. The HR-RNG-REP message contains signal strength and possibly necessary adjustments for the new HR-MS. The HR-BS may receive HR-RNG-REP messages from multiple scheduled forwarding HR-MS. The HR-BS is supposed to follow up with an FN-RNG-FLU message within T66 timer. The FN-RNG-FLU (Table 17) message specifies the forwarding HR-MS that shall transmit an RNG-RSP message to the new HR-MS (if such a message needs to be transmitted).

After the ranging status has become Success, HR-BS shall allocate bandwidth in the uplink to allow the new HR-MS to transmit RNG-REQ message. The forwarding HR-MS shall recognize this allocation IE in the UL-MAP and inform the new HR-MS accordingly (using a CDMA Allocation IE).

The HR-BS may request the forwarding HR-MS to report any ranging attempt, whether they have crossed the response threshold or not, for management purposes.

TABLE 17

FN-RNG-FLU message format

| Syntax | Size (bit) | Notes |
| --- | --- | --- |
| HR-RNG-REP Message Format( ) { | — | — |
| Management Message Type = [TBD] | 8 | — |
| Number of ranging codes to be followed up | 4 | |
| Reserved | 4 | |
| For (i = 0; i < Number of ranging codes to be followed up; i++){ | | |
| Frame number | 4 | 4 LSBs of the frame number in which the code was received |
| CDMA code | 8 | Index of the ranging code to be followed up. |
| Transmission opportunity offset | 4 | The offset is in number of symbol duration |
| } | | |
| } | | |

Management and transport connections between a forwarded HR-MS and serving HR-BS/RS are defined in the same way as specified in 802.16-2009. Each forwarding HR-MS keeps track of all basic/primary/secondary and transport CIDs allocated to all of its associated HR-MSs.

Serving HR-BS/RS schedules resource for the transmissions to/from forwarded HR-MS using FTN Assignment IE, which is an extended UL-MAP IE (UIUC=15) with Extended UIUC=0xC. The detailed operation depends on whether the forwarded HR-MS is inside or outside of HR-BS/RS coverage and is described next.

The procedure for forwarding of UL traffic for an inside-of-coverage forwarded HR-MS consists of the following steps:

The serving HR-BS/RS assigns an UL transmission resource for the forwarded HR-MS through an UL-MAP IE. The forwarded HR-MS, upon receiving such an UL-MAP IE, transmits its MPDU as per normal, i.e., just like transmitting directly to the serving HR-BS/RS.

As the forwarding HR-MS keeps track of the basic CIDs of all of its forwarded HR-MS, it is aware of the UL resource assignment from the serving HR-BS/RS and shall attempt to receive, if it is not scheduled to transmit uplink traffic on the same frame.

If the serving HR-BS/RS wants the forwarding HR-MS to forward the received MPDU from forwarded HR-MS, it shall assign UL resource to the forwarding HR-MS in one of the subsequent frames, using an FTN Assignment IE. The FTN Assignment IE is transmitted with the basic CID of the forwarded HR-MS and with the field "Transmission Indicator" set to 0b01.

The forwarding HR-MS shall buffer the MPDU received from the forwarded HR-MS for at most [TBD] frames. If during those frames, the corresponding FTN Assignment IE is not received from serving HR-BS/RS, the forwarding HR-MS shall discard the received MPDU.

The procedure for forwarding of DL traffic for an outside-of-coverage forwarded HR-MS consists of the following steps.

The serving HR-BS/RS sends a DL-MAP IE with the basic CID of the forwarded HR-MS. As the forwarding HR-MS keeps track of the basic CIDs of all of its forwarded HR-MS, it is aware of the DL resource assignment and shall attempt to receive.

In one of the subsequent frames, the serving HR-BS/RS assigns an UL resource to forwarding HR-MS to forward the received MPDU toward the forwarded HR-MS, using an FTN Assignment IE. The FTN Assignment IE is transmitted with the basic CID of the forwarded HR-MS and with the field "Transmission Indicator" set to 0b10.

Upon receiving the FTN Assignment IE, the forwarding HR-MS conveys the assigned resource to the forwarded HR-MS through an F-MAP IE in the coming F-MAP.

The forwarding HR-MS then proceeds to transmit the MPDU received from the serving HR-BS/RS toward the forwarded HR-MS.

The procedure for forwarding of UL traffic for an outside-of-coverage forwarded HR-MS consists of the following steps.

The serving HR-BS/RS assigns UL resource for the forwarded HR-MS to transmit its MPDU toward the forwarding HR-MS using an FTN Assignment IE, using the basic CID of the forwarded HR-MS and with the field "Transmission Indicator" set to 0b11.

Upon receiving the FTN Assignment IE, the forwarding HR-MS conveys the assigned UL resource to the forwarded HR-MS through an F-MAP IE in the coming F-MAP. The forwarding HR-MS subsequently attempts to receive the MPDU transmitted by the forwarded HR-MS in the assigned UL resource.

In one of the subsequent frames, the serving HR-BS/RS sends a UL-MAP IE with the basic CID of the forwarded HR-MS. The forwarding HR-MS is aware of the UL resource assignment and uses that to forward the MPDU received from the forwarded HR-MS toward the serving HR-BS/RS.

The forwarding HR-MS shall buffer the MPDU received from the forwarded HR-MS for at most a pre-defined number of frames. If during those frames, the corresponding FTN Assignment IE is not received from the serving HR-BS/RS, the forwarding HR-MS shall discard the received MPDU.

While the invention has been particularly shown and described with reference to specific aspects, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced

The invention claimed is:

1. A method for enabling a forwarding to network operation in a cellular mobile communication system, the cellular mobile communication system comprising a plurality of mobile stations and at least one base station, the method comprising:
reporting forwarding capability of a first mobile station of the plurality of mobile stations with the at least one base station;
discovering neighboring mobile stations to the first mobile station;
selecting a second mobile station from the neighboring mobile stations and establishing a forwarding link between the first mobile station and the second mobile station;
allocating radio resources for the forwarding link between the first mobile station and the second mobile station; and
synchronizing the forwarding link between the first mobile station and the second mobile station wherein synchronizing the forwarding link between the first mobile station and the second mobile station comprises:
transmitting, from the first mobile station to the second mobile station, a first ranging code;
estimating, by the second mobile station, a time offset from the first ranging code; and
adjusting, by the second mobile station, a receiving time of the second mobile station based on the time offset.

2. The method according to claim 1, further comprising:
forwarding communications between the second mobile station and the base station through the first mobile station.

3. The method according to claim 1, wherein discovering neighbor mobile stations to the first mobile station comprises:
transmitting a predefined signal from the first mobile station for the rest of the plurality of mobile stations to receive.

4. The method according to claim 1, wherein discovering neighbor mobile stations to the first mobile station comprises:
transmitting a predefined signal from one of the plurality of mobile stations for the first mobile station to receive.

5. The method according to claim 1, wherein the second mobile station is not within a transmission range of the base station.

6. The method according to claim 5, wherein the step of establishing a forwarding link between the first mobile station and the second mobile station comprises:
associating the first mobile station and the second mobile station with the at least one base station.

7. The method according to claim 1, wherein the second mobile station is within a transmission range of the base station.

8. The method according to claim 7, wherein the step of synchronizing comprises:
transmitting preambles at the beginning of each frame from the base station.

9. The method according to claim 1, wherein the step of synchronizing comprises:
transmitting preambles from the first mobile station periodically.

10. The method according to claim 1, further comprising:
adjusting, by the second mobile station, a transmission time of the second mobile station based on the time offset.

11. The method according to claim 1, wherein the cellular mobile communication system is a communication network according to an 802.16 communication standard.

12. The method according to claim 1, wherein the cellular mobile communication system is a communication network according to the IEEE 802.16m-2011 communication standard.

13. The method according to claim 12, comprising:
transmitting, by the first mobile station, a primary advanced preamble and a secondary advanced preamble following the primary advanced preamble; and
transmitting, by the first mobile station, network configuration information following the secondary advanced preamble.

14. The method according to claim 1, wherein the cellular mobile communication system is a communication network according to the IEEE 802.16-2009 communication standard.

15. The method according to claim 14, comprising:
reserving, by the base station, a plurality of symbol durations;
transmitting, by the first mobile station, a preamble in a first reserved symbol duration of the plurality of symbol durations if two symbol durations are reserved;
transmitting, by the first mobile station, the preamble in a second reserved symbol duration of the plurality of symbol durations if three symbol durations are reserved;
transmitting, by the first mobile station, network configuration information following the preamble; and
responsive to receiving the preamble and the network configuration information, transmitting, by the second mobile station, a ranging code to the first mobile station.

16. A method for enabling a forwarding to network operation in a cellular mobile communication system, the cellular mobile communication system comprising a plurality of mobile stations and at least one base station, the method comprising:
reporting forwarding capability of a first mobile station of the plurality of mobile stations with the at least one base station;
discovering neighboring mobile stations to the first mobile station;
selecting a second mobile station from the neighboring mobile stations and establishing a forwarding link between the first mobile station and the second mobile station;
allocating radio resources for the forwarding link between the first mobile station and the second mobile station; and
synchronizing the forwarding link between the first mobile station and the second mobile station, wherein synchronizing the forwarding link between the first mobile station and the second mobile station comprises:
transmitting, from the second mobile station to the first mobile station, a first ranging code; and
estimating, by the first mobile station, a time offset from the first ranging code.

17. The method according to claim 16, further comprising:
adjusting, by the first mobile station, a receiving time of the first mobile station based on the time offset.

18. A cellular mobile communication system for enabling a forwarding to network operation, the cellular mobile communication system comprising a plurality of mobile stations and at least one base station, the cellular mobile communication system comprising:
a forwarding mobile station of the plurality of mobile stations configured to report forwarding capability to the at least one base station and discover neighboring mobile stations;
the at least one base station configured to select a forwarded mobile station from the neighboring mobile stations and establish a forwarding link between the forwarding mobile station and the forwarded mobile station and allocate radio resources for the forwarding link between the forwarding mobile station and the forwarded mobile station; and
the forwarding mobile station and the forwarded mobile station each comprising a synchronizer module configured to synchronize the forwarding link between the forwarding mobile station and the forwarded mobile station, wherein synchronizing the forwarding link between the forwarding mobile station and the forwarded mobile station comprises:
transmitting, from the synchronizer module of the forwarding mobile station to the synchronizer module of the forwarded mobile station, a first ranging code;
estimating by the synchronizer module of the forwarded mobile station, a time offset from the first ranging code; and
adjusting, by the synchronizer module of the forwarded mobile station, a receiving time of the forwarded mobile station based on the time offset.

\* \* \* \* \*